United States Patent
Nonaka

(10) Patent No.: US 7,564,297 B2
(45) Date of Patent: Jul. 21, 2009

(54) POWER SUPPLY CIRCUIT AND ELECTRONIC DEVICE EQUIPPED WITH SAME

(75) Inventor: Yoshihiro Nonaka, Kanagawa (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 59 days.

(21) Appl. No.: 11/842,651

(22) Filed: Aug. 21, 2007

(65) Prior Publication Data

US 2008/0048765 A1    Feb. 28, 2008

(30) Foreign Application Priority Data

Aug. 22, 2006   (JP) .............................. 2006-225902
Aug. 20, 2007   (JP) .............................. 2007-214112

(51) Int. Cl.
    *G05F 1/10*   (2006.01)

(52) U.S. Cl. ........................ 327/536; 327/333

(58) Field of Classification Search ......... 327/534–538, 327/333; 323/271
    See application file for complete search history.

(56) References Cited

U.S. PATENT DOCUMENTS

| | | | | |
|---|---|---|---|---|
| 6,426,666 B1 * | 7/2002 | Li et al. | ...................... | 327/438 |
| 6,501,325 B1 * | 12/2002 | Meng | ......................... | 327/536 |
| 6,646,493 B2 * | 11/2003 | Butler | ......................... | 327/536 |
| 7,382,177 B2 * | 6/2008 | Cordoba et al. | ............. | 327/536 |
| 7,397,299 B2 * | 7/2008 | Ki et al. | ...................... | 327/536 |

FOREIGN PATENT DOCUMENTS

| | | |
|---|---|---|
| JP | 3040885 B2 | 5/2000 |
| JP | 2005-37842 A | 2/2005 |

* cited by examiner

*Primary Examiner*—Dinh T. Le
(74) *Attorney, Agent, or Firm*—Sughrue Mion, PLLC

(57) ABSTRACT

A power supply circuit is provided which is capable of preventing a drop in an output voltage of the power supply circuit used as a DC/DC converter made up of single and conductive type (n-type or p-type) MOS transistors and of improving efficiency. Since a control voltage having an amplitude [2×VDD] is applied from a level shift circuit to a charge-pump circuit, even when potentials at nodes becomes a level [2×VDD], pMOS transistors are kept in an OFF state, thereby preventing leakage of currents from pMOS transistors. This avoids a drop in an DC output voltage. As inputs to the level shift circuits, potentials at nodes of the charge-pump circuit are used and, therefore, even if potentials at nodes of the level shift circuits are high, pMOS transistors are kept in an OFF state.

19 Claims, 26 Drawing Sheets

*12;Level Shift Circuit*

*13;Level Shift Circuit*

*12B;Level Shift Circuit*

*13B;Level Shift Circuit*

21; Charge-pump Circuit

22; Level Shift Circuit

23; Level Shift Circuit

22A ;Level Shift Circuit

23A ;Level Shift Circuit

22B; Level Shift Circuit

23B; Level Shift Circuit

32: Level Shift Circuit

33: Level Shift Circuit

*34;Level Shift Circuit*

*35;Level Shift Circuit*

POWER SUPPLY CIRCUIT AND ELECTRONIC DEVICE EQUIPPED WITH SAME

BACKGROUND OF THE INVENTION

1. Field of the Invention

The present invention relates to a power supply circuit and an electronic device equipped with the power supply circuit and more particularly to the power supply circuit made up of single and conductive-type (n-type or p-type) MOS transistors and suitably used as a DC/DC converter to convert a supplied DC (Direct Current) input voltage into a DC output voltage at a given level, in particular and the electronic device equipped with the power supply circuit.

2. Description of the Related Art

As the power supply circuit made up of semiconductors, a charge-pump circuit consisting of an electronic switch having transistors and capacitors is available. The charge-pump circuit, owing to integration of its electronic switch using a semiconductor transistor, thin film transistor, or a like, can be made small and lightweight and, therefore, can be widely used for a portable electronic device such as a portable phone, notebook personal computer, or a like. As a circuit making up the semiconductor device, generally, a CMOS (Complementary MOS) circuit having an n-type MOS (hereinafter simply "nMOS") transistor and a p-type MOS (hereinafter simply "pMOS") transistor is used in many cases since the CMOS circuit consumes less power. However, there are problems in that, when a semiconductor device using CMOS circuits is to be manufactured, in addition to processes of deposition, mask exposure, etching, or a like, a plurality of times of impurity implantation processes to fabricate the pMOS and nMOS is required, which causes the manufacturing process to be complicated.

On the other hand, in the case of the semiconductor device made up of only single and conductive-type MOS transistors including the pMOS or nMOS transistors, it is possible to reduce the number of processes such as an impurity implantation process, thereby making the manufacturing processes comparatively simple. However, if the semiconductor device is made up of only the single and conductive-type MOS transistors, another problem arises that the single and conductive-type MOS transistors consume more power than the CMOS transistors and a noise margin of the single and conductive-type MOS transistor is low and its output margin is made to be decreased. To solve these problems, an improved semiconductor is proposed.

A conventional technology of this type is disclosed in Patent Reference 1 (Japanese Patent No. 3040885, page 3, FIG. 6). The power supply circuit disclosed in the Patent (referred to as a "voltage boosting circuit" in the Patent), as shown in FIG. 18, includes nMOS transistors MT5A, MT1A, MT2A, MT3A, MT4A, MT6A, MT7A, MT5B, MT1B, NT2B, MT3B, MT4B, MT6B, and MT7B and capacitors C0A, C1A, C2A, C3A, C4A, C5A, C0B, C1B, C2B, C3B, C4B, and C5B. The disclosed power supply circuit is a circuit to generate, by using a DC input voltage and clocks CLKA and CLKB being opposite in phase to each other, a DC output voltage [VOUT] whose potential is higher than that of the DC input voltage [VDD].

In the disclosed voltage boosting circuit, in synchronization with transition of a potential of each of the clocks CLKA and CLKB from its low level [VSS (=0V)] to its high level [VDD] or from its high level [VDD] to its low level [VSS], each of the nMOS transistors gets into an ON state or an OFF state. That is, when the clock CLKA has the low potential [VSS] and the clock CLKB has the high potential [VDD], ideally, each of the nMOS transistors MT5A, MT1B, MT2A, MT3B, MT4A, MT6B, and MT7A gets into the ON state, while each of the nMOS transistors MT5B, MT1A, MT2B, MT3A, MT4B, MT6A, and MT7B gets into the OFF state. At this time point, the node N0A is charged so that its potential is lower by a gate threshold voltage [Vth] of the nMOS transistor MT5A than the DC input voltage [VDD], that is, the potential at the node N0A becomes a potential [VDD-Vth]. Moreover, the potential at the node N0B, due to the transition of the potential of the clock CLKB to the high potential [VDD], is boosted to the potential [2×VDD-Vth]. Since the nMOS transistor MT1B is in an ON state, the potential at the node N1B is at the same level as the node N0B.

Next, when the potential of the clock CLKA is changed to be a high potential [VDD], since the capacitor has been already charged so as to have the voltage [VDD-Vth], the potential of the node N0A is boosted to the level [VDD-Vth+VDD=2×VDD-Vth] and if the nMOS transistor MT1A is in the ON state, the potential of the node N1A is also boosted to the level [2×VDD-Vth]. Similarly, the potential at the node N1B is boosted from the level [2×VDD-Vth] to the level [3×VDD-Vth]. Thereafter, the potential at each of the nodes is sequentially boosted and, ideally, the DC output voltage [VOUT] is boosted to a level [6×VDD-Vth].

However, the above conventional power supply circuit has the following problems. Even in a period during which an nMOS transistor should be in an OFF state, its ON state continues and, therefore, a boosted voltage lowers. For example, in the conventional power supply circuit shown in FIG. 18, for example, when the clock CLKA has the low potential [VSS] and the clock CLKB has the high potential [VDD], the potential at the node N0B is boosted up to the level [2×VDD-Vth] and the potential at the node N1A is boosted up to the level [3×VDD-Vth]. At this time, the condition for which the nMOS transistor MT1B gets into an ON state is that a potential difference (voltage Vgs between the gate and source) between the node N1A connected to a gate electrode and the node N0B connected to a source electrode becomes the voltage [VDD]. On the other hand, when the clock CLKA has the high potential [VDD] and the clock CLKB has the low potential [VSS], the potential at the node N0B lowers to the level [VDD-Vth] at which the nMOS transistor MT5B gets into an ON state.

At this time point, though the potential at the node N1A lowers to the level [2×VDD-Vth], the MOS transistor MT1B, if the voltage Vgs between the gate and source is [VDD=(2×VDD-Vth)−(VDD-Vth)], continues to be in the ON state. Due to this, a current flows from the node N1B to the node N0B, which causes the boosted voltage of the node N1B to be lowered. When the potential at the node N0B is boosted or when lowering of the potential at the node N1A causes a voltage between the node N0B and node N1A to become lower than a threshold voltage of the gate of the nMOS transistor MT1B, the nMOS transistor MT1B gets into an OFF state. Due to this, the power supply circuit (charge-pump circuit) presents a problem that the actual DC output voltage [VOUT] becomes lower than a voltage [6×VDD-Vth], thus causing a decrease in power efficiency.

The reason for this is that a gate signal of each of the nMOS transistors making up the charge pump is not at a level enough to make the nMOS transistor get completely into an OFF state. Generally, the condition for turning on a MOS transistor is that a voltage Vgs between a gate and source $\geq$VDD>Vth and the condition for turning off the MOS transistor is that Vgs$\leq$0V and a potential of the gate signal at which the nMOS transistor MT1B shown in FIG. 14 gets into the ON state is the potential [3×VDD-Vth] and a potential of a gate signal at which the nMOS transistor MT1B gets into the OFF state is the potential [VDD-Vth]. The gate signal is a signal obtained by increasing the amplitude [VDD] of each of the clocks CLKA and CLKB so as to be the amplitude [2×VDD].

As a circuit to increase the amplitude of a clock, a level shift circuit is available. The display device disclosed in Patent Reference 2 (Japanese Patent Application Laid-open No. 2005-037842, abstract, FIG. 1) includes such a level shift circuit. The disclosed level shift circuit, as shown in FIG. 19, is made up of nMOS transistors MT1L, MT2L, and MT3L. In the disclosed level shift circuit, clocks INA and INB both being opposite in phase to each other and each having a potential [VDD] or [VSS] are input and an expanded signal OUTA obtained by converting a potential level on a high-potential side from the level [VDD] to [VDH] is generated.

Moreover, when the same level shift circuit as the above level shift is to be configured by using pMOS transistors, as the potential of the DC power, the potential of the supply power [VDH] is replaced with the [VSS] and vice versa. On the other hand, in order to process input signals, in the clock having the [VDD] as its high potential and the [VSS] as its low potential, it is necessary that the potentials on the high potential side and on the low potential side are chanted to be the potential [VDH] and to be the potential [VDH-VDD] respectively. The amplitudes of these clocks are the same as those shown in FIG. 19, however, the potential is boosted by a level [VDH-VDD]. This presents a problem in that another signal generating circuit to generate an input signal of the level shift circuit is required.

SUMMARY OF THE INVENTION

In view of the above, it is an object of the present invention to provide a power supply circuit capable of preventing a drop in an output voltage by combining a charge-pump circuit with a level shift circuit serving as a gate control circuit to output a gate signal of MOS transistors making up the charge-pump circuit even if these circuits are made up of single and conductive-type MOS transistors and an electronic device equipped with the power supply circuit.

According to a first aspect of the present invention, there is provided a power supply circuit including:

a charge-pump circuit including at least one MOS transistor and at least one capacitor, to charge the at least one capacitor to a charging voltage by applying a specified DC input voltage through the at least one MOS transistor when a clock is at a first level and the at least one MOS transistor is in an ON state, and to generate a generated voltage at a level obtained by changing the charging voltage by an amplitude of the clock when the clock is at a second level and the at least one MOS transistor is in an OFF state; and a gate control circuit to apply a control voltage to make the at least one MOS transistor get into an OFF or ON state to a gate electrode of the at least one MOS transistor in synchronization with a change in a voltage of the at least one capacitor to the generated voltage or the charging voltage.

According to a second aspect of the present invention, there is provided a power supply circuit including:

a first charge-pump circuit including a first MOS transistor and a first capacitor, to charge the first capacitor to a first charging voltage by applying a specified DC input voltage through the first MOS transistor when a first clock is at a first level and the first MOS transistor is in an ON state, and to generate a first generated voltage at a level obtained by changing the first charging voltage by an amplitude of the first clock when the first clock is at a second level and the first MOS transistor is in an OFF state and to output the first generated voltage;

a second charge-pump circuit including a second MOS transistor and a second capacitor, to charge the first capacitor to a second charging voltage by applying a specified input voltage through the second MOS transistor when a second clock being opposite to the first clock in phase is at the first level and the second MOS transistor is in an ON state, and to generate a second generated voltage at a level obtained by changing the second charging voltage by an amplitude of the second clock and the second MOS transistor is in an OFF state and to output the second generated voltage;

an output circuit to output the generated voltage as a DC output voltage when the second clock is at the first level and to output the second generated voltage as the DC output voltage when the first clock is at the first level;

a first gate control circuit to make the first MOS transistor get into an ON state by applying a first control voltage being at a same level as the first level, in synchronization with a change from the first generated voltage to the first charging voltage, to a first gate electrode of the first MOS transistor and to make the first MOS transistor get into an OFF state by applying the first control voltage being at a same level as the second generated voltage in synchronization with a change from the second generated voltage to the second charging voltage; and a second gate control circuit to make the second MOS transistor get into an ON state by applying a second control voltage at a same level as the first level, in synchronization with a change from the second generated voltage to the second charging voltage, to a second electrode of the second MOS transistor and to make the second MOS transistor get into an OFF state by applying the second control voltage at a same level as the second generated voltage, in synchronization with a change from the first generated voltage to the first charging voltage.

According to a third aspect of the present invention, there is provided a power supply circuit including:

a plurality of first charge-pump circuits each including s first MOS transistor and a first capacitor applying a first DC input voltage to each of the first charge-pump circuits through the first MOS transistor when a first clock is at a first level and each of the first MOS transistors is in an ON state and generating a first boosted voltage at a level obtained by adding an amplitude of the first clock to a charging voltage of the first capacitor when the first clock is at a second level and the first MOS transistor is in an OFF state and outputting the generated voltage;

a plurality of second charge-pump circuits each including second MOS transistors and second capacitors applying a second DC input voltage to each of the second charge-pump circuits through each of the second MOS transistors when a second clock being opposite to the first clock in phase is at a first level and each of the second MOS transistor is in an ON state and generating a second boosted voltage at a level obtained by adding an amplitude of the second clock to a charging voltage of the second capacitor when the second clock is at a second level and each of the second MOS transistors is in an OFF state, wherein specified numbers of the first charge-pump circuits and the second charge-pump circuits are each cascaded alternately using one of the first charge-pump circuits as a first stage charge-pump circuit and specified numbers of the second charge-pump circuits and the first charge-pump circuits are cascaded alternately using one of the second charge-pump circuits as a second stage charge-pump circuit and outputting the generated voltage;

an output circuit to output the first boosted voltage at a final stage or the second boosted voltage at the final stage as a DC output voltage;

a first gate control circuit to make each of the first MOS transistors get into an ON state by applying a first control voltage at a same level as the first level, in synchronization with a fall of the first boosted voltage at a final stage, to a first gate electrode of each of the first MOS transistors and to make each of the first MOS transistors get into an OFF state by applying the first control voltage at a same level as the DC output voltage, in synchronization with a fall of the second boosted voltage at a final stage; and a second gate control circuit to make each of the second MOS transistors get into an ON state by applying a second control voltage being at a same level as the first level, in synchronization with a fall of the second boosted voltage at a final stage to a second gate electrode of each of the second MOS transistors and to make each of the second MOS transistors get into an OFF state by applying the second control voltage at a same level as the DC output voltage, in synchronization with a fall of the first boosted voltage at a final stage.

According to a fourth aspect of the present invention, there is provided a power supply circuit including:

a first charge-pump circuit including a first MOS transistor and a first capacitor, to charge the first capacitor to a first charging voltage by applying a specified DC input voltage through the first MOS transistor when a first clock is at a first level and the first MOS transistor is in an ON state, and to generate a first generated voltage at a level obtained by changing the first charging voltage by an amplitude of the first clock when the first clock is at a second level and the first MOS transistor is in an OFF state and to output the first generated voltage;

a second charge-pump circuit including a second MOS transistor and a second capacitor, to charge the first capacitor to a first charging voltage by applying the specified DC input voltage through the second MOS transistor when a second clock being opposite to the first clock is at a first level and the second MOS transistor is in an ON state, and to generate a second generated voltage at a level obtained by changing the second charging voltage by an amplitude of the second clock when the second clock is at a second level and the second MOS transistor is in an OFF state and to output the second generated voltage;

an output circuit to output the first generated voltage as a DC output voltage when the second clock is at the first level and to output the second generated voltage as the DC output voltage when the first clock is at the first level;

a third charge-pump circuit to generate a third generated voltage at a level obtained by changing the DC input voltage by an amplitude of the first clock in a direction opposite to the first charge-pump circuit;

a fourth charge-pump circuit to generate a fourth generated voltage at a level obtained by changing the DC input voltage by an amplitude of the second clock in a direction opposite to the second charge-pump circuit;

a first gate control circuit to make the first MOS transistor get into an ON state by applying a first control voltage being at a same level as the third generated voltage, in synchronization with a change from the first generated voltage to the first charging voltage, to a first gate electrode of the first MOS transistor and to make the first MOS transistor get into an OFF state by applying the first control voltage being at a same level as the first generated voltage in synchronization with a change from the second generated voltage to the second charging voltage; and a second gate control circuit to make the second MOS transistor get into an ON state by applying a second control voltage at a same level as the fourth generated voltage, in synchronization with a change from the second generated voltage to the second charging voltage, to a second electrode of the second MOS transistor and to make the second MOS transistor get into an OFF state by applying the second control voltage at a same level as the second generated voltage, in synchronization with a change from the first generated voltage to the first charging voltage.

According to a fifth aspect of the present invention, there is provided a power supply circuit including:

a first charge-pump circuit including a first MOS transistor and a first capacitor, to charge the first capacitor to a first charging voltage by applying a specified DC input voltage through the first MOS transistor when a first clock is at a first level and the first MOS transistor is in an ON state, and to generate a first generated voltage at a level obtained by changing the first charging voltage by an amplitude of the first clock when the first clock is at a second level and the first MOS transistor is in an OFF state and to output the first generated voltage;

a second charge-pump circuit including a second MOS transistor and a second capacitor, to charge the first capacitor to a second charging voltage by applying a specified input voltage through the second MOS transistor when a second clock being opposite to the first clock in phase is at a first level and the second MOS transistor is in an ON state, and to generate a second generated voltage at a level obtained by changing the second charging voltage by an amplitude of the second clock when the second clock is at the second level and the second MOS transistor is in an OFF state and to output the second generated voltage;

a first MOS transistor to output the first generated voltage as a DC output voltage when the first MOS transistor is in an ON state;

a second MOS transistor to output the second generated voltage as the DC output voltage when the second MOS transistor is in an ON state;

a first voltage generating circuit to generate a third generated voltage obtained by changing the DC output voltage by an amplitude of the first clock;

a second voltage generating circuit to generate a fourth generated voltage obtained by changing the DC output voltage by an amplitude of the second clock;

a first gate control circuit to make the first MOS transistor get into an ON state by applying a first control voltage being at a same level as the third generated voltage, in synchronization with a change from the first charging voltage to the first generated voltage, to a first gate electrode of the first MOS transistor and to make the first MOS transistor get into an OFF state by applying the first control voltage being at a same level as the first charging voltage, in synchronization with a change from the second charging voltage to the second generated voltage;

a second gate control circuit to make the second MOS transistor get into an ON state by applying a second control voltage at a same level as the fourth generated voltage, in synchronization with a change from the second charging voltage to the second generated voltage, to a second electrode of the second MOS transistor and to make the second MOS transistor get into an OFF state by applying the second control voltage at a same level as the second charging voltage, in synchronization with a change from the first charging voltage to the first generated voltage.

According to a sixth aspect of the present invention, there is provided a power supply circuit including:

a charge-pump circuit including at least one MOS transistor and at least one capacitor, to charge the at least one capacitor to a charging voltage by applying a specified DC input voltage through the MOS at least one transistor when a clock is at a first level and the MOS at least one transistor is in an ON state, and to generate a generated voltage at a level obtained by changing the charging voltage by an amplitude of the clock when the clock is at a second level and the at least one MOS transistor is in an OFF state;

a gate control circuit to apply a control voltage to a gate electrode of each of the MOS transistors in order to make the MOS transistors get in an ON state or OFF state; and wherein the gate control circuit is a level shift circuit to use an input from the capacitor which changes from the generated voltage to the charging voltage and to output an amplitude expanded from the clock.

With the above configurations, a control voltage to make the MOS transistors get into an OFF state or ON state is applied by the gate control circuit to a gate electrode of each of the MOS transistors in synchronization with a change in a voltage of each of the capacitors from a generated voltage to a charging voltage.

Also, with the configurations of the present invention, a first control voltage being at the same level as the first level is applied by the first gate control circuit to a first gate electrode of the first MOS transistor in synchronization with a change from the first generated voltage to the first charging voltage, while, the above first control voltage being at the same level as the first generated voltage is applied in synchronization with a change from the second generated voltage to the second charging voltage and, therefore, the first MOS transistor can be reliably controlled ON/OFF. Similarly, a second control voltage being at the same level as the first level is applied by the second gate control circuit to the second gate electrode of the second MOS transistor in synchronization with a change from the second generated voltage to the second charging voltage, while, the above second control voltage being at the same level as the above second generated voltage is applied in synchronization with the first generated voltage to the first charging voltage and, therefore, the second MOS transistor can be reliably controlled ON/OFF.

Also, with the configurations of the present invention, since the fourth node is connected to the sixth gate electrode of the sixth MOS transistor via the fifth MOS transistor, even when the potential at the fifth node is at the same level as a DC output voltage, the sixth MOS transistor can be kept in an OFF state. Similarly, since the second node is connected to the ninth gate electrode of the ninth MOS transistor via the eighth MOS transistor, even when the potential at the third node is at the same level as a DC output voltage, the ninth MOS transistor can be kept in an OFF state. Therefore, even if the power supply circuit is made up of a single and conductive type MOS transistor, by employing comparatively simple circuit configurations, flowing of through currents in the sixth or ninth MOS transistor can be avoided and power consumption can be reduced.

Also, with the configurations of the present invention, since the second node is connected to the sixth gate electrode of the sixth MOS transistor via the eighth MOS transistor, even when the potential at the fifth node is at the same level as a DC output voltage, the sixth MOS transistor can be kept in an OFF state. Similarly, since the fourth node is connected to the tenth gate electrode of the tenth MOS transistor via the twelfth MOS transistor, even when the potential at the third node is at the same level as a DC output voltage, the ninth MOS transistor can be kept in an OFF state. Therefore, even if the power supply circuit is made up of the single and conductive type MOS transistor, by employing comparatively simple circuit configurations, flowing of through currents in the sixth or tenth MOS transistor can be avoided and power consumption can be reduced.

Also, with the configurations of the present invention, since the DC output voltage is connected via the ninth MOS transistor diode-connected to the eight MOS transistor to the sixth gate electrode of the sixth MOS transistor, even if the potential at the fifth node is at the same level as the DC output voltage, the potential at the sixth gate electrode is the potential obtained by changing by a threshold voltage of the ninth MOS transistor from the DC output voltage and, therefore, it is possible to suppress the through currents in the sixth MOS transistor. Moreover, when the potential at the fifth node is made to be at the same level as the first level by bringing the sixth MOS transistor into conduction by using bootstrap effects, the potential at the sixth gate electrode is made to come near the first level by a threshold voltage from the DC output voltage and, therefore, the bootstrap effects easily occur. Similarly, since the DC output voltage is connected via the fourteenth MOS transistor diode-connected to the thirteenth MOS transistor to the eleventh gate electrode of the eleventh MOS transistor, even if the potential at the third node is at the same level as the DC output voltage, the potential at the eleventh gate electrode is the potential obtained by changing by a threshold voltage of the fourteenth MOS transistor from the DC output voltage and, therefore, it is possible to suppress the through currents in the ninth MOS. Moreover, when the potential at the third node is made to be at the same level as the first level by bringing the eleventh MOS transistor into conduction by using bootstrap effects, the potential at the eleventh gate electrode is made to come near the first level by a threshold voltage from the DC output voltage and, therefore, the bootstrap effects easily occur. As a result, even when the power supply circuit is made up of the single and conductive type MOS transistor, with comparatively simple configurations, flowing of the through-current in the sixth or eleventh MOS transistor can be avoided and power consumption can be reduced and the bootstrap effects can be made to easily occur and, therefore, stability of operations of the power supply circuit can be increased.

Also, with the configurations of the present invention, a first control voltage being at the same level as the first level is applied to the first gate electrode of each of the first MOS transistors by the first gate control circuit in synchronization with a fall of the first boosted voltage at a final stage, while, the above first control voltage being at the same level as a DC output voltage is applied in synchronization with a fall of the second boosted voltage at the final stage, even with small-scaled configurations, the above first MOS transistor can be reliably controlled ON/OFF. Similarly, a second control voltage being at the same level as the first level is applied to the second gate electrode of each of the second MOS transistors by the second gate control circuit in synchronization with a fall of the second boosted voltage at a final stage, while, the above second control voltage being at the same level as a DC output voltage is applied in synchronization with a fall of the first boosted voltage at the final stage, even with small-scaled configurations, the above second MOS transistors can be reliably controlled ON/OFF.

Also, with the configurations of the present invention, since the first control voltage at the final stage is applied to the fourth gate electrode of the fourth MOS transistor via the third MOS transistor, even when the potential of the third electrode is at the same level as the DC output voltage, the fourth MOS transistor can be kept in an OFF state Similarly, since the second control voltage at the final stage is applied to the seventh gate electrode of the seventh MOS transistor via the sixth MOS transistor, even when the potential of the ninth electrode is at the same level as the DC output voltage, the seventh MOS transistor can be kept in an OFF state. Therefore, even if the power supply circuit is made up of the single and conductive type MOS transistor, with comparatively simple circuit configurations, flowing of the through current in the fourth or seventh MOS transistor can be avoided and power consumption can be reduced.

Also, with the configurations of the present invention, the third generated voltage is generated by the third charge-pump circuit and the fourth generated voltage is generated by the fourth charge-pump circuit. Then, the first control voltage being at the same level as the above third generated voltage is applied to the first gate electrode of the first MOS transistor by the first gate control circuit in synchronization with a change from the first generated voltage to the first charging voltage, while, the first control voltage being at the same level as the first generated voltage in synchronization with a change from the second generated voltage to the second charging voltage. Also, the second control voltage being at the same level as the above fourth generated voltage is applied to the second gate electrode of the second MOS transistor by the second gate control circuit in synchronization with a change from the second generated voltage to the second charging voltage, while, the above second control voltage being at the same level as the second generated voltage is applied in synchronization with a change from the first generated voltage to the first charging voltage. Therefore, even when the DC input voltage is set to be lower than the gate threshold voltage of the first or second MOS transistor and even when the first to twelfth MOS transistors are constructed by the p-channel MOS transistors, the first and second MOS transistors can be reliably controlled ON/OFF. Moreover, even when even when a difference between amplitudes of the first and second clocks and the DC input voltage is set to be smaller than a gate threshold voltage of the first or second MOS transistor and even when the first to twelfth MOS transistors are constructed of n-channel MOS transistors, the first and second MOS transistors can be reliably controlled ON/OFF.

Also, with the configurations of the present invention, the third generated voltage is generated by the first voltage generating circuit and the fourth generated voltage is generated by the second voltage generating circuit. Then, the first control voltage being at the same level as the above third generated voltage is applied to the first gate electrode of the first MOS transistor by the first gate control circuit in synchronization with a change from the first charging voltage to the first generated voltage, while, the first control voltage being at the same level as the first charging voltage is applied in synchronization with a change from the second charging voltage to the second generated voltage and, therefore, the first MOS transistor can be reliably controlled ON/OFF. Similarly, the second control voltage being at the same level as the above fourth generated voltage is applied by the second gate control circuit to the second gate electrode of the second MOS transistor in synchronization with a change from the second charging voltage to the second generated voltage, while, the above second control voltage being at the same level as the second charging voltage is applied in synchronization with a change from the first charging voltage to the first generated voltage and, therefore, the second MOS transistor can be reliably controlled ON/OFF. This enables prevention of leakage of currents and avoidance of a fall of the DC output voltage.

Also, with the configurations of the present invention, since the third node is connected to the eighth gate electrode of the eighth MOS transistor via the seventh MOS transistor, even when the potential at the sixth node is high, the eighth MOS transistor can be kept in an OFF state. Therefore, even if the power supply circuit is constructed of single and conductive type MOS transistor, with comparatively simple circuit configurations, flowing of the through currents in the eighth MOS transistor is prevented and power consumption can be reduced. Similarly, the second node is connected to the twelfth gate electrode of the twelfth MOS transistor via the eleventh MOS transistor, even when the potential at the fourth node is high, the twelfth MOS transistor can be kept in an OFF state. Therefore, even if the power supply circuit is constructed of the single and conductive type MOS transistor, with comparatively simple circuit configurations, flowing of the through currents in the twelfth MOS transistor can be prevented and power consumption can be reduced. Furthermore, since the diode-connected tenth MOS transistor is connected in parallel to the seventh MOS transistor and the diode-connected fourteenth MOS transistor is connected in parallel to the eleventh MOS transistor, even if the DC output voltage has an indefinite value at the time of starting the power supply circuit, the gate control circuit and charge-pump circuit can be normally driven.

Also, with the configurations of the present invention, since the first or third node is connected to the eighth gate electrode of the eighth MOS transistor via the tenth MOS transistor, even when the potential at the sixth node is higher the eighth MOS transistor can be kept in an OFF state. Therefore, even if the power supply circuit is constructed of the single and conductive type MOS transistor, with comparatively simple circuit configurations, flowing of the through currents in the eighth MOS transistor can be avoided and power consumption can be reduced. Similarly, since the first or second node is connected to the twelfth gate electrode of the twelfth MOS transistor via the fourteenth MOS transistor, even when the potential at the fifth node is high, the twelfth MOS transistor can be kept in an OFF state. Therefore, even if the power supply circuit is constructed of the single and conductive type MOS transistor, with comparatively simple circuit configurations, flowing of the through currents in the eighth MOS transistor can be avoided and power consumption can be reduced.

Also, with the configurations of the present invention, since the first or third node is connected to the eighth gate electrode of the eighth MOS transistor via the eleventh MOS transistor being diode-connected to the tenth MOS transistor, even when the potential of the sixth node is high, the potential at the eighth electrode is lower by a threshold voltage of the eleventh MOS transistor than a high potential level and, therefore, it is made possible to suppress the through currents in the eighth MOS transistor. Moreover, when the potential at the sixth node is made to be low by bringing the eighth MOS transistor into conduction using the bootstrap effects, since the potential of the eighth gate electrode is made to come near to a low level by a threshold voltage than the high potential level, the bootstrap effects occur easily. Similarly, since the first or third node is connected to the thirteenth gate electrode of the thirteenth MOS transistor via the sixteenth MOS transistor being diode-connected to the fifteenth MOS transistor, even when the potential of the fifth node is high, the potential at the fourteenth electrode is lower by a threshold voltage of the sixteenth MOS transistor than a high potential level and, therefore, it is made possible to suppress the through currents in the thirteenth MOS transistor. Moreover, when the potential at the fifth node is made to be low by bringing the thirteenth MOS transistor into conduction using the bootstrap effects, since the potential of the thirteenth gate electrode is made to come near to a low level by a threshold voltage than the high potential level, the bootstrap effects occur easily. Therefore, even if the power supply circuit is constructed of the single and conductive type MOS transistor, with comparatively simple circuit configurations, the through currents flowing via the eighth and thirteenth MOS transistor can be suppressed and power consumption can be reduced and further the bootstrap effects can be made to easily occur, thereby increasing stability of the circuit operations.

Also, with the configurations of the present invention, when a voltage at a capacitor becomes a generated voltage, by using outputs from the level shift circuit as the generated voltage, the MOS transistor can be made to be in an OFF state. When a voltage at a capacitor is used as a charging voltage, since an amplitude of an output from the level shift circuit is expanded to be higher than that of a clock, the MOS transistor can be made to be in an ON state. If an amplitude of an output from the level shift circuit is assumed to be the same as that of a clock, the above charging voltage is applied to a gate electrode of the MOS transistor, the MOS transistor cannot be made to be in an OFF state. Moreover, as an input to the level shift circuit, by using a potential at the capacitor whose potential is different by the charging voltage from that of the clock, it is made possible to operate the level shift circuit without addition of other signal generating circuit.

Furthermore, with the configurations of the present invention, when the power supply circuit as defined in any one of the above-mentioned aspects is included in an electronic device, it is made unnecessary to handle a signal having a high voltage and a high amplitude outside the electronic device, which eliminates the need for a high-withstand-voltage characteristic in another semiconductor connected to the electronic device and, as a result, the semiconductor device can be constructed by using comparatively simple configurations at low costs.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings. According to the present invention, the power supply circuit is provided in which a control voltage at a level that enables MOS transistors to reliably get into an ON or OFF state is applied to a gate electrode of each of the MOS transistors making up a charge-pump circuit and the electronic device equipped with the power supply circuit.

First Embodiment

Figure 1A:
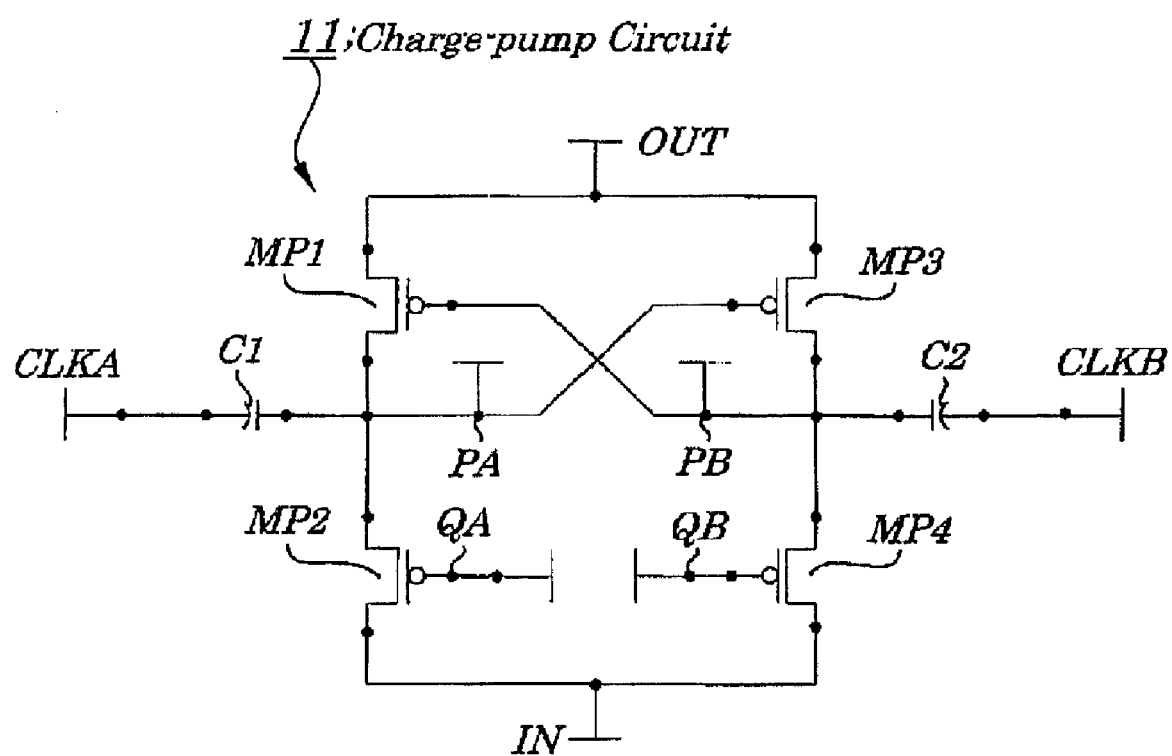
FIGS. 1A, 1B, and 1C are a circuit diagram showing electrical configurations of a power supply circuit according to the first embodiment of the present invention.
Figure 1B:
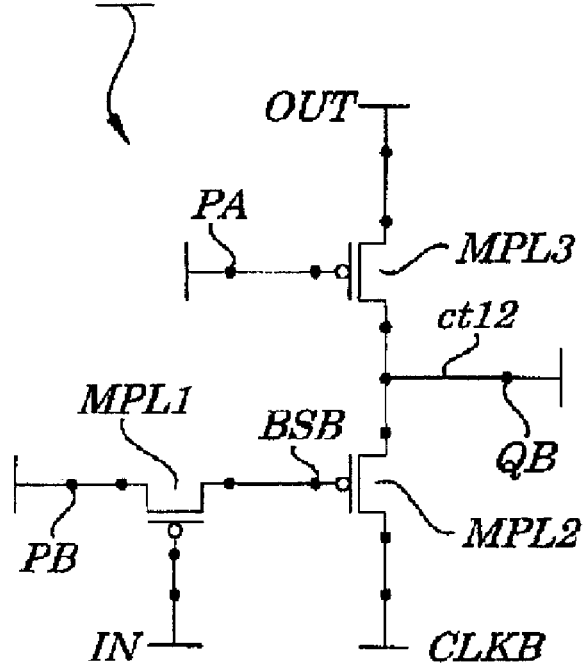
Figure 1C:
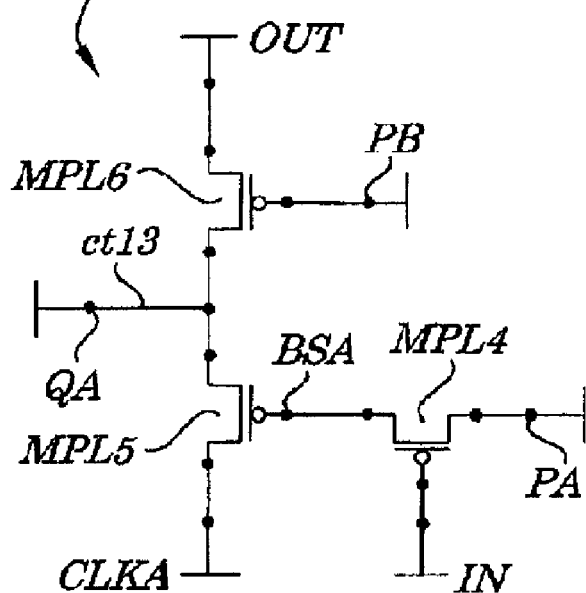

FIGS. 1A, 1B, and 1C each are a circuit diagram showing electrical configurations of a power supply circuit of a first embodiment of the present invention. The power supply circuit of the first embodiment includes a charge-pump circuit 11 shown in FIG. 1A, a level shift circuit 12 in FIG. 2B, and a level shift circuit 13 in FIG. 1C. The charge-pump circuit 11 is made up of pMOS transistors MP2 and MP4 each having a function of boosting a voltage, capacitors C1 and C2, and pMOS transistors MP1 and MP3 each having a function of outputting a DC voltage. The level shift circuits 12 and 13 serve as a gate control circuit of the charge-pump circuit. In the pMOS transistor MP1, its source electrode is connected to an output terminal OUT, its drain electrode is connected to a node PA, and its gate electrode is connected to a node PB. In the pMOS transistor MP2, its source electrode is connected to the node PA, its drain electrode is connected to an input terminal IN, and a gate electrode is connected to a node QA.

In the nMOS transistor MP3, its source electrode is connected to the output terminal OUT, its drain electrode is connected to the node PB, and its gate electrode is connected to the node PA. In the pMOS transistor MP4, its source electrode is connected to the node PB, its drain electrode is connected to the input terminal IN, and its gate electrode is connected to a node QB. To the input terminal IN is input a DC input voltage [VDD]. In the capacitor C1, its high-voltage-side electrode is connected to the node PA and to its low-voltage-side electrode is input a clock CLKA. In the capacitor C2, to its high-voltage-side is connected the node PB and to its low-voltage-electrode is input a clock CLKB.

The level shift circuit 12 is made up of pMOS transistors MPL1, MPL2, and MPL3. In the pMOS transistor MPL1, its source electrode is connected to a node PB, its drain electrode is connected to a node BSB, and its gate electrode is connected to an input terminal IN. In the pMOS transistor MPL2, its source electrode is connected to a node QB, its gate electrode is connected to the node BSB and to its drain electrode is input a clock CLKB. In the pMOS transistor MPL3, its source electrode is connected to the node QB, and its gate electrode is connected to a node PA. The level shift circuit 12 causes the pMOS transistor MP4 of the charge-pump circuit 11 to get into an OFF state by applying a control voltage ct12 at the same level as a voltage at the output terminal OUT to a gate electrode of the pMOS transistor MP4 and causes the pMOS transistor MP4 to get into an ON state by applying a control voltage ct12 at the same level as a low-level potential [VSS] of the clock CLKB. That is, the control signal ct12 has an amplitude being twice larger than that of each of the clocks CLKA and CLKB.

The shift level circuit 13 is made up of pMOS transistors MPL4, MPL5, and MPL6. In the pMOS transistor MPL4, its source electrode is connected to a node PA, its drain electrode is connected to a node BSA, and its gate electrode is connected to an input terminal IN. In the pMOS transistor MPL5, its source electrode is connected to a node QA, its gate electrode is connected to the node BSA and to its drain electrode is input a clock CLKA. In the pMOS transistor MPL6, its source drain is connected to an output terminal OUT, its drain electrode is connected to the node QA and its gate electrode is connected to a node PB. The level shift circuit 13 causes the pMOS transistor MP2 of the charge-pump circuit 11 to get into an OFF state by applying a control voltage ct13 at the same level as a voltage at the output terminal OUT to a gate electrode of the pMOS transistor MP2 and causes the pMOS transistor MP2 to get into an ON state by applying a control voltage ct13 at the same level as a low-level potential [VSS] of the clock CLKA. That is, the control signal ct13 has an amplitude being twice larger than that of each of the clocks CLKA and CLKB.

Figure 2:
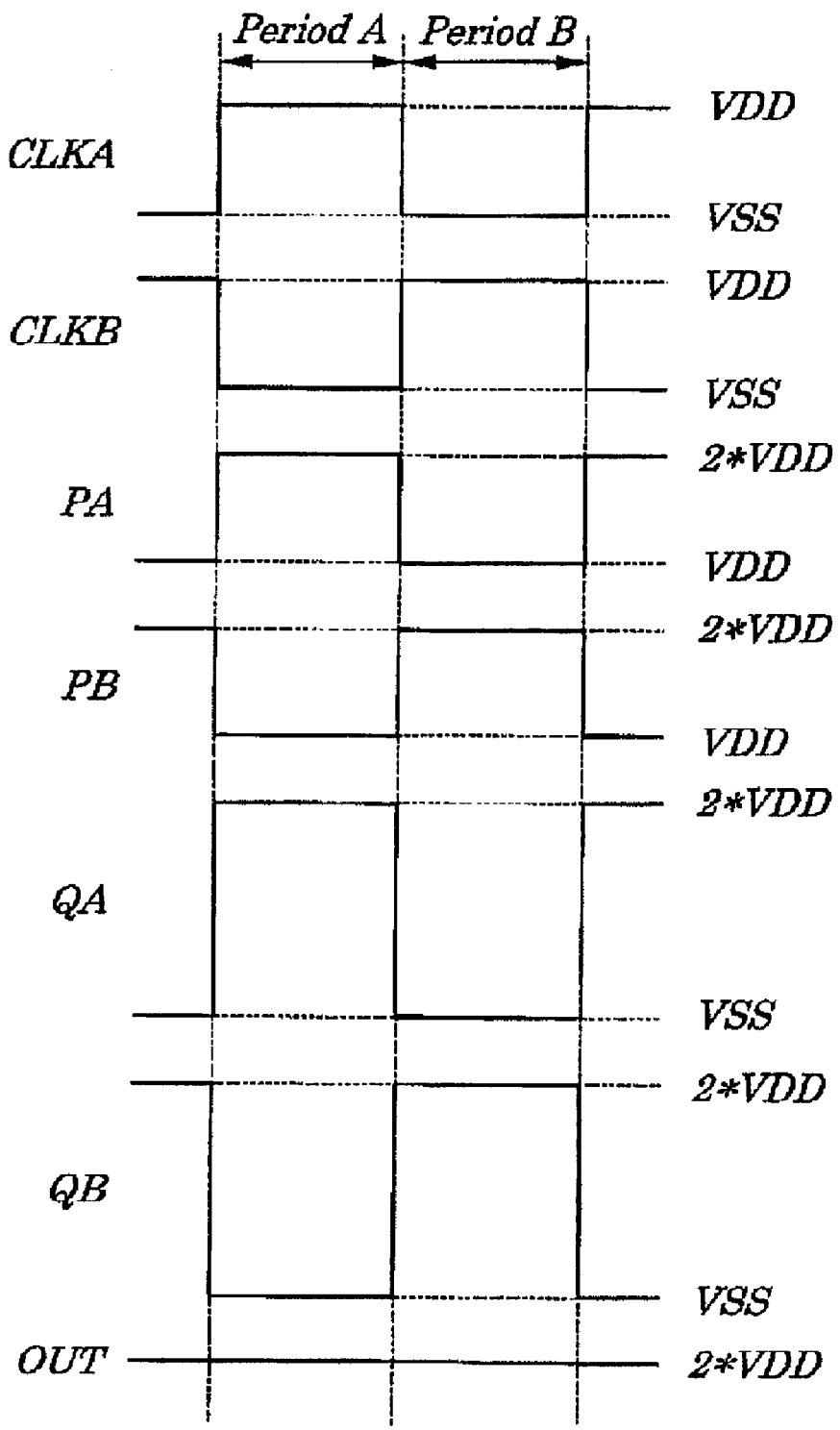
FIG. 2 is a time chart explaining operations of the power supply circuit shown in FIGS. 1A, 1B, and 1C.

FIG. 2 is a time chart explaining operations of the power supply circuit shown in FIGS. 1A, 1B, and 1C in which the vertical axis represents a voltage level and the horizontal axis represents time. Operations of the power supply circuit are described by referring to FIG. 2. During a period A, the clock CLKA has a high potential [VDD] (second level, for example, 5V) and the clock CLKB has a low potential [VSS] (first level, for example, 0V; ground level). The potential at each of the nodes PA, QA, PB, and QB changes in synchronization with potentials at the clocks CLKA and CLKB and the potentials at the nodes PA and QA are high and the potentials at the node PB and QA are low. The pMOS transistor MP4 of the charge-pump circuit 11, since the potential at the gate connected to the node QB is low, is in the ON state and the capacitor C2 is charged so as to have the potential [VDD] and the node PB is at the potential [VDD]. Thereafter, when the potential of the clock CLKB is boosted to the potential [VDD], the voltage [VDD] being equivalent to an amplitude of the clock CLKB is added to the potential at the node PB coupled by the capacitor C2 and, as a result, the potential at the node PB is boosted to the potential [2×VDD] (=VDD+VDD)]. At this point, the potential [VSS] of the clock CLKA is low and the potential at the node QA is also low and, therefore, the pMOS transistor MP2 gets into an ON state and the node PA is charged so as to have the potential [VDD]. As a result, the potential at the node PB is the potential [2×VDD] and the potential at the node PA is the potential [VDD], thus making the pMOS transistor MP3 get into an ON state and the potential at the output terminal OUT become the potential [2×VDD].

In the level shift circuit 12, during the period A, a potential at the node PA of the charge-pump circuit 11 is boosted to the potential [2×VDD] and the pMOS transistor MPL3, since the voltage Vgs between its gate and source becomes 0V, gets into an OFF state. Also, the potential at the node PB becomes low and the potential at the node BSB is lowered to a degree to which the potential at the node BSB is higher by about a gate threshold voltage (for example, 3V) of the pMOS transistor MPL1 than the potential [VDD]. While the node QB is kept at the high potential [2×VDD] before the period A, the pMOS transistor MPL2 starts to be conductive when a voltage between its gate and source exceeds its gate threshold voltage. At this time point, since the potential of the clock CLKB has been lowered to the potential [VSS], the potential at the node QB becomes the potential [VSS].

In order to maintain the pMOS transistor PML2 in the ON state while the potential at the node QB is the low potential [VSS], it is necessary that the potential at the node BSB is lower than the potential [VSS], however, in this case, due to a drop in the potential of the clock CLKB and at the node QB, a potential at the node BSB connected to the gate of the pMOS transistor MPL2 is also lowered by bootstrap effects Then, if the potential at the node BSB becomes lower than the potential (potential [VDD] at the node PB +gate threshold voltage), the pMOS transistor MPL1 gets into an OFF state, thus causing the node BSB get into a floating state. As a result, the potential at the node BSB is lowered to the potential [VSS] with a potential difference between the node BSB and the node QB being still maintained.

Next, during the period B, the potential at the node PA lowers to the potential [VDD] and the potential at the node PB is boosted to the potential [2×VDD]. The pMOS transistor MPL3 gets into an ON state and the node QB is charged so as to have the potential [2×VDD] at the node OUT. At this time, since the potential at the node PB is the potential [2×VDD], the pMOS transistor MPL1 is also in the ON state and the potential at the gate (node BSB) of the pMOS transistor MPL2 is boosted to the potential [2×VDD] and, therefore, the pMOS transistor MPL2 remains in the OFF state. In this case, even when the potential at the node QB reaches the potential [2×VDD], the OFF state of the pMOS transistor MPL2 is maintained. Moreover, the phase in which operations of the level shift circuit 13 are performed is opposite to the phase in which operations of the level shift circuit 12 are performed.

Also, the clock CLKB is input to the drain of the pMOS transistor MPL2 making up the level shift circuit 12 and the clock CLKA is input to the drain of the pMOS transistor MPL5, however, even when these drains are connected to the supply power [VSS], operations equivalent to those described above are performed. That is, when the potentials at the nodes PB and PA are the low potential [VDD], if the potentials at the drains of the MPL2 and MPL5 are the potential [VSS], a desired low potential [VSS] is output from each of the nodes QB and QA. Also, the gate voltages of the pMOS transistors MPL 1 and MPL 4 are fixed at the DC input voltage [VDD] and their potentials are acceptable if being the potential

[VDD] while the potentials at the nodes PB and PA are the low potential [VDD] and if the potentials are a low potential at which the pMOS transistors MPL1 and MPL4 can be sufficiently conductive while the potentials of the nodes PB and PA are the high potential [2×VDD]. That is, even if the voltages of the clocks CLKA and CLKB are input instead of the DC input voltage [VDD], operations being equivalent to those described above are performed. Moreover, even when the source electrode of the pMOS transistor MPL3 is connected to the node PB instead of the output terminal OUT and the source electrode of the pMOS transistor MPL6 is connected to the node PA instead of the output terminal OUT, operations being equivalent to those described above are performed.

As described above, according to the first embodiment, since a control voltage ct12 having an amplitude of the voltage [2×VDD] is input from the level shift circuits 12 and 13 to the nodes QA and QB of the charge-pump circuit 11, even when the potentials at the nodes PA and PB become the potential [2×VDD], the OFF state of the pMOS transistors MP2 and MP4 is maintained and, therefore, leakage of currents from the pMOS transistors MP2 and MP4 can be avoided. This also prevents a drop in the DC output voltage [2×VDD]. Moreover, as inputs of the level shift circuits 12 and 13, the potentials at the nodes PA and PB of the charge-pump circuit 11 are used and, therefore, even when the potentials at the nodes QB and QA of the level shift circuits 12 and 13 are high, it is made possible to keep the pMOS transistors MPL2 and MPL5 in an OFF state. As a result, flowing of through currents via the pMOS transistors MPL 2 and MPL5 can be prevented, thereby reducing power consumption in the power supply circuit.

Second Embodiment

Figure 3A:
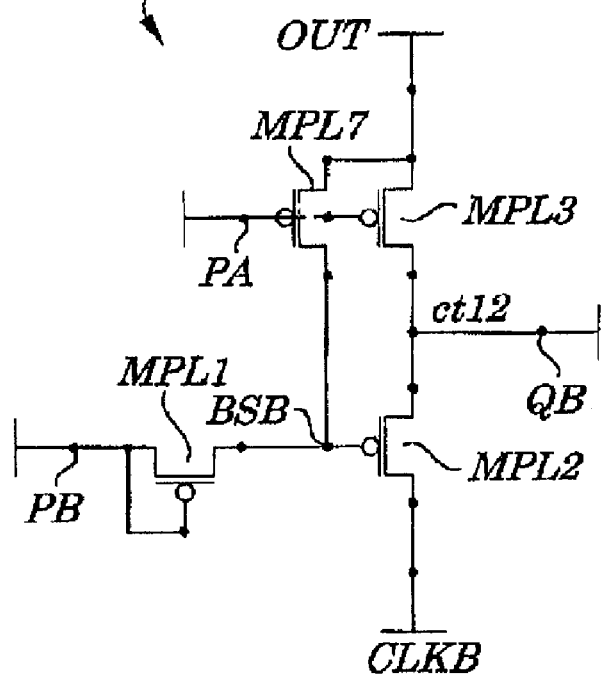
FIGS. 3A and 3B are a circuit diagram showing electrical configurations of each level shift circuit making up a power supply circuit according to the second embodiment of the present invention.
Figure 3B:
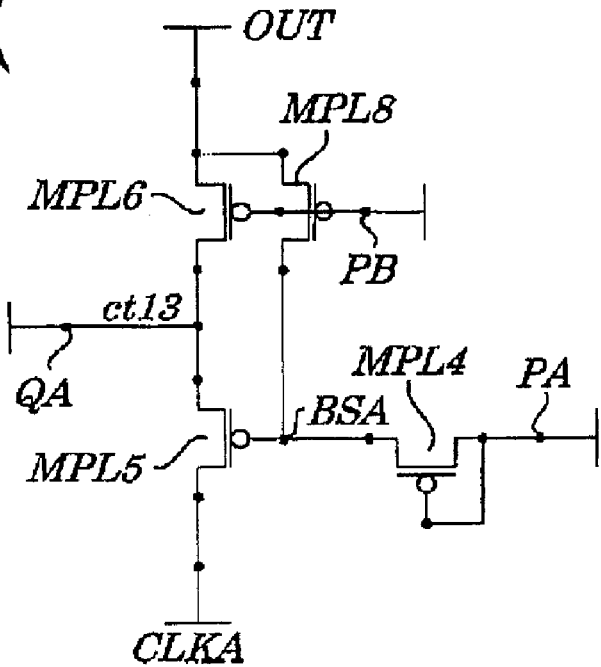

FIGS. 3A and 3B are a circuit diagram showing electrical configurations of each level shift circuit making up a power supply circuit according to the second embodiment of the present invention and FIG. 3A shows a circuit diagram showing the level shift circuit 12A installed, instead of the level shift circuit 12 shown in FIG. 1B, and FIG. 3B shows a circuit diagram showing the level shift circuit 13A installed instead of the level shift circuit 13 shown in FIG. 1C.

The level shift circuit 12A includes pMOS transistors MPL1, MPL2, MPL3 and MPL7. In the pMOS transistor MPL1, its source electrode is connected to a node PB, its drain electrode is connected to a node BSB, and its gate electrode is connected to the node PB. In the pMOS transistor PML2, its source electrode is connected to a node QB, its gate electrode is connected to the node BSB, and to its drain electrode is input a clock CLKB. In the pMOS transistor MPL3, its source electrode is connected to an output terminal OUT, its drain electrode is connected to the node QB, and the gate electrode is connected to a node PA. In the pMOS transistor 7, its source electrode is connected to an output terminal OUT, its drain electrode is connected to the node BSB, and its gate electrode is connected to the node PA.

The level shift circuit 13A includes pMOS transistors MPL4, MPL5, MPL6, and MPL8. In the pMOS transistor MPL4, its source electrode is connected to a node PA, its drain electrode is connected to a node BSA, and its gate electrode is connected to the node PA. In the pMOS transistor MPL5, its source electrode is connected to a node QA, its gate electrode is connected to the node BSA, and to the drain electrode is input a clock CLKA. In the pMOS transistor MPL6, its source electrode is connected to an output terminal OUT, its drain electrode is connected to the node QA, and its gate electrode is connected to a node PB. In the pMOS transistor MPL8, its source electrode is connected to an output terminal OUT, its drain electrode is connected to the node BSA, and its gate electrode is connected to the node PB.

In the power supply circuit of the second embodiment, as in the case of the power supply circuit of the first embodiment, operations shown in the time chart in FIG. 2 are performed, however, configurations of the level shift circuits 12A and 13A are different from those in the first embodiment and, therefore, part of the operations differs from one another.

That is, in the level shift circuit 12A, during the period B in FIG. 2, the potential at the node PA lowers to the level [VDD] and the potential at the node PB is boosted to the level [2×VDD]. The pMOS transistor MPL3 gets into an ON state and the node QB is charged so as to have the potential [2×VDD] at the node OUT. At this time, in the pMOS transistor MPL1 diode-connected to the node PB at a high potential, a potential at the node BSB, which has lowered to a low potential during the period A, cannot be controlled. On the other hand, the pMOS transistor MPL7 gets into an ON state, as in the case of the pMOS transistor MPL3, and, therefore, by boosting the potential at the node BSB to the potential [2×VDD], can make the pMOS transistor MPL2 to get into an OFF state. In this case, even when the potential at the node QB reaches a potential [2×VDD], the pMOS transistor MPL2 is kept in the OFF state. The phase in which operations of the level shift circuit 13A are performed is opposite to the phase in which operations of the level shift circuit 12A are performed.

As described above, according to the second embodiment, since control voltages ct12 and ct13 having an amplitude of the voltage [2×VDD] are input, respectively, from the level shift circuits 12A and 13A to the nodes QA and QB of the charge-pump circuit 11, even when the potentials at the nodes PA and PB become the potential [2×VDD], the OFF states of the pMOS transistors MP2 and MP4 are maintained and, therefore, leakage of currents from the pMOS transistor MP2 and MP4 can be avoided. This prevents a drop in the DC output voltage [2×VDD]. Moreover, as inputs of the level shift circuits 12A and 13B, the potentials at the nodes PA and PB of the charge-pump circuit 11 are used and, therefore, even when the potentials at the nodes QB and QA of the level shift circuits 12A and 13A are high, it is made possible to keep the pMOS transistors MPL2 and MPL5 in an OFF state. As a result, flowing of through currents via the pMOS transistors MPL 2 and MPL5 can be prevented, thereby reducing power consumption.

Third Embodiment

Figure 4A:
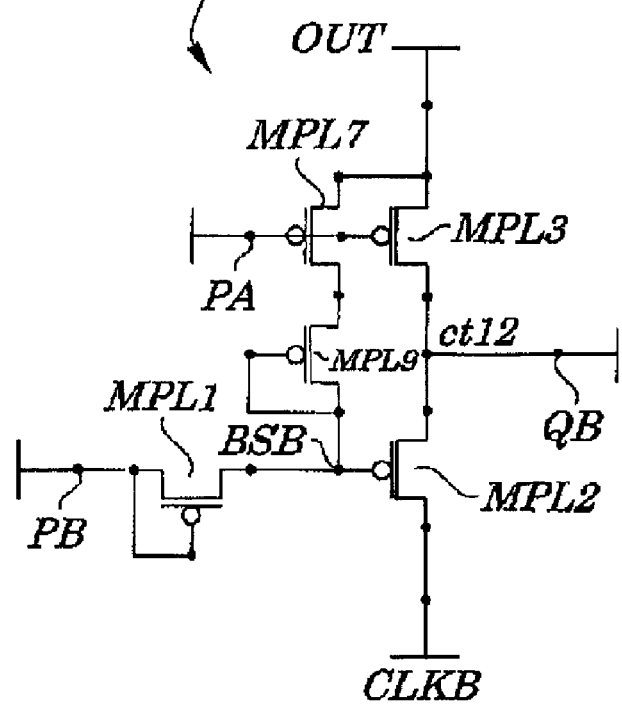
FIGS. 4A and 4B are a circuit diagram showing electrical configurations of each level shift circuit making up a power supply circuit according to the third embodiment of the present invention.
Figure 4B:
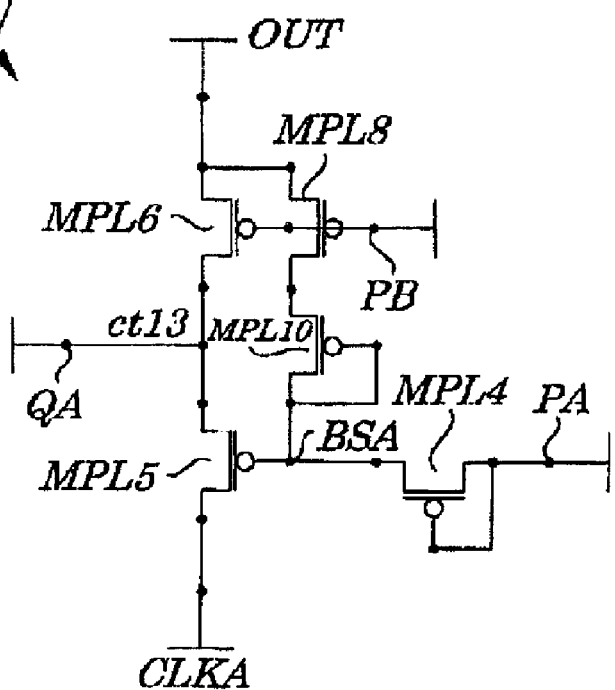

FIGS. 4A and 4B are a circuit diagram showing electrical configurations of each level shift circuit making up a power supply circuit of the third embodiment of the present invention and FIG. 4A shows a circuit diagram showing configurations of a level shift circuit 12B installed, instead of the level shift circuit 12 shown in FIG. 1B, and FIG. 4B shows a circuit diagram showing configurations of a level shift circuit 13B installed instead of the level shift circuit 13 shown in FIG. 1C.

The level shift circuit 12B includes pMOS transistors MPL1, MPL2, MPL3, MPL7 and MPL9. In the pMOS transistor MPL1, its source electrode is connected to a node PB, its drain electrode is connected to a node BSB, and its gate electrode is connected to the node PB. In the pMOS transistor MPL2, its source electrode is connected to a node QB, its gate is connected to the node BSB, and to its drain electrode is input a clock CLKB. In the pMOS transistor MPL3, its source electrode is connected to an output terminal OUT, its drain electrode is connected to the node QB, and its gate electrode is connected to a node PA. In the pMOS transistor MPL7, its source electrode is connected to the output terminal OUT and its gate electrode is connected to the node PA. In the pMOS transistor MPL9, its drain electrode and its gate electrode are connected to the node BSB and a drain electrode of the pMOS transistor MPL7 is connected to a source of the pMOS transistor MPL9.

The level shift circuit 13B includes pMOS transistors MPL4, MPL5, MPL6, MPL8, and MPL10. In the pMOS transistor MPL4, its source electrode is connected to a node PA, its drain electrode is connected to a node BSA, and its gate electrode is connected to the node PA. In the pMOS transistor MPL5, its source electrode is connected to a node QA, its gate electrode is connected to the node BSA and to its drain electrode is input a clock electrode CLKA. In the pMOS transistor MPL6, its source electrode is connected to an output terminal OUT, its drain electrode is connected to the node QA and its gate electrode is connected to a node PB. In the pMOS transistor MPL8, its source electrode is connected to the output terminal OUT, its gate electrode is connected to the node PB. In the pMOS transistor MPL10, its drain electrode and gate electrode are connected to the node BSA and the drain electrode of the pMOS transistor MPL8 is connected to the source electrode of the pMOS transistor MPL10.

In the power supply circuit of the third embodiment, as in the case of the power supply circuit of the first embodiment, operations shown in the time chart in FIG. 2 are performed, however, configurations of the level shift circuits 12B and 13B are different from those in the first embodiment and, therefore, part of the operations differs from one another.

That is, in the level shift circuit 12B, during the period B, the potential at the node PA lowers to the potential [VDD] and the potential at the node PB is boosted to the potential [2×VDD]. The pMOS transistor MPL3 and the pMOS transistor MPL7 get into an ON state and the node QB is charged so as to have the potential [2×VDD] at the node OUT. At this time point, the potential at the node BSB is boosted to a potential being lower by a threshold voltage of the MPL 9 than the level [2×VDD]. The third embodiment differs from the second embodiment in that the threshold voltage of the pMOS transistor MPL9 is used. When the potential at the node QB reaches the level [2×VDD], since a voltage having about the threshold voltage of the MPL9 is applied between the gate and source of the pMOS transistor MPL2, the MPL2 does not get into the OFF state, causing leakage of currents to flow. On the other hand, when the potential at the node PB lowers to the level [VDD], since the potential at the node BSB is originally lower than the potential [2×VDD] at the source electrode, the potential lowers rapidly and it is possible to cause conduction through the transistor MPL2 induced by the bootstrap effect to occur rapidly. Moreover, the phase in which operations of the level shift circuit 13B are performed is opposite to the phase in which operations of the level shift circuit 12B are performed.

As described above, according to the third embodiment, since control voltages ct12 and ct13 having an amplitude of the voltage [2×VDD] are input from the level shift circuits 12B and 13B respectively to the nodes QA and QB of the charge-pump circuit 11, even when the potentials at the nodes PA and PB become the potential [2×VDD], the OFF state of the pMOS transistors MP2 and MP4 is maintained and, therefore, leakage of currents from the pMOS transistor MP2 and MP4 can be avoided. This prevents a drop in the DC output voltage [2×VDD]. Moreover, when the potentials at the output nodes QB and QA are high, the gate potentials of the pMOS transistors MPL2 and MPL5 can be kept at a potential being lower by about the threshold voltage than its high level and, therefore, when the potential at the output node is made to lower to a low level, more rapid operations of lowering the gate potential are made possible.

Fourth Embodiment

Figure 5A:
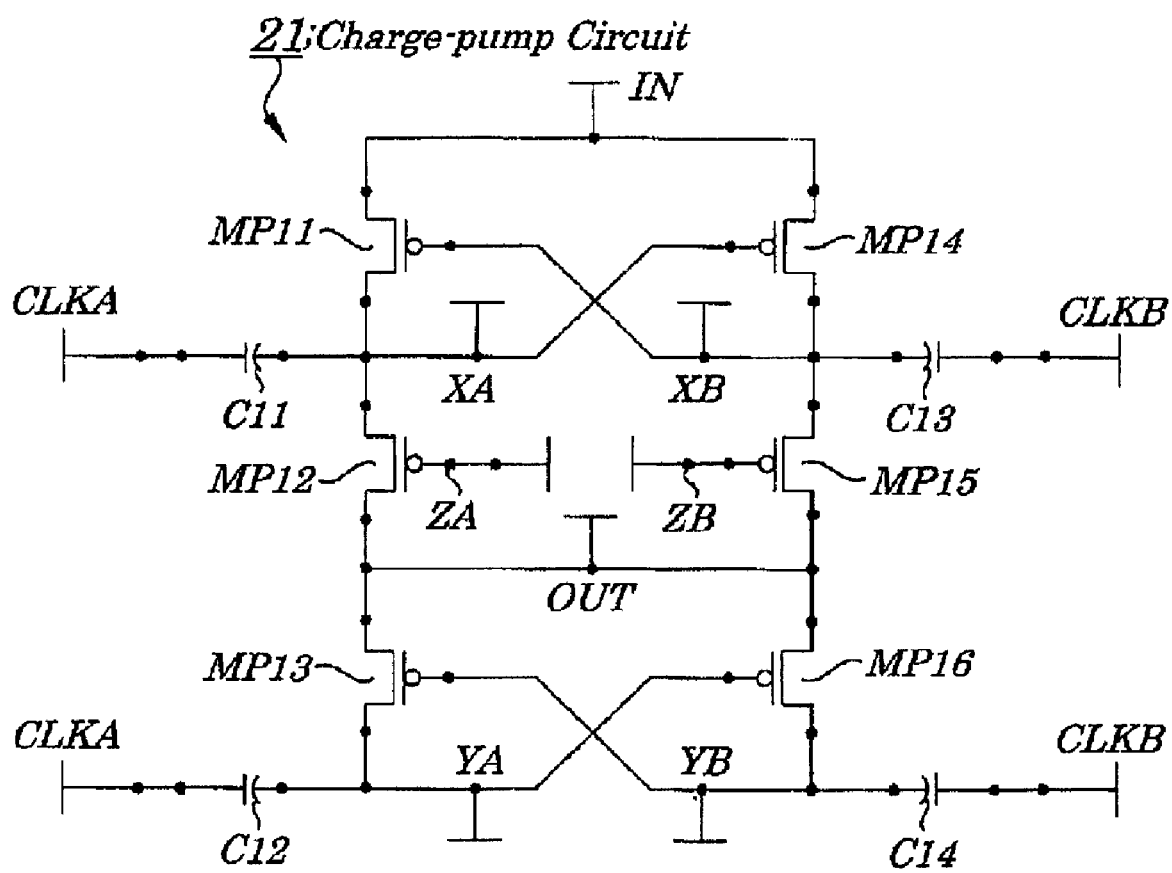
FIGS. 5A, 5B, and 5C are a circuit diagram showing electrical configurations of each level shift circuit making up a power supply circuit according to the fourth embodiment of the present invention.
Figure 5B:
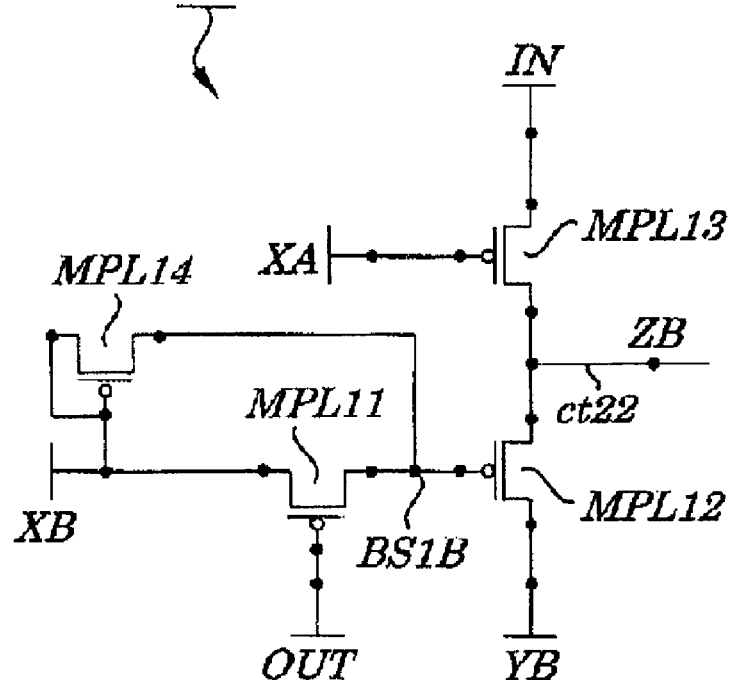
Figure 5C:
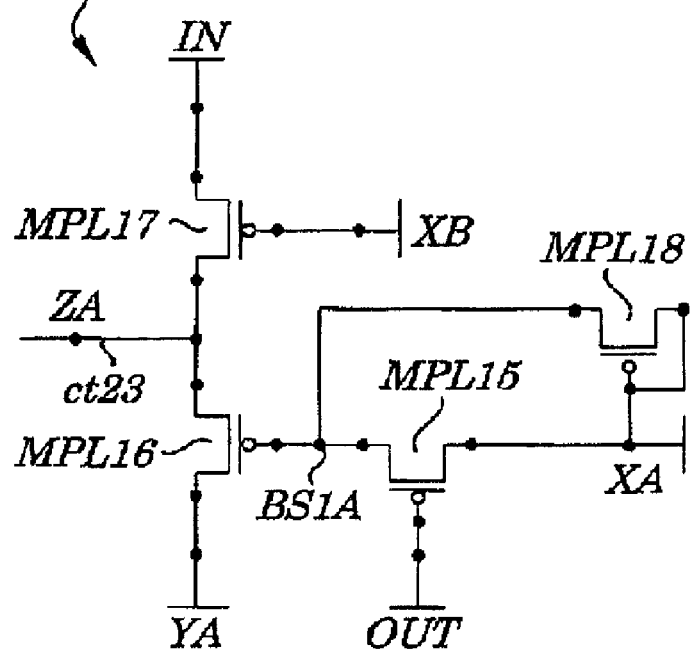

FIGS. 5A, 5B, and 5C are a circuit diagram showing electrical configurations of a power supply circuit according to the fourth embodiment of the present invention and the power supply circuit is made up of a charge-pump circuit 21 shown in FIG. 5A and a level shift circuit 22 shown in FIG. 5B and a level shift circuit 23 shown in FIG. 5C. The charge-pump circuit 22 includes pMOS transistors MP11, MP12, MP13, MP14, MP15, and MP16 and capacitors C11, C12, C13, and C14. In the pMOS transistor MP11, its source electrode is connected to an input terminal IN, its drain electrode is connected to a node XA, and its gate electrode is connected to a node XB. In the pMOS transistor MP12, its source electrode is connected to the node XA, its drain electrode is connected to an output terminal OUT, and its gate electrode is connected to a node ZA. To the output terminal OUT is output a first generated voltage. In the pMOS transistor MP13, its source electrode is connected to the output terminal OUT, its drain electrode is connected to a node YA, and its gate electrode is connected to a node YB. To these nodes YA and YB is output a second generated voltage.

In the pMOS transistor MP14, its source electrode is connected to an input terminal IN, its drain electrode is connected to the node XB, and its gate electrode is connected to the node XA. In the pMOS transistor MP15, its source electrode is connected to the node XB, its drain electrode is connected to the output terminal OUT, and its gate electrode is connected to a node ZB. In the pMOS transistor MP16, its source electrode is connected to the output terminal OUT, its drain electrode is connected to the node YB, and its gate electrode is connected to the node YA. In the capacitor C11, its low-voltage-side electrode is connected to the node XA and to its high-voltage-side electrode is input a clock CLKA. In the capacitor C12, its low-voltage-side electrode is connected to the node YA and to its high-voltage-side electrode is input a clock CLKA. In the capacitor C13, its low-voltage-side electrode is connected to the node XB and to its high-voltage-side electrode is input a clock CLKB. In the capacitor C14, its low-voltage-side electrode is connected to the node YB and to its high-voltage-side electrode is input a clock CLKB. The above pMOS transistors MP13 and MP16 and capacitors C12 and C14 make up a voltage generating circuit.

The level shift circuit 22 includes pMOS transistors MPL11, MPL12, MPL13 and MPL 14. In the pMOS transistor MPL11, its source electrode is connected to a node XB, its drain electrode is connected to a node BS1B, and its gate electrode is connected to an output terminal OUT. In the pMOS transistor MPL12, its source electrode is connected to a node ZB, its drain electrode is connected to the node YB, and its gate electrode is connected to the node BS1B. In the pMOS transistor MPL13, its source drain is connected to an input terminal IN, its drain electrode is connected to the node ZB, and its gate electrode is connected to a node XA. In the pMOS transistor MPL14, its drain electrode and its gate electrode are connected to the node XB and its source electrode is connected to the node BS1B, In the level shift circuit 22, by applying a control voltage ct22 at the same level as the DC input voltage [VSS] to the gate electrode of the pMOS transistor MP15, the pMOS transistor MP15 is made to get into an OFF state, while, by applying a control voltage ct22 at the same level as the potential [VSS−2×VDD] (second generated voltage) at the node YB, the pMOS transistor MP15 is made to get into an ON state.

The level shift circuit 23 is made up of pMOS transistors MPL15, MPL16, MPL17, and MPL18. In the pMOS transistor MPL15, its source electrode is connected to a node XA, its drain electrode is connected to a node BS1A, and its gate is connected to an output terminal OUT. In the pMOS transistor MPL16, its source electrode is connected to a node ZA, its drain electrode is connected to a node YA, and its gate electrode is connected to a node BS1A. In the pMOS transistor MPL17, its source electrode is connected to its input terminal IN, its drain electrode is connected to the node ZA, and its gate electrode is connected to a node XB. In the pMOS transistor MPL18, its drain and gate electrodes are connected to the node XA and its source electrode is connected to a node BS1A. In the level shift circuit 23, by applying a control voltage ct23 at the same level as a DC input voltage [VSS] to the gate electrode of the pMOS transistor MP12, the pMOS transistor MP12 is made to get into an OFF state, while, by applying a control voltage ct23 at the same level as the potential [VSS−2×VDD] (second generated voltage) at the node YA, the pMOS transistor MP12 is made to get into an ON state.

Figure 6:
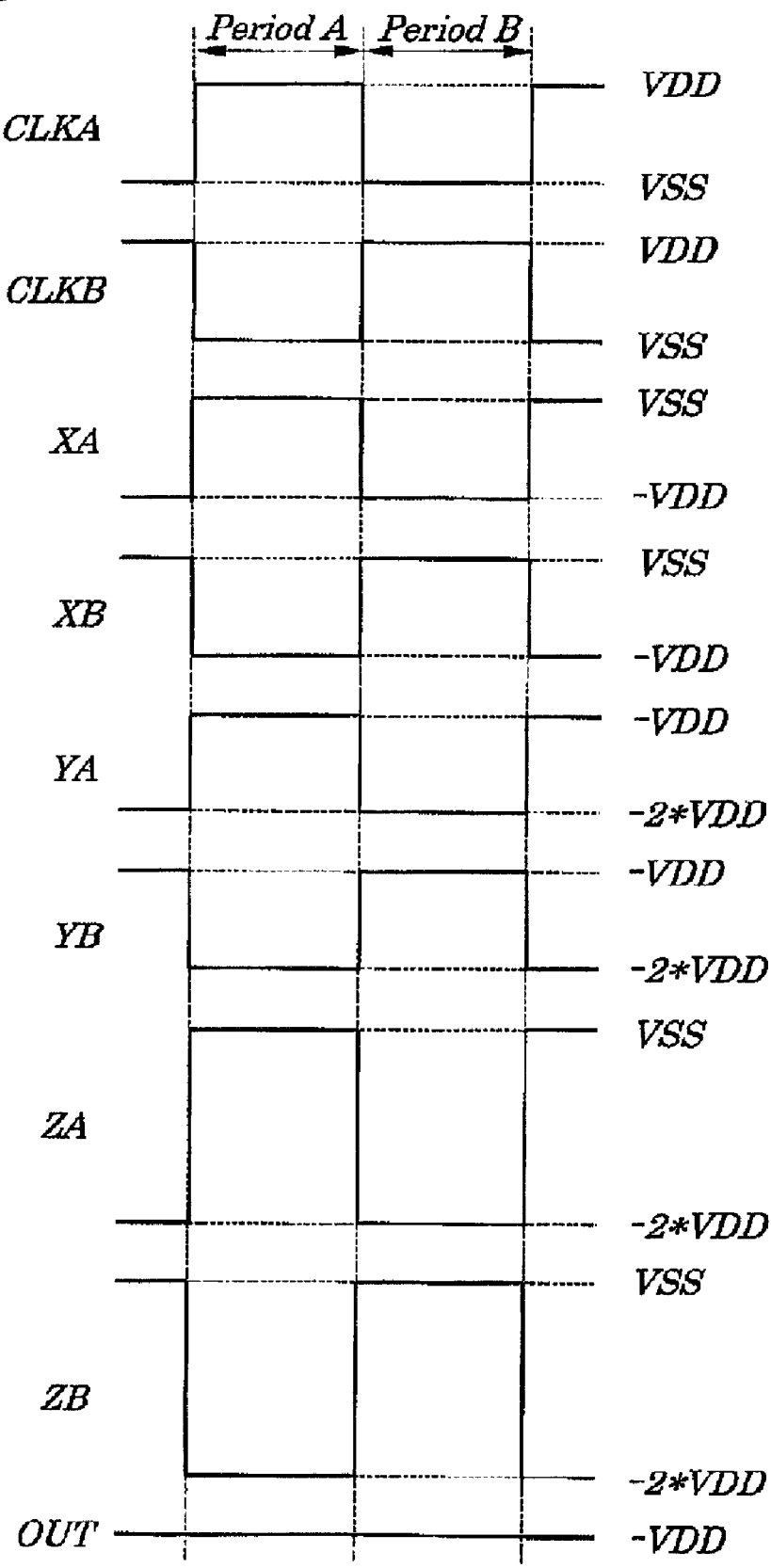
FIG. 6 is a time chart explaining operations of the power supply circuit shown in FIG. 5.

FIG. 6 is a time chart explaining operations of the power supply circuit shown in FIG. 5. Operations of the power supply circuit of the embodiment are described by referring to FIG. 6. During the period A, the clock CLKA has a high potential VDD and the clock CLKB has a low potential VSS. Potentials at the nodes XA, YA, ZA, XE, YB, and ZB change in synchronization with potentials of the clocks CLKA and CLKB and the potentials at the nodes XA, YA, and ZA become high and potentials at the nodes XB, YB, and ZB become low. Then, in the charge-pump circuit 21, the pMOS transistors MP11, MP15, and MP13 get into an ON state and the pMOS transistors MP14, MP12, and MP16 get into an OFF state. Since the pMOS transistor MP11 is in the ON state, the node XA is charged so as to have the potential [VSS] and, if the pMOS transistors MP15 and MP13 are in the ON state, the nodes XB and YA are charged so as to have the generated voltage [VDDM] (that is, at the potential [−VDD]).

Next, during the period B, the pMOS transistors MP11, MP15, and MP13 get into an OFF state and the pMOS transistors MP14, MP12, and MP16 get into an ON state. Since the potential of the clock lowers to the low potential [VSS], the potential at the node XA coupled by the capacitor C11 lowers by the amplitude [VDD] of the clock CLKA and to the negative potential [−VDD]. Similarly, the potential at the node YA coupled by the capacitor C12 also lowers and the node YA is charged so that its potential is lower by the voltage [VDD] than the potential [VDDM] and the potential at the node YA becomes the potential [−2×VDD]. When the pMOS transistors MP12 and MP16 are in the ON state, the output terminal OUT and node YB are charged so as to have the potential at the node XA [−VDD].

In the level shift circuit 22, during the period A, the potential at the node XA of the charge-pump circuit 21 becomes the potential [VSS] and, the pMOS transistor MPL13 gets into an OFF state since the voltage Vgs between its gate and source is 0V, Moreover, the potential at the node XB lowers to the potential [−VDD] and the potential at the node BS1B lowers to a potential being higher by about a gate threshold voltage than the potential [VDDM](=[−VDD]). While the potential at the node ZB is kept at the high potential [VSS] being the previous state during the period A, the pMOS transistor MPL12 starts to be conductive when a voltage between its gate and source exceeds its gate threshold voltage. At this time, since the potential at the node YB has lowered to the low potential [VDDM−VDD=−2×VDD], the node ZB is charged so as to have the potential [−2×VDD] In order to keep the pMOS transistor MPL12 in the ON state, it is necessary that the potential at the node BS1B becomes lower than the potential [−2×VDD]. With the lowering of the potential at the node YB and of the potential at the node ZB, in the node BS1B, a force is exerted to lower a potential owing to the bootstrap effect. When the potential at the node BS1B lowers to the level ([−VDD+gate threshold voltage], the pMOS transistor MPL11 gets into an ON state and, therefore, the node BS1B gets into a floating state and the potential at the node BS1B lowers below the potential [−2×VDD] with a potential difference between the node BS1B and the node ZB being kept.

Next, during the period B, since the potential at the node XA in the charge-pump circuit 21 lowers to the potential [−VDD], the pMOS transistor MPL13 gets into an ON state and the potential at the node ZB is boosted to the potential [VSS]. At this time point, since the potential at the node XB is boosted to the potential [VSS], the pMOS transistor MPL11 gets into an ON state and the potential at the node BS1B connected to the gate of the pMOS transistor MPL12 becomes the potential [VSS]. Therefore, even if the potential at the node ZB reaches the level [VSS], the pMOS transistor MPL12 is still kept in the OFF state. Moreover, the phase in which operations of the level shift circuit 13 are performed is opposite to the phase in which operations of the level shift circuit 12 are performed.

The pMOS transistor MPL14 making up the level shift circuit 22, as in the case of the pMOS transistor MPL11, has a function of transferring the potential at the node XB to the node BS1B. However, the main function is performed while the circuit is operating, that is, when the output terminal OUT is not yet charged so as to have the potential [−VDD]. First, the case where no pMOS transistor MPL114 is mounted is described. Generally, a node having not yet been charged starts its operation at 0V at a time of its driving. The potential of the node VB having started its operation at 0V during the period B lowers, during the period A, to the potential [−VDD] due to coupling with the capacitor C13. However, if the potential at the output terminal OUT is 0V, since the pMOS transistor MPL11 is in an OFF state, the potential at the node BS1B cannot be lowered. As a result, since the pMOS transistor MPL12 is not conductive, the potential at the node ZB of the level shift circuit 22 does not lower to a low level and, therefore, the charge shift circuit 21 does not operate properly.

On the other hand, when the pMOS transistor MPL14 is mounted, even when the output terminal OUT starts its operations at 0V, with the lowering of the potential [−VDD] at the node XB, the potential at the node BS1B is lowered to about the level ([−VDD]+gate threshold voltage). Therefore, if the potential at the node ZB is kept at the high potential [VSS] being its previous state, the pMOS transistor MPL12 gets into an ON state and the potential at the node ZB becomes the low level [−2×VDD].

Moreover, problem points occurring when the pMOS transistor MPL14 is mounted and no pMOS transistor MPL11 is mounted are described. The problem with the pMOS transistor MPL14 is that, when the potential at the node XB lowers to a potential being lower than the low potential [−VDD] that the node XB can have, the potential at the node BS1B becomes uncontrollable. That is, after the potential at the node BS1B is lowered to the low level [−2×VDD] being lower than the potential at the node ZB due to the bootstrap effect of the pMOS transistor MPL12, the potential at the node BS1B cannot be boosted by raising the potential at the node XB to be the level [VSS], thus making it impossible to let the pMOS transistor MPL11 get into an OFF state. At this time, if the pMOS transistor MPL11 is connected in parallel to the pMOS transistor MPL 14, with the boosting of the potential at the node XB to the potential [VSS], the pMOS transistor MPL11 gets into an ON state and, as a result, the potential at the node BS1B is boosted to the potential [VSS] and the pMOS transistor MPL12 gets into an OFF state. The same operations in the pMOS transistor MPL14 are performed in the pMOS transistor MPL18 making up the level shift circuit 23.

Moreover, to the gate of the pMOS transistor MPL11 making up the level shift circuit 22 is input the DC output voltage (potential [−VDD]) and, at this time point, the potential to be input therein is acceptable if it is the potential [−VDD] when the potential at the node XB is low [−VDD] and if it is a low potential at which the pMOS transistor MPL11 becomes sufficiently conductive when the potential at the node XB is the high potential [VSS]. That is, instead of the DC output voltage [VDDM], even when the potential [−2×VDD] at the node YA is input, operations equivalent to the above are performed. The same operations in the pMOS transistor MPL1 are performed in the pMOS transistor MPL15 making up the level shift circuit 23. Even when the source electrode of the pMOS transistor MPL13 is connected to the node XB instead of the input terminal IN and the source electrode of the pMOS transistor MPL17 is connected to the node XA instead of the input terminal IN, operations equivalent to the above are performed.

As described above, according to the fourth embodiment, to the gates of the pMOS transistors MP12 and MP15 in the charge-pump circuit 21 is input a control signal having an amplitude being expanded to be a voltage [2×VDD] from the level shift circuits 22 and 23 and, therefore, even if the potentials at the nodes XA and XB become the potential [VSS], the pMOS transistors MP12 and MP15 can be kept in the OFF state. As a result, leakage of currents from the pMOS transistors MP12 and MP15 can be avoided. This prevents a drop (shift to a high level potential) in the DC output voltage [VDDM] (potential [−VDD]). Moreover, as inputs to the level shift circuits 22 and 23, voltages at the nodes XB and XA in the charge-pump circuit 21 are used and, therefore, even when the potentials at the nodes ZB and ZA in the level shift circuits 22 and 23 are high, the pMOS transistors MPL12 and MPL16 can be kept in the OFF state. Therefore, this prevents flowing of through currents via the pMOS transistors MPL12 and MPL 16 and can reduce power consumption. Also, since the pMOS transistors MPL14 and MPL 18 being diode-connected to each other are connected in parallel to the pMOS transistors MPL 11 and MPL 15 in the level shift circuits 22 and 23, even if the DC output voltage [VDDM] takes an indefinite value at a time of driving of the power supply circuit, the level shift circuits 22 and 23 and the charge pump circuit 21 are driven normally.

Fifth Embodiment

Figure 7A:
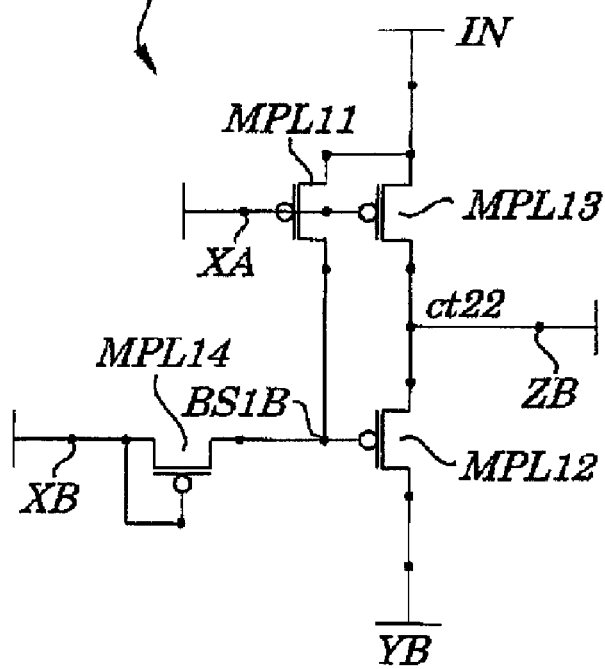
FIGS. 7A and 7B are a circuit diagram showing electrical configurations of each level shift circuit making up a power supply circuit according to the fifth embodiment of the present invention.
Figure 7B:
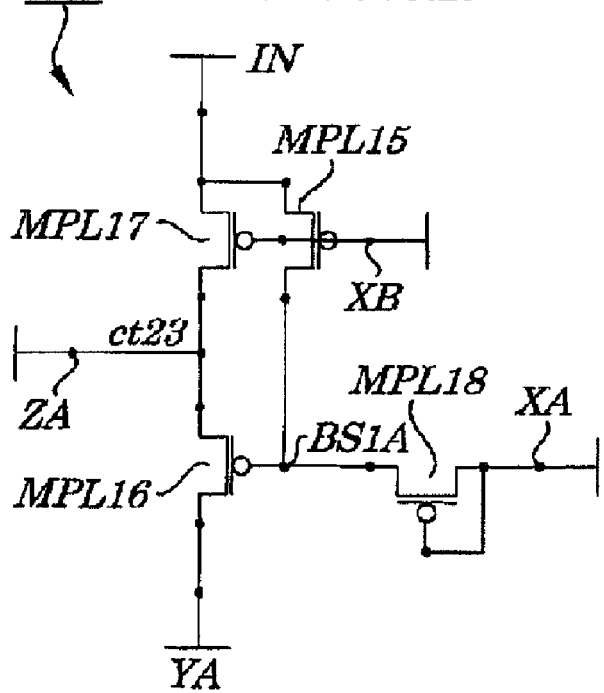

FIGS. 7A and 7B are a circuit diagram showing electrical configurations of a power supply circuit according to the fifth embodiment of the present invention and FIG. 7A is a circuit diagram showing a level shift circuit 22A applied instead of the level shift circuit 22 shown in FIG. 5B and FIG. 7B is a circuit diagram showing a level shift circuit 23A applied instead of the level shift circuit 23 shown in FIG. 5C.

The level shift circuit 22A includes pMOS transistors MPL14, MPL12, MPL13, and MPL11. In the pMOS transistor MPL14, its source electrode is connected to a node XB, its drain electrode is connected to a node BS1B, and its gate electrode is connected to the node XB. In the pMOS transistor MPL12, its source electrode is connected to a node ZB, its gate electrode is connected to the node BS1B, its drain electrode is connected to a node YB. In the pMOS transistor MPL13, its source electrode is connected to an input terminal IN, its drain electrode is connected to the node ZB, and its gate electrode is connected to a node XA. In the pMOS transistor MPL11, its source electrode is connected to an input terminal IN, its drain electrode is connected to the node BS1B, and its gate electrode is connected to the node XA. The level shift circuit 23A is made up of pMOS transistors MPL18, MPL16, MPL17, and MPL15. In the pMOS transistor MPL18, its source electrode is connected to the node XA, its drain electrode is connected to the node BS1A, its gate electrode is connected to the node XA. In the pMOS transistor MPL16, its source electrode is connected to a node ZA, its gate is connected to a node BS1A, and its drain electrode is connected to a node YA. In the pMOS transistor MPL17, its source electrode is connected to an input terminal IN, its drain is connected to the node ZA, and its gate is connected to a node XB. In the pMOS transistor MPL15, its source electrode is connected to an input terminal IN, its drain is connected to the node BS1A, and its gate electrode is connected to the node XB.

In the power supply circuit of the fifth embodiment, as in the case of the power supply circuit of the fourth embodiment, operations shown in the time chart in FIG. 6 are performed, however, configurations of the level shift circuits 22A and 23A are different from those in the fourth embodiment and, therefore, part of the operations differs from one another.

That is, in the level shift circuit 22A, during the period B shown in FIG. 6, since the potential at the node XA of the charge-pump circuit 21 lowers to the potential [−VDD], the pMOS transistor MPL13 gets into an ON state and the potential at the node ZB is boosted to the potential [VSS]. At this time point, the potential at the node XB is boosted to the potential [VSS], however, if the potential at the node BS1B remains low, in the diode-connected pMOS transistor MPL14, it is impossible to boost the potential at the node BS1B. On the other hand, since the pMOS transistor MPL11 gets into an ON state as in the case of the MPL13, by boosting the potential at the node BS1B to the potential [VSS], the pMOS transistor MPL12 can be in an OFF state. As a result, even if the potential at the node ZB reaches the potential [VSS], the pMOS transistor MPL12 can be kept in the OFF state. Moreover, the phase in which operations of the level shift circuit 23A are performed is opposite to the phase in which operations of the level shift circuit 22A are performed.

As described above, according to the fifth embodiment, to the gates of the pMOS transistors MP12 and MP15 in the charge-pump circuit 21 is input a control signal having an amplitude being expanded to be the voltage [233 VDD] from the level shift circuits 22A and 23A and, therefore, even if the potentials at the nodes XA and XB become the potential [VSS], the pMOS transistors MP12 and MP15 can be kept in the OFF state. As a result, leakage of currents from the pMOS transistors MP12 and MP15 can be avoided. This prevents a drop (shift to high level) in the DC output potential [VDDM] (potential [−VDD]). As inputs of the level shift circuits 22A and 23A, the potentials at the nodes PA and PB of the charge-pump circuit 11 are used and, therefore, even when the potentials at the nodes ZB and ZA of the level shift circuits 22A and 23A are high, it is made possible to still keep the pMOS transistors MPL12 and MPL16 in an OFF state. As a result, flowing of through currents via the pMOS transistors MPL12 and MPL16 can be prevented, thereby reducing power consumption.

Sixth Embodiment

Figure 8A:
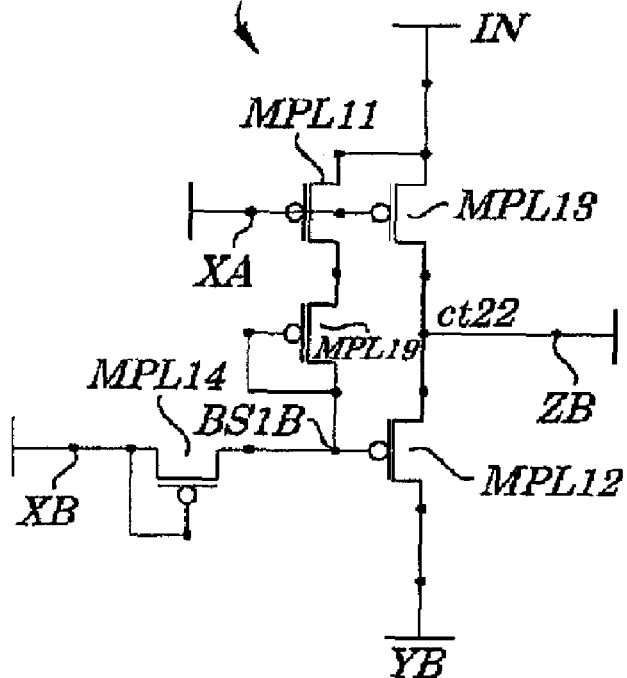
FIGS. 8A and 8B are a circuit diagram showing electrical configurations of each level shift circuit making up a power supply circuit according to the sixth embodiment of the present invention.
Figure 8B:
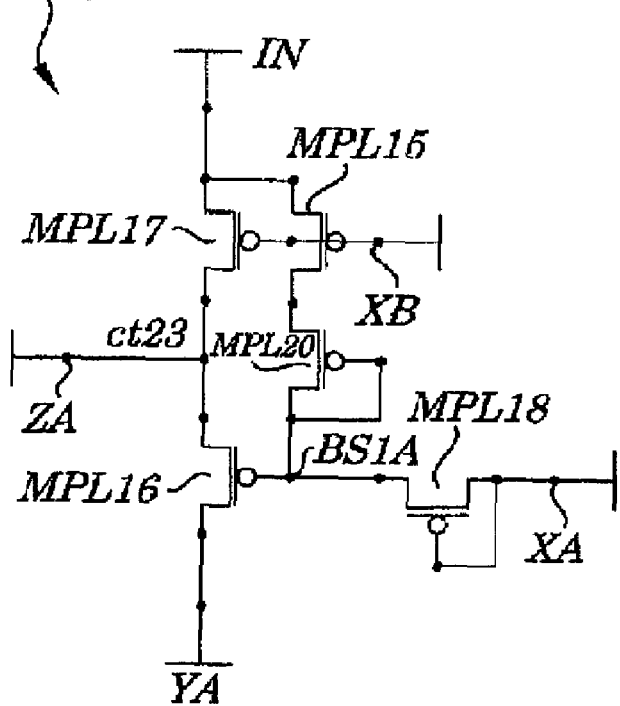

FIGS. 8A and 8B are a circuit diagram showing electrical configurations of level shift circuits making up a power supply circuit according to the sixth embodiment of the present invention and FIG. 8A is a circuit diagram showing a level shift circuit 22B applied instead of the level shift circuit 22 shown in FIG. 5B and FIG. 8B is a circuit diagram showing a level shift circuit 23B applied instead of the level shift circuit 23 shown in FIG. 5C.

The level shift circuit 22B includes pMOS transistors MPL14, MPL12, MPL13, MPL11, and MPL19. In the pMOS transistor MPL14, its source electrode is connected to a node XB, its drain is connected to a node BS1B, and its gate is connected to the node XB. In the pMOS transistor MPL12, its source electrode is connected to a node ZB, its gate is connected to a node BS1B, and its drain electrode is connected to a node YB. In the pMOS transistor MPL13, its source electrode is connected to an input terminal IN, its drain electrode is connected to the node ZB, and its gate electrode is connected to a node XA. In the pMOS transistor MPL11, its source electrode is connected to an input terminal IN and its gate electrode is connected to the node XA. In the pMOS transistor MPL19, its drain electrode and its gate electrode are connected to the node BS1B. The drain electrode of the pMOS transistor MPL11 is connected to the source electrode of the pMOS 19. The level shift circuit 23B is made up of the pMOS transistors MPL18, MPL16, MPL15 and MPL20. In the pMOS transistor MPL18, its source electrode is connected to a node XA and its drain electrode is connected to the node BS1A, and its gate is connected to the node XA. In the pMOS transistor MPL16, its source electrode is connected to a node ZA, its gate electrode is connected to the node BS1A, and its drain electrode is connected to a node YA. In the pMOS transistor MPL17, its source electrode is connected to an input terminal IN, its drain electrode is connected to the node ZA, and its gate electrode is connected to a node XB. In the pMOS transistor MPL15, its source electrode is connected to the input terminal IN, its drain electrode and its gate electrode are connected to the node XB. In the pMOS transistor MPL20, its drain electrode and its gate electrode are connected to the node BS1A and the drain electrode of the pMOS transistor MPL15 is connected to the source electrode of the pMOS transistor MPL20.

In the power supply circuit of the sixth embodiment, as in the case of the power supply circuit of the fourth embodiment, operations shown in the time chart in FIG. 6 are performed, however, configurations of the level shift circuits 22B and 23B are different from those in the fourth embodiment and, therefore, part of the operations differs from one another.

That is, in the level shift circuit 22B, during the period B shown in FIG. 6, since the potential at the node XA of the charge-pump circuit 21 lowers to the potential [−VDD], the pMOS transistor MPL13 gets into an ON state and the potential at the node ZB is boosted to the potential [VSS]. At this time, the potential at the node BS1B is boosted to a potential being lower by a threshold voltage of the MPL19 than the potential [VSS]. This is a result from using the MPL19 in the sixth embodiment, which is a point being different from operations in the fifth embodiment. When the potential at the node ZB reaches the potential [VSS], the MPL12 does not get into an OFF state since a voltage being about a threshold voltage of the MPL19 is applied between its gate and source of the MPL12, and, as a result, leakage currents flow. On the other hand, when the potential at the node PB lowers to the level [−VDD], since the potential at the node BS1B is originally lower than the potential [VSS] at the source electrode, the potential lowers rapidly and it is possible to cause conduction through the transistor MPL2 induced by the bootstrap effect to occur rapidly. Moreover, the phase in which operations of the level shift circuit 13 are performed is opposite to the phase in which operations of the level shift circuit 12 are performed.

As described above, according to the sixth embodiment, to the gates of the pMOS transistors MP12 and MP15 in the charge-pump circuit 21 is input a control signal having an amplitude being expanded to be the voltage [2×VDD] from the level shift circuits 22B and 23B and, therefore, even if the potentials at the nodes XA and XB become the potential [VSS], the pMOS transistors MP12 and MP15 can be kept in the OFF state. As a result, leakage of currents from the pMOS transistors MP12 and MP15 can be avoided. This prevents a drop (shift to a high level potential) in the DC output voltage [VDDM] (at potential [−VDD]). Moreover, when the potentials at the output nodes ZB and ZA are high, the gate potentials of the pMOS transistors MPL2 and MPL5 can be kept at a level being lower by about the threshold voltage than its high level and, therefore, when the potential at the output node is made to lower to a low level, more rapid operations to lower the gate potential are made possible.

Seventh Embodiment

FIGS. 9A, 9B, 9C, 9D, and 9E each are a circuit diagram showing electrical configurations of a power supply circuit according to the seventh embodiment of the present invention. The power supply circuit of the seventh embodiment includes a charge-pump circuit 31 shown in FIG. 9A, a level shift circuit 32 shown in FIG. 9B, a level shift circuit 33 shown in FIG. 9C, a level shift circuit 34 shown in FIG. 9D, and a level shift circuit 35 shown in FIG. 9E. The charge-pump circuit 31 has a plurality of charge-pump circuits which is cascaded in a manner in which a boosted voltage generated by a front charge-pump circuit is input, as a DC input voltage to a rear charge-pump circuit and a phase of each of clocks to be input to each of capacitors of the charge-pump circuit connected at a rear stage is opposite to a phase of each of clocks to be input to each of capacitors of the charge-pump circuit connected at the front stage. That is, the charge-pump circuit 31 is made up of pMOS transistors MP21, MP22, MP23, MP24, MP25, and MP26 and capacitors C21, C22, C23, and C24. In the pMOS transistor MP21, its source electrode is connected to an output terminal OUT, its drain electrode is connected to a node SB, and its gate electrode is connected to a node SA. In the pMOS transistor MP22, its source electrode is connected to the node SB, its drain electrode is connected to a node PA, and its gate electrode is connected to a node RB. In the pMOS transistor MP23, its source electrode is connected to the node PA, its drain electrode is connected to an input terminal IN, and its gate electrode is connected to a node QA.

In the pMOS transistor MP24, its source electrode is connected the an output terminal OUT, its drain is connected to the node SA, and its gate electrode is connected to a node SB. In the pMOS transistor MP25, its source electrode is connected to the node SA, its drain electrode is connected to a node PB, and its gate electrode is connected to the node RA. In the pMOS transistor MP26, its source electrode is connected to the node PB, its drain electrode is connected to an input terminal IN, and its gate electrode is connected to a node QB. In the capacitor C21, its high-voltage-side electrode is connected to the node SB and to the low-voltage-side electrode is input a clock CLKB. In the capacitor C23, its high-voltage-side electrode is connected to the node PA and to its low-voltage-side electrode is input a clock CLKA. In the capacitor C25, its high-voltage-side electrode is connected to the node SA and to its low-voltage-side electrode is input a clock CLKA. In the capacitor C24, its high-voltage-side electrode is connected to the node PB and to the low-voltage-side electrode is input the clock CLKB.

The level shift circuit 32 is made up of pMOS transistors MPL27, MPL28, and MPL29. In the pMOS transistor MPL27, its source electrode is connected to a node SB, its drain electrode is connected to a node BS2B, and its gate electrode is connected to a node PA. In the pMOS transistor MPL28, its source electrode is connected to a node RB, its drain electrode is connected to a node PR, and its gate electrode is connected to a node BS2B. In the pMOS transistor MPL29, its source electrode is connected to an output terminal OUT, its drain electrode is connected to the node RB, and its gate electrode is connected to a node SA. The level shift circuit 32, by applying a control voltage ct32 being at the same level as the potential [3×VDD] at the output terminal OUT to the gate electrode of the pMOS transistor MP22, makes the pMOS transistor MP22 get into an OFF state, while the level shift circuit 32, by applying a control voltage ct32 being at the potential [VDD] obtained by subtracting a voltage [2×VDD] being twice higher than the high potential of the clock CLKB from a voltage at the output terminal OUT to the gate electrode of the pMOS transistor MP22, makes the pMOS transistor NP22 get into an ON state.

The level shift circuit 33 is made up of pMOS transistors MPL30, MPL31, and MPL32. In the pMOS transistor MPL30, its source electrode is connected to a node SA, its drain electrode is connected to a node BS2A, and its gate electrode is connected to a node PB. In the pMOS transistor MPL31, its source electrode is connected to a node RA, its drain electrode is connected to a node PA, and its gate electrode is connected to a node BS2A. In the pMOS transistor MPL32, its source electrode is connected to an output terminal OUT, its drain electrode is connected to the node RA, and its gate electrode is connected to a node SB. The level shift circuit 33, by applying a control voltage ct33 being at the same level as the potential [3×VDD] at the output terminal OUT to the gate electrode of the pMOS transistor MP25, makes the pMOS transistor MP25 get into an OFF state, while the level shift circuit 33, by applying a control voltage ct33 being at the potential [VDD] obtained by subtracting a voltage [2×VDD] being twice higher than the high potential of the clock CLKB from a voltage at the output terminal OUT to the gate electrode of the pMOS transistor MP25, takes the pMOS transistor MP25 get into an ON state.

The level shift circuit 34 is made up of pMOS transistors MPL21, MPL22, and MPL23. In the pMOS transistor MPL21, its source electrode is connected to a node PB, its drain electrode is connected to a node BSB, and its gate electrode is connected to an input terminal IN. In the pMOS transistor MPL22, its source electrode is connected to a node QB, its gate electrode is connected to the node BSB, and to its drain is input a clock CLKB. In the pMOS transistor MPL23, its source electrode is connected to the node PB, its drain electrode is connected to the node QB, and its gate electrode is connected to a node PA. The level shift circuit 34, by applying a control voltage ct34 being at the same level as the potential [2×VDD] at the node PB to the gate electrode of the pMOS transistor MP26, makes the pMOS transistor MP26 get into an OFF state, while the level shift circuit 34, by applying a control voltage ct34 being at the potential [VSS] obtained by subtracting a voltage [2×VDD] being twice higher than the high potential of the clock CLKB from the high potential [2×VDD] at the node PB to the gate electrode of the pMOS transistor MP26, makes the pMOS transistor MP26 get into an ON state.

The level shift circuit 35 includes pMOS transistors MPL24, MPL25, and MPL26. In the pMOS transistor MPL24, its source electrode is connected to the node PA, its drain electrode is connected to the node BSA, and its gate electrode is connected to an input terminal IN. In the pMOS transistor MPL25, its source electrode is connected to a node QA, its gate electrode is connected to the node BSA, and to its drain electrode is input a clock CLKA. In the pMOS transistor MPL26, its source electrode is connected to a node PA, its drain electrode is connected to the node QA, and its gate electrode is connected to a node PB. The level shift circuit 35, by applying a control voltage ct35 being at the same level as the potential [2×VDD] at the node PA to the gate electrode of the pMOS transistor MP23, makes the pMOS transistor MP23 get into an OFF state, while the level shift circuit 35, by applying a control voltage ct35 being at the potential [VSS] obtained by subtracting a voltage [2×VDD] being twice higher than the high potential of the clock CLKA from the high potential [2×VDD] at the node PA to the gate electrode of the pMOS transistor MP23, makes the pMOS transistor MP23 get into an ON state.

Figure 9A:
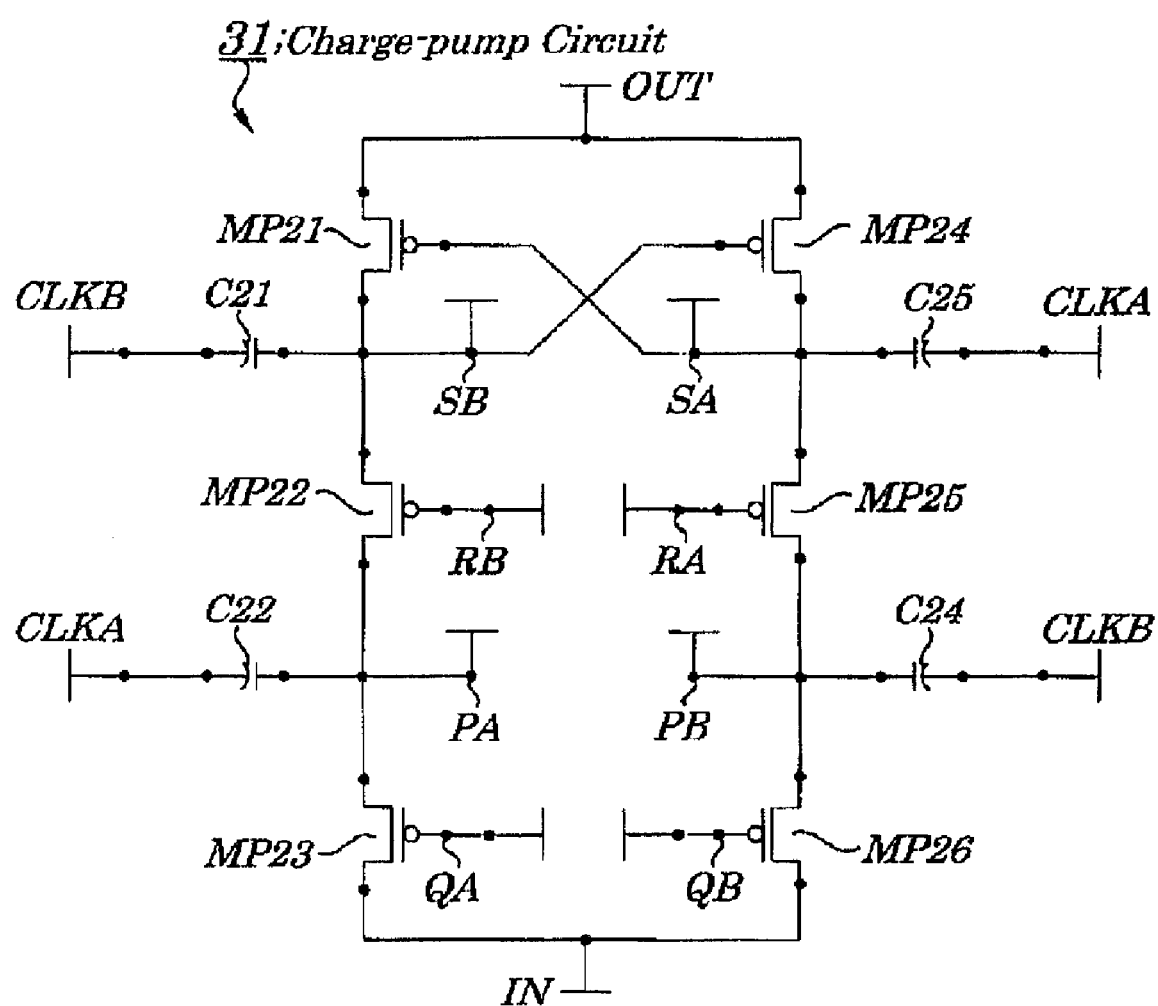
FIGS. 9A, 9B, 9C, 9D, and 9E are a circuit diagram showing electrical configurations of a power supply circuit according to the seventh embodiment of the present invention.
Figure 9B:
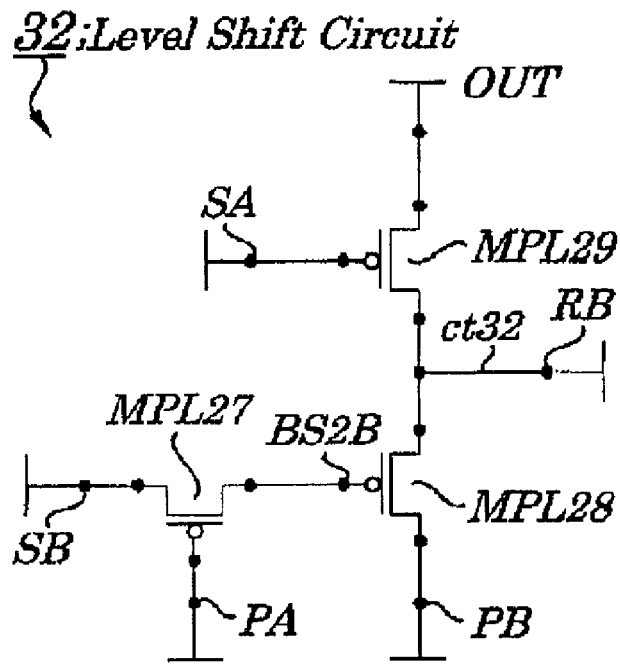
Figure 9C:
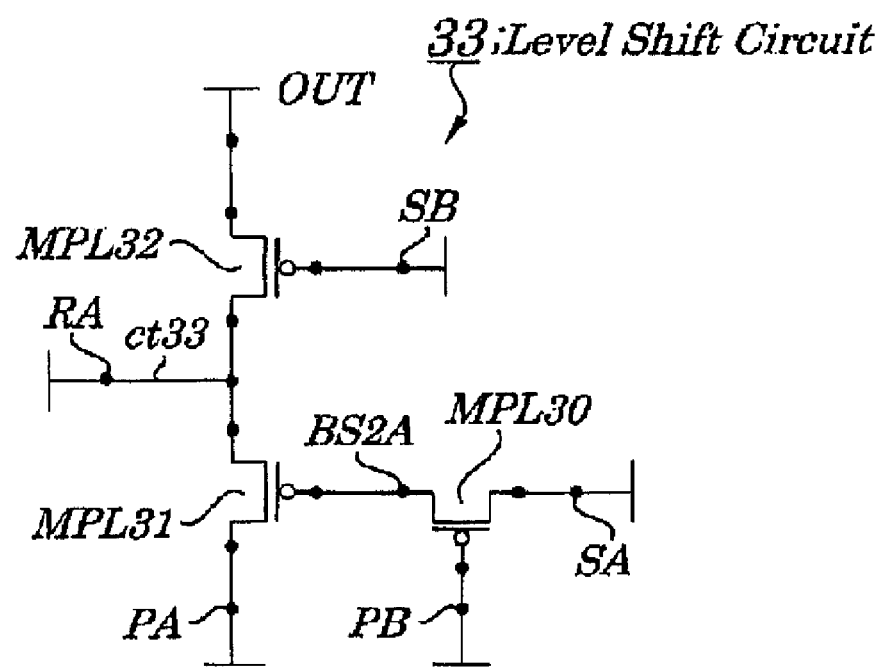
Figure 9D:
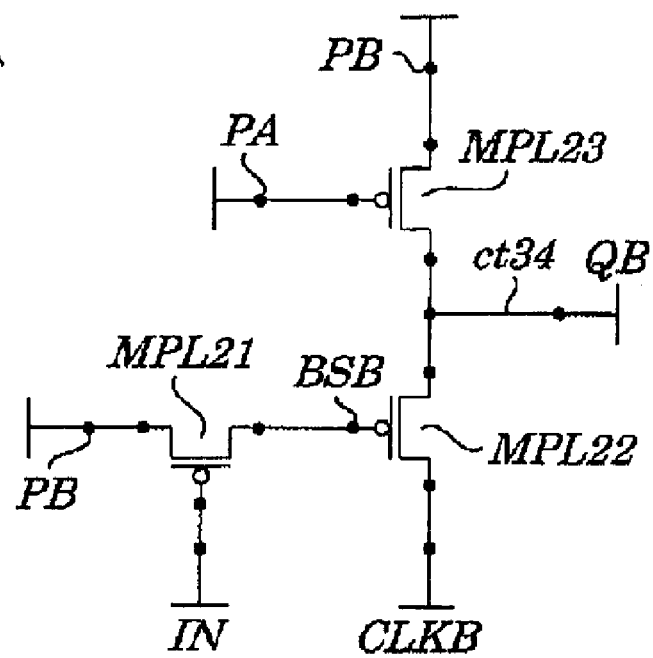
Figure 9E:
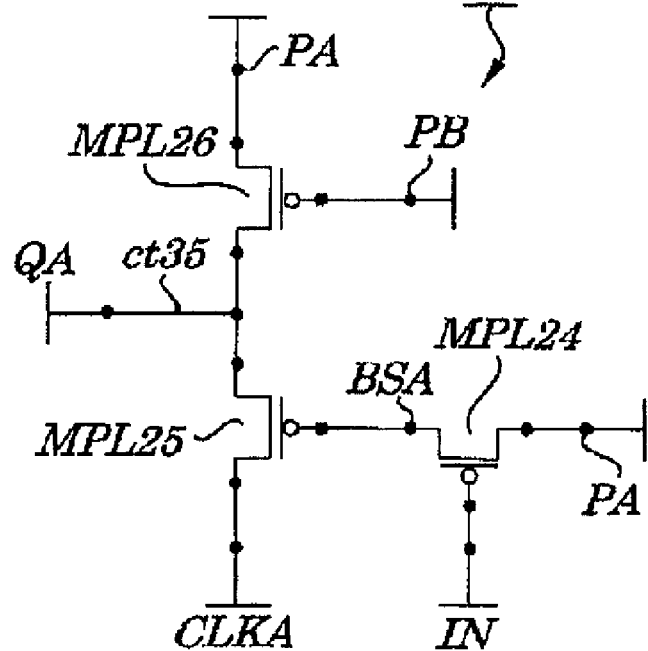
Figure 10:
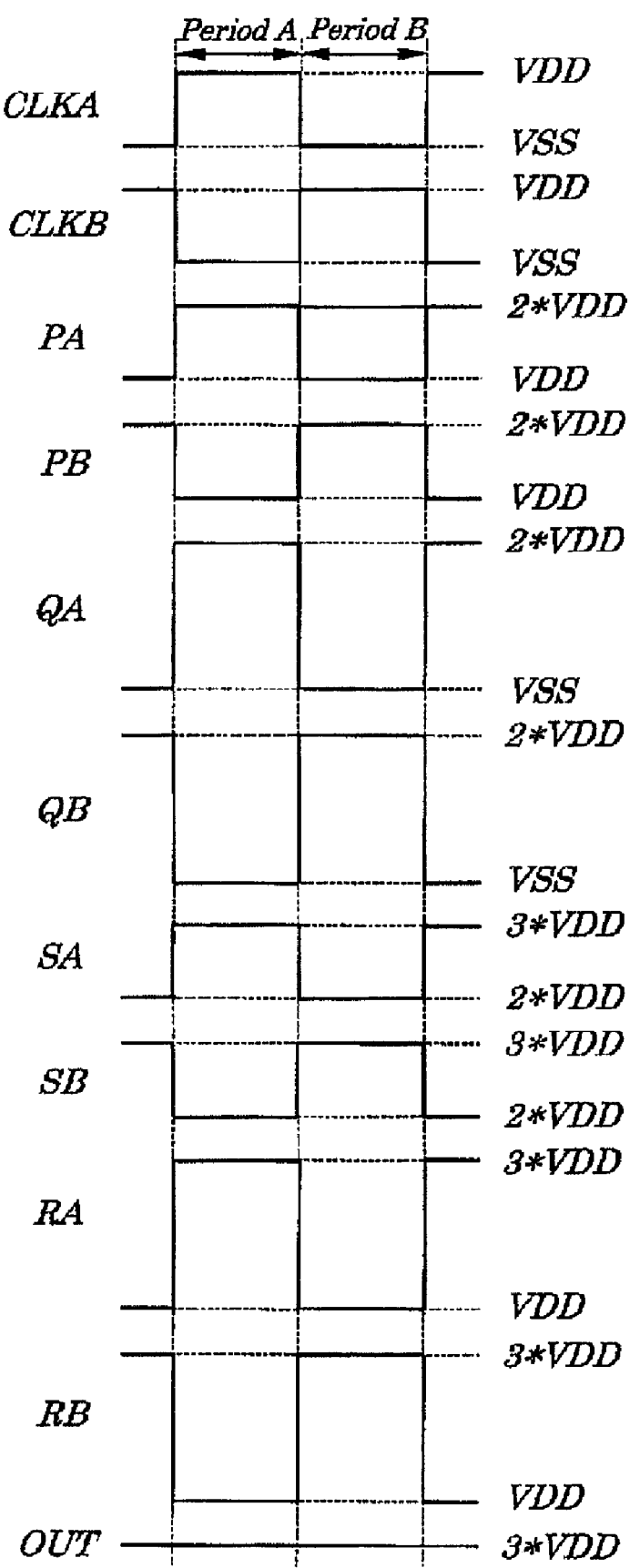
FIG. 10 is a time chart explaining operations of the power supply circuit shown in FIG. 9.

FIG. 10 is a time chart explaining operations of the power supply circuit shown in FIG. 9. Operations of the power supply circuit are described by referring to FIG. 10. During the period A, the clock CLKA has a high potential [VDD] and the clock CLKB has a low potential [VSS]. The potentials at the nodes PA, QA, RA, SA, PB, QB, RB, and SB change in synchronization with potentials of the clocks CLKA and CLKB and the potentials at the nodes PA, QA, RA, and SA become high, while the potentials at the nodes PB, QB, RB, and SB become low. The pMOS transistors MP24, MP22, and MP26 of the charge pump 31 get into an ON state and the pMOS transistors MP21, MP25, and MP23 get into an OFF state. Since the pMOS transistor MP26 is in the ON state, the potential at the node PB is charged so as to have a potential [VDD].

Next, during the period B, the pMOS transistors MP24, MP22, and MP26 get into an OFF state and the pMOS transistors MP21, MP25, and MP23 get into an OFF state. The potential of the clock CLKB is boosted to the level [VDD] and, therefore, the potential at the node PB coupled by the capacitor C24 is boosted by the level [VDD−VDD] to the potential [2×VDD]. Since the pMOS transistor MP25 is in the ON state, the node SA is charged so as to have a potential [2×VDD].

Moreover, during the period A, when the potential of the clock CLKA is boosted again to the high level [VDD], the potential at the node SA coupled by the capacitor C23 is boosted from the level [2×VDD] to the level [3×VDD]. Then, the pMOS transistor MP24 becomes conductive and, therefore, the output terminal OUT is charged so as to have a potential [3×VDD] and the DC output voltage [3×VDD] is generated.

In the level shift circuit 34, during the period A, the potential at the node Pa in the charge-pump circuit 31 is boosted to the potential [2×VDD] and the potential at the node PB is lowered to the level [VDD] and, as a result, the pMOS transistor MPL23, since the voltage between its gate and source becomes 0V, gets into an OFF state. At the same time when the potential at the node PB lowers, the potential at the node BSB lowers to a level being higher by about a gate threshold voltage than the potential [VDD]. While the potential at the node QB is maintained at a high level [2×VDD] being the previous state during the period A, the pMOS transistor MPL22 begins to be conductive when the voltage between its gate and source exceeds a gate threshold voltage. At this time, since the potential of the clock CLKB has lowered to the low level [VSS], the potential at the node QB becomes a level [VSS]. The same bootstrap effect in the pMOS transistor MPL22 occurs in the pMOS transistor MPL2 of the first embodiment.

Next, during the period B, the potential at the node PA in the charge-pump circuit 31 is lowered to the level [VDD] and the potential at the node PB is boosted to the level [2×VDD] and, as a result, the pMOS transistor MPL23 gets into an ON state and the node QB is charged so as to have a potential [2×VDD]. At this time point, the pMOS transistor MPL21 is in the ON state and the potential at the node BSB connected to the gate of the pMOS transistor MPL22 becomes the level [2×VDD] and, as a result, the pMOS transistor MPL22 is in the OFF state. In this case, even when the potential at the node QB reaches the level [2×VDD], the pMOS transistor MPL22 is kept in the OFF state. Moreover, the phase in which operations of the level shift circuit 35 are performed is opposite to the phase in which operations of the level shift circuit 34 are performed.

In the level shift circuit 32, during the period A, the potential at the node SA of the charge-pump circuit 31 is boosted to a level [3×VDD] and the potential at the node SB is lowered to the level [2×VDD]. The pMOS transistor MPL29, since the voltage Vgs between the gate and source becomes 0V, gets into an OFF state.

When attention is focused on the pMOS transistor MPL27, the potential at the node PA is boosted to a level [2×VDD] and the potential at the node SE is lowered to a level [2×VDD] and the potential at the node BS2B is lowered to a level being higher by about a gate threshold voltage than the potential [2×VDD]. While the potential at the node RB is maintained at the level [3×VDD] being the previous state during the period A, the pMOS transistor MPL28 starts to be conductive when a voltage between its gate and source exceeds a gate threshold voltage. At this time point, the potential at the node PB has lowered to a low level [VDD], the potential at the node RB is charged so as to have the potential [VDD]. In order to keep the pMOS transistor MPL28 in the ON state, it is necessary that the potential at the node BS2B is lowered to a level being lower than the potential [VDD].

In this case, by being induced by a drop in the potential at the nodes PB and RB, the potential at the node BS2B lowers to a level due to the bootstrap effect. When the potential at the node BS2B lowers to a level being lower than the potential ([2×VDD]+gate threshold voltage), the pMOS transistor MPL27 gets into an OFF state and, as a result, the node BS2B gets into a floating state and the potential at the node BS2B lowers to a level [VDD] with the difference in potential between the node BS2B and RB being maintained.

Next, during the period B, the potential at the node SA of the charge-pump circuit 31 lowers to a level [2×VDD] and the potential at the node SB is boosted to a level [3×VDD]. At this time, the pMOS transistor MPL29 gets into an ON state and the node RB is charged so as to have the potential [3×VDD]. At this time point, when attention is focused on the pMOS transistor MPL27, the potential at the node PA becomes a level [VDD] and the potential at the node SB is a level [3×VDD], the MPL27 is in an ON state and the potential at the node BS2B connected to the pMOS transistor MPL28 becomes the level [3×VDD] and, as a result, the pMOS transistor MPL28 is in an OFF state. In this case, even when the potential at the node RB reaches a level [3×VDD], the pMOS transistor MPL28 is kept in the OFF state. The phase in which operations of the level shift circuit 33 are performed is opposite to the phase in which operations of the level shift circuit 32 are performed. Operations equivalent to the above are performed even by connecting the source electrode of the pMOS transistor MPL29 to the node SB instead of the output terminal OUT and connecting the source electrode of the pMOS transistor MPL32 to the node SA instead of the output terminal OUT.

As described above, in the seventh embodiment, control voltages ct32, ct33, ct34, and ct35 whose amplitudes have been expanded to be the potential [2×VDD] are input from the level-shift circuits 32, 33, 34, and 35 respectively to gate electrodes of the pMOS transistors MP22, MP25, MP23 and MP26 of the charge-pump circuit 31 and, therefore, even when the potential at the node PA or at the node PB becomes the level [2×VDD] and even when the potential at the node SA or at the node SB becomes the level [3×VDD], the pMOS transistors MP23, MP26, MP25, and MP22 can be kept in the OFF state. Therefore, leakage of currents from the pMOS transistors MP23, MP26, MP25, and MP22 can be avoided. This presents a drop in the DC output voltage OUT ([3× VDD]). Moreover, as inputs of the level shift circuits 35, 34, 33, and 32, voltages at the nodes PB, PA, SB, and SA are used and, therefore, even when the potentials at the nodes QA, QB, RA, and RB of the level shift circuits 35, 34, 33, and 32 are high, the pMOS transistors MPL25, MPL22, MPL31, and MPL28 can be kept in an OFF state. Therefore, flowing of through currents through the pMOS transistors MPL25, MPL22, MPL31, and MPL28 can be avoided and power consumption can be reduced.

Moreover, in the above embodiments, the power supply circuits using the level shift circuits 32, 33, 34, and 35 shown in FIG. 9 are described, however, level shift circuits having configurations equivalent to each of the above level shift circuits shown in FIGS. 3 or 4 may be used.

Eighth Embodiment

Figure 11A:
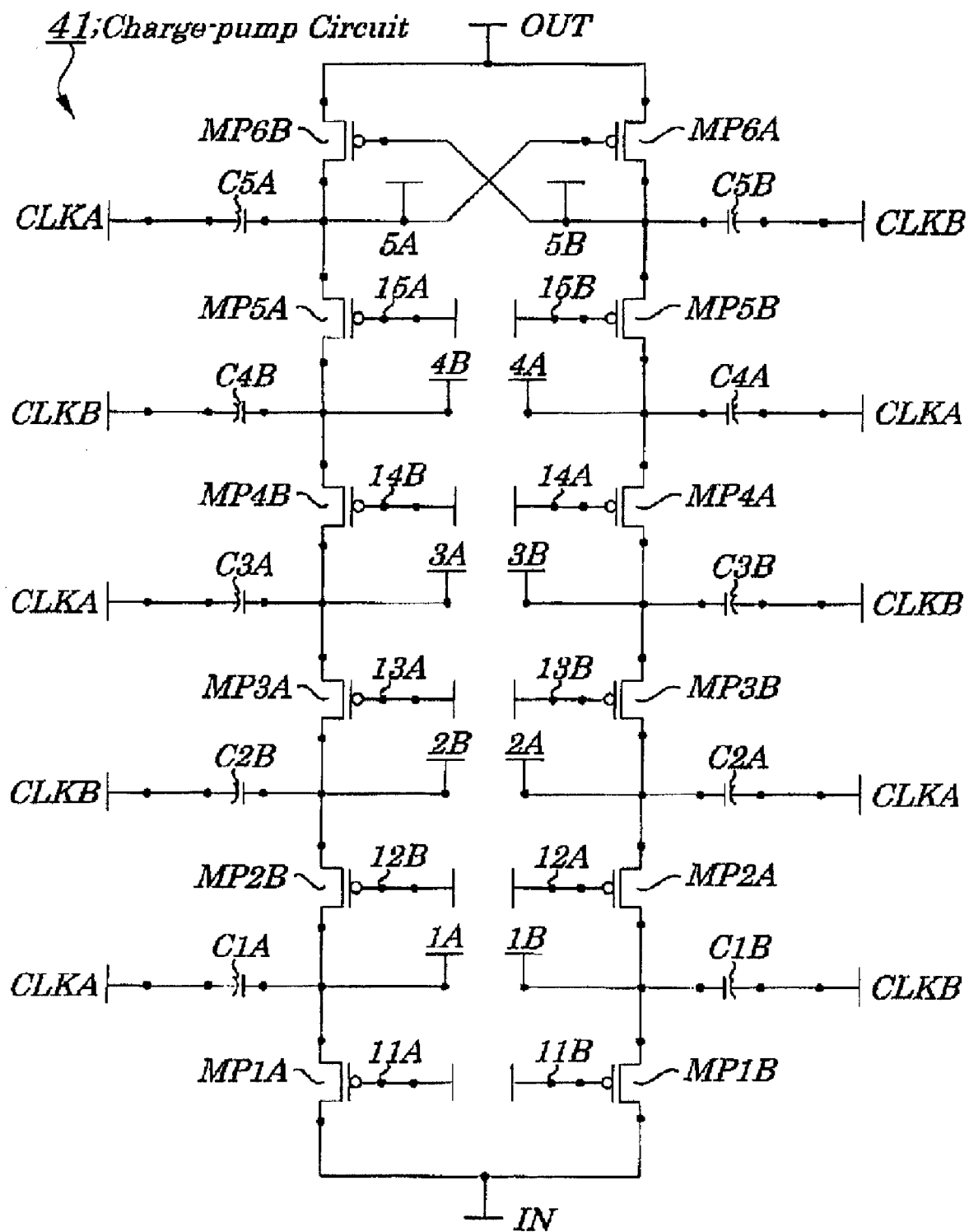
FIGS. 11A and 11B are a circuit diagram showing electrical configurations of a power supply circuit according to the eighth embodiment of the present invention.
Figure 11B:
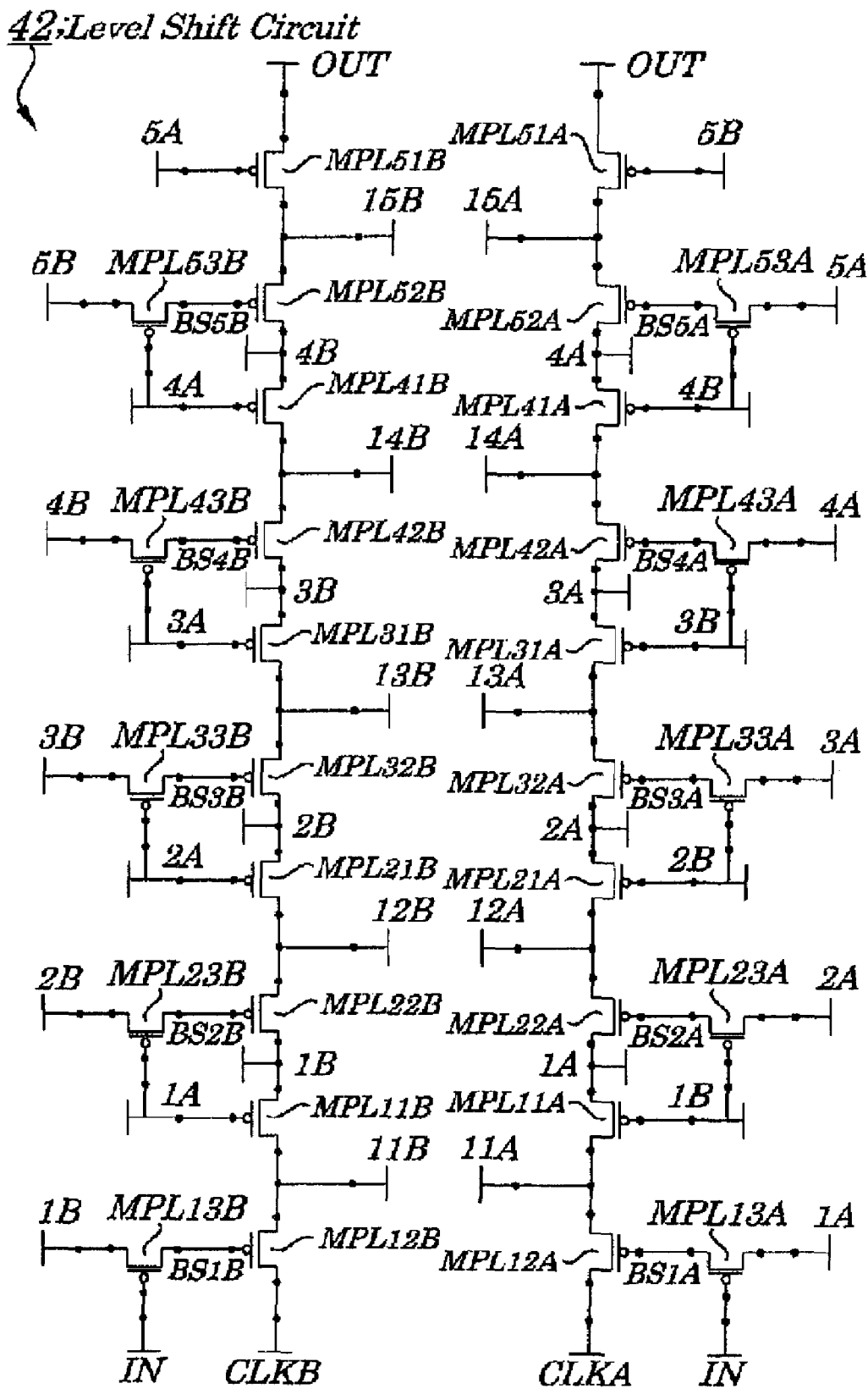

FIGS. 11A and 11B are a circuit diagram showing electrical configurations of a power supply circuit according to the eighth embodiment of the present invention. The power supply circuit of the eighth embodiment includes a charge-pump circuit 41 shown in FIG. 11A and a level shift circuit 42 shown in FIG. 11B. The charge-pump circuit 41 is made up of pMOS transistors MP1A, MP2A, MP3A, MP4A, MP5A, MP1B, MP2B, MP3B, MP4B, and MP5B each having a function of boosting a voltage in a charge-pump, and capacitors C1A, C2A, C3A, C4A, C5A, C1B, C2B, C3B, C4B, and C5B, and pMOS transistors MP6A and MP6B each outputting a DC voltage.

In the pMOS transistor MP1A, its source electrode is connected to a node 1A, its drain electrode is connected to an input terminal IN, its gate electrode is connected to a node 11A. In the pMOS transistor MP1B, its source electrode is connected to a node 1B, its drain electrode is connected to an input terminal IN, and its gate electrode is connected to a node 11B. In the pMOS transistor MP2B, its source electrode is connected to a node 2B, its drain electrode is connected to the node 1A, and its gate electrode is connected to a node 12B. In the pMOS transistor MP2A, its source electrode is connected to a node 2A, its drain electrode is connected to the node 1B, and its gate is connected to a node 12A. In the pMOS transistor MP3A, its source electrode is connected to a node 3A, its drain electrode is connected to the node 2B, and its gate electrode is connected to a node 13A. In the pMOS transistor MP3B, its source electrode is connected to a node 3B, its drain electrode is connected to the node 2A, and its gate electrode is connected to a node 13B. In the pMOS transistor MP4B, its source electrode is connected to a node 4B, its drain electrode is connected to a node 3A, and its gate is connected to a node 14B. In the pMOS transistor MP5A, its source electrode is connected to a node 5A, its drain electrode is connected to a node 4B, and its gate electrode is connected to a node 15A. In the pMOS transistor MP5B, its source electrode is connected to a node 5B, its drain electrode is connected to a node 4A, and its gate electrode is connected to a node 15B. In the pMOS transistor MP6B, its source electrode is connected to an output terminal OUT, its drain electrode is connected to the node 5A, and its gate electrode is connected to the node 5B. In the pMOS MP6A, its source electrode is connected to the output terminal OUT, its drain electrode is connected to the node 5B, and its gate electrode is connected to the node 5A.

In the capacitor C1A, its high-voltage-side electrode is connected to the node 1A and to its low-voltage-side electrode is input a clock CLKA. In the capacitor C1B, its high-voltage-side electrode is connected to the node 1B and to its low-voltage-side is input a clock CLKB. In the capacitor C2B, its high-voltage-side electrode is connected to the node 2B an to the low-voltage-side electrode is input a clock CLKB. In the capacitor C2A, its high-voltage-side electrode is connected to the node 2A and to its low-voltage-side electrode is input a clock CLKA. In the capacitor C3A, its high-voltage-side electrode is connected to the node 3A and to its low-voltage-side electrode is input a clock CLKA. In the capacitor c3B, its high-voltage-side electrode is connected to the node 3B and to its low-voltage-side is input a clock CLKB. In the capacitor C4B, its high-voltage-side electrode is connected to the node 4B and to its low-voltage-side is input a clock CLKB. In the capacitor C4A, its high-voltage-side electrode is connected to the node 4A and to its low-voltage-side electrode is input a clock CLKA. In the capacitor C5A, its high-voltage-side electrode is connected to the node 5A and to its low-voltage-side electrode is input a clock CLKA. In the capacitor C5B, its high-voltage-side electrode is connected to the node 5B and to its low-voltage-side electrode is input a clock CLKB.

The level shift circuit 42 includes pMOS transistors MPL11A, MPL12A, MPL13A, pMOS transistors MPL11B, MPL12B, and MPL13B, pMOS transistors MPL21A, MPL22A, and MPL23A, pMOS transistors MPL21B, MPL22B, and MPL23B, pMOS transistors MPL31A, MPL32A, and MPL33A, pMOS transistors MPL31A, MPL32A, and MPL33A, pMOS transistors MPL31B, MOL32B, MPL33B, pMOS transistors MPL41A, MLP42A, and MLP43A, pMOS transistors MPL41B, MPL42B, and MPL43B, pMOS transistors MPL51A, MPL52A, and MPL53A, and pMOS transistors MPL51B, MPL52B, and NPL53B.

In the pMOS transistor MPL12A, its source electrode is connected to a node 11A, its gate electrode is connected to a node BS1A, and to its drain electrode is input a clock CLKA. In the pMOS transistor MPL13A, its source electrode is connected to a node 1A, its drain electrode is connected to the node BS1A, and its gate electrode is connected to an input terminal IN. In the pMOS transistor MPL12B, its source electrode is connected to a node 11B, its gate electrode is connected to a node BS1B, and to its drain electrode is input a clock CLKB. In the pMOS transistor MPL13B, its source electrode is connected to a node 1B, its drain electrode is connected to the node BS1B, and its gate electrode is input to the input terminal IN. In the pMOS transistor MPL11A, its source electrode is connected to the node 1A, its drain electrode is connected to the node 11A, and its gate electrode is connected to anode 19. In the pMOS transistor MPL11B, its source electrode is connected to the node 1B, its drain electrode is connected to the node 11B, and its gate electrode is connected to the node 1A.

In the pMOS transistor MPL22A, its source electrode is connected to a node 12A, its drain electrode is connected to the node 1A, and its gate electrode is connected to a node BS2A. In the pMOS transistor MPL23A, its source electrode is connected to a node 2A, its drain electrode is connected to the node BS2A, and its gate electrode is connected to anode 1B. In the pMOS transistor MPL22B, its source electrode is connected to a node 12B, its drain electrode is connected to the node 1B, and its gate electrode is connected to a node BS2B. In the pMOS transistor MPL23B, its source electrode is connected to a node 2B, its drain electrode is connected to a node BS2B, its gate electrode is connected to the node 1A. In the pMOS transistor MPL21A, its source electrode is connected to a node 2A, its drain is connected to a node 12A, and its gate electrode is connected to a node 2B. In the pMOS transistor MPL21B, its source electrode is connected to a node 2B, its drain electrode is connected to the node 12B, and its gate electrode is connected to a node 2A.

In the pMOS transistor MPL32A, its source electrode is connected to a node 13A, its drain electrode is connected to the node 2A, and its gate electrode is connected to a node BS3A. In the pMOS transistor MPL33A, its source electrode is connected to a node 3A, its drain electrode is connected to the node BS3A, and its gate electrode is connected to the node 2B. In the pMOS transistor MPL32B, its source electrode is connected to a node 13B, its drain electrode is connected to a node 2B, and its gate electrode is connected to a node BS3B. In the pMOS transistor MPL33B, its source electrode is connected to a node 3B, its drain electrode is connected to a node BS3B, and its gate electrode is connected to the node 2A. In the pMOS MLP31A, its source electrode is connected to a node 3A, its drain is connected to a node 13A, and its gate electrode is connected to the node 3B. In the pMOS transistor MPL31B, its source electrode is connected to the node 3B, its drain electrode is connected to the node 13B, and its gate electrode is connected to the node 3A.

In the pMOS transistor MPL42A, its source electrode is connected to a node 14A, its drain electrode is connected to the node 3A, and its gate electrode is connected to a node BS4A. In the pMOS transistor MPL43A, its source electrode is connected to a node 4A, its drain electrode is connected to the node BS4A, and its gate electrode is connected to the node 3B. In the pMOS transistor MPL42B, its source electrode is connected to a node 14B, its drain electrode is connected to a node 3B, and its gate electrode is connected to a node BS4B. In the pMOS transistor MLP43B, its source electrode is connected to a node 4B, its drain electrode is connected to the node BS4B, and its gate electrode is connected to the node 3A. In the pMOS transistor MLP41A, its source electrode is connected to the node 4A, its drain electrode is connected to the node 14A, and its gate electrode is connected to the node 4B. In the pMOS transistor MPL41B, its source electrode is connected to the node 4B, its drain electrode is connected to the node 14B, and its gate electrode is connected to the node 4A.

In the pMOS transistor MPL52A, its source electrode is connected to a node 15A, its drain electrode is connected to the node 4A, and its gate electrode is connected to a node BS5A. In the pMOS transistor MPL53A, its source electrode is connected to a node 5A, its drain electrode is connected to the node BS5A, and its gate electrode is connected to anode 4B. In the pMOS transistor MPL52B, its source electrode is connected to a node 15B, its drain electrode is connected to the node 4B, and its gate electrode is connected to a node BS5B. In the pMOS MPL53B, its source electrode is connected to a node 5B, its drain electrode is connected to the node BS5B, its gate electrode is connected to a node 4A. In the pMOS transistor MPLS1A, its source electrode is connected to an output terminal OUT, its drain is connected to a node 15A, and its gate electrode is connected to the node 5B. In the pMOS transistor MPL51B, its source electrode is connected to an output terminal OUT, its drain electrode is connected to a node 15B, and its gate electrode is connected to the node 5A.

Figure 12:
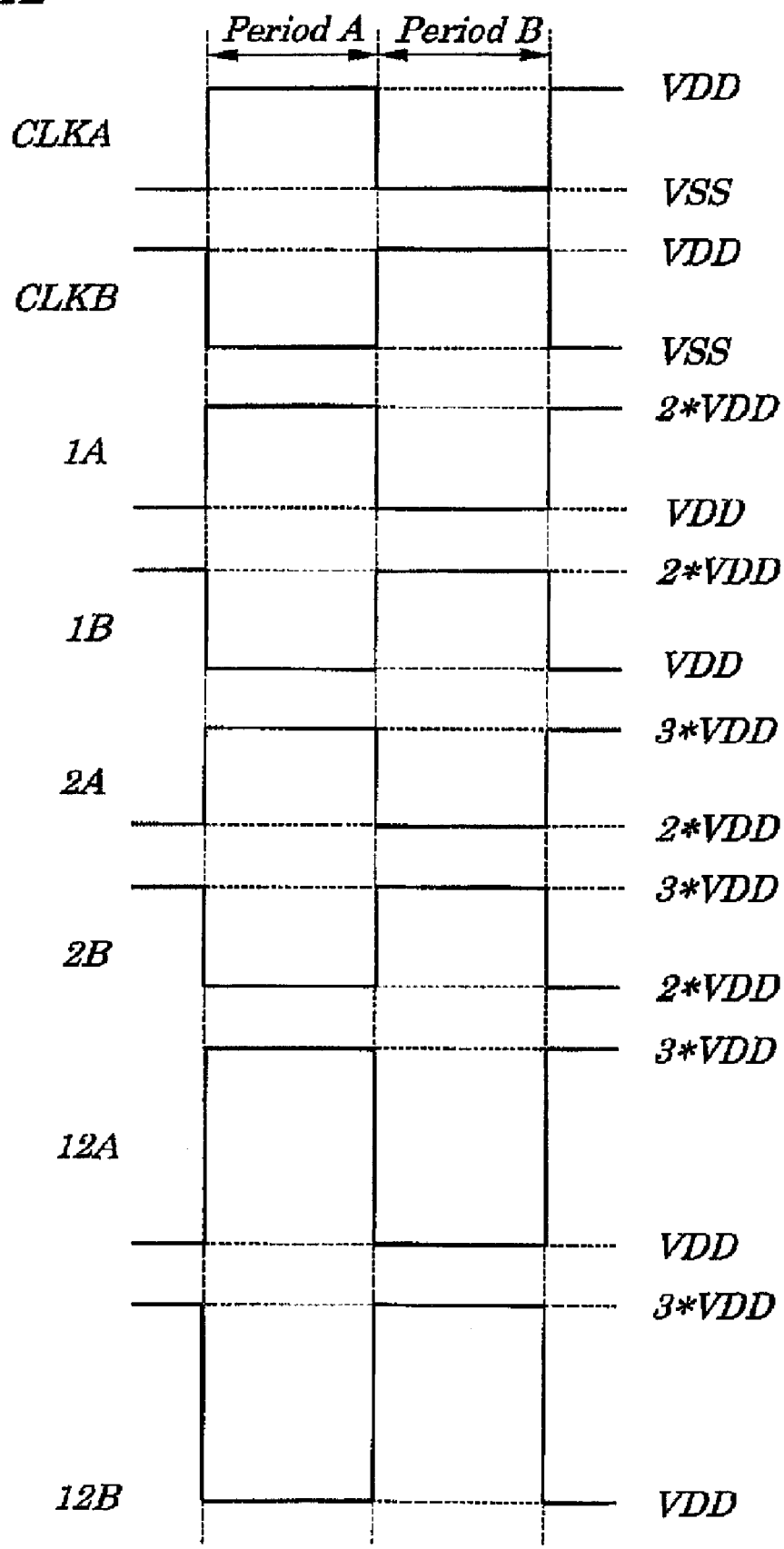
FIG. 12 is a time chart explaining operations of the power supply circuit of FIGS. 11A and 11B.

FIG. 12 is a time chart explaining operations of the power supply circuit of FIGS. 11A and 11B. By referring to these drawings, operations of the power supply circuit are described. During the period A, by a rise in the potential of the clock CLKA to a high level, the potential of the node 2A is boosted to the potential [3×VDD] and also, by a drop in the potential of the clock CLKB, the potential at the node 2B lowers to the level [2×VDD]. This causes the potential at the node 12A of the level shift circuit 42 to be at the same high potential [3×VDD] as the potential at the node 2A and causes the pMOS transistor MP2A of the charge-pump circuit 41 to get into an OFF state and, as a result, an OFF state occurs between the node 2A and node 1B. Since the potential at the node 1A is at the same level [2×VDD] as the potential at the node 2B, the bootstrap effects occur in the pMOS transistor MPL22 of the level shift circuit 42, thus causing the potential at the node 12B to be at the same low level [VDD] as the potential at the node 1B. As a result, the pMOS transistor MP2B of the charge-pump circuit 41 gets into an ON state, causing the node 2B and node 1A to be brought into conduction and to become stable at the same potential [2×VDD]. The phase in which operations are performed during the period B is opposite to the phase in which operations are performed during the period B.

Similarly, the DC output potential [6×VDD] is generated in the output terminal OUT. Moreover, each of the potentials at the nodes 11A, 11B, . . . , 15A, 15B becomes a potential whose amplitude is expanded to be a level [2×VDD] that is high enough to make each pMOS transistor get into an ON/OFF state. This prevents a drop in the DC output voltage [6×VDD] and an increase in power consumption. Operations equivalent to the above are performed even by connecting the source electrode of the pMOS transistor MPL51B to the node 5B instead of the output terminal OUT and by connecting the source electrode of the pMOS transistor MPL51A to the node 5A instead of the output terminal OUT.

Moreover, in this embodiment, the power supply circuit is provided which uses the level shift circuit 42 shown in FIG. 11, however, the level shift circuit having hard configurations equivalent to each of the level shift circuits shown in FIGS. 3 or 4 may he used as well.

Ninth Embodiment

Figure 13A:
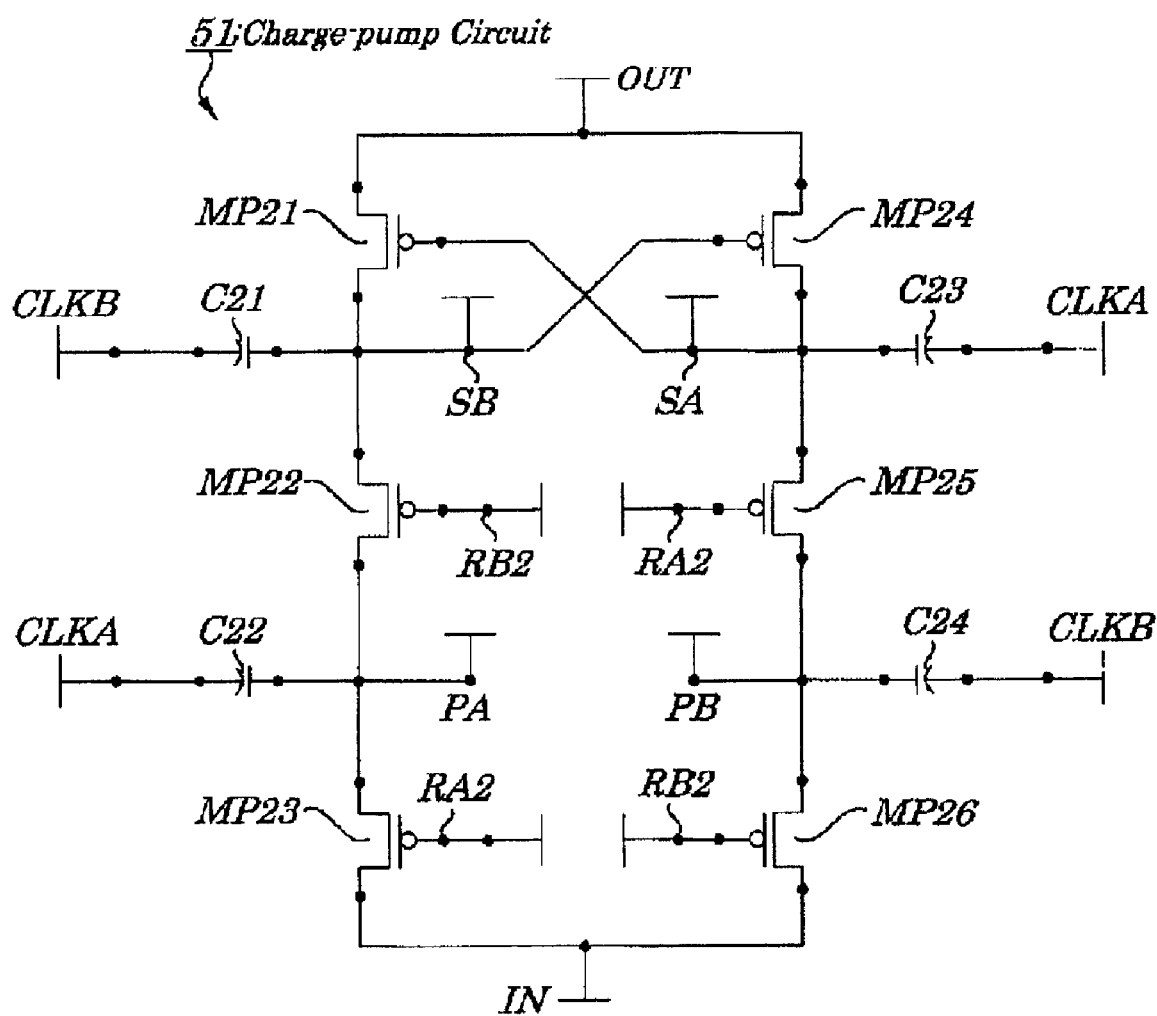
FIGS. 13A, 13B, and 13C are a circuit diagram showing electrical configurations of a power supply circuit according to the ninth embodiment of the present invention.
Figure 13B:
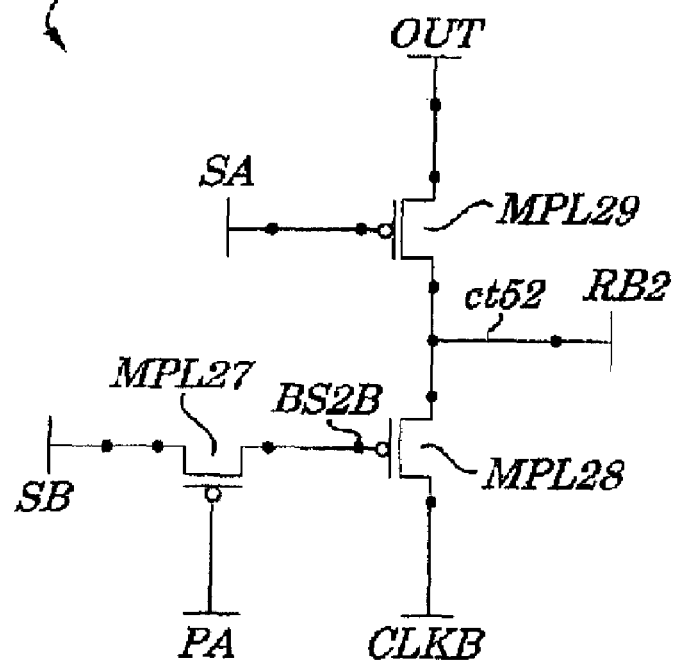
Figure 13C:
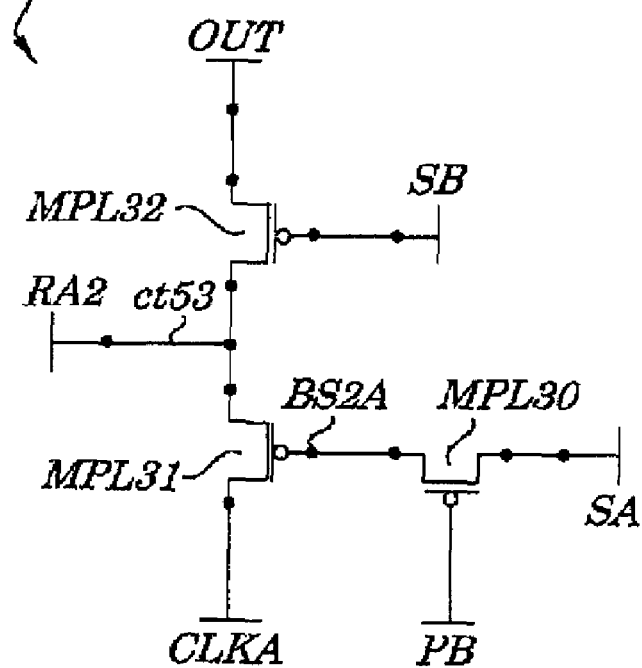

FIGS. 13A, 13B, and 13C are a circuit diagram showing electrical configurations of a power supply circuit according to the ninth embodiment of the present invention. Same reference numbers are assigned to components having the same functions as those in the seventh embodiment. The power supply circuit of the embodiment is made up of a charge-pump circuit 51 shown in FIG. 13A, a level shift circuit 52 shown in FIG. 13B, and a level shift circuit 53 shown in FIG. 13C. In the charge-pump circuit 51, the gate electrode of the pMOS transistor MP22 is connected to a node RB2 instead of the node RB in FIG. 9A. Also, the gate electrode of the pMOS transistor MP23 is connected to a node RA2 instead of the node QA in FIG. 9A. The gate electrode of the pMOS transistor MP25 is connected to a node RA2 instead of the node RA in FIG. 9A. The gate electrode of the pMOS transistor MP26 is connected to a node RB2 instead of the node QB in FIG. 9A. Other configurations are the same as those of the charge-pump circuit 31 shown in FIG. 9A.

In the level shift circuit 52, the source electrode of the pMOS transistor MPL29 is connected to a node RB2 instead of the node RB in FIG. 9B. Also, to the drain electrode of the pMOS transistor MPL2B is input a clock CLKB. Other configurations are the same as those of the level shift circuit 32. In the level shift circuit 52, by applying, to each gate electrode of the pMOS transistors MP22 and MP26, a control circuit ct52 being at the same potential level as the potential [3×VDD] of the output terminal OUT, the pMOS transistors MP22 and MP26 are made to get into an OFF state, while, by applying a control voltage ct52 being at the same level as the low potential [VSS] of the clock CLKB, the pMOS transistors MP22 and MP26 are made to get into an ON state.

In the level shift circuit 53, the source electrode of the pMOS transistor MPL32 is connected to a node RA2 instead of the RA in FIG. 9C. To a drain electrode of the pMOS transistor MPL31 is input a clock CLKA. Other configurations are the same as those in the level shift circuit 33 in FIG. 9C. In the level shirt circuit 53, by applying, to each gate electrode of the pMOS transistors MP25 and MP23, a control circuit ct53 being at the same potential level as the potential [3×VDD] of the output terminal OUT, the pMOS transistors MP25 and MP23 are made to get into an OFF state, while, by applying a control voltage ct53 being at the same level as the low potential [VSS] of the clock CLKA, the pMOS transistors MP25 and MP23 are made to get into an ON state.

Figure 14:
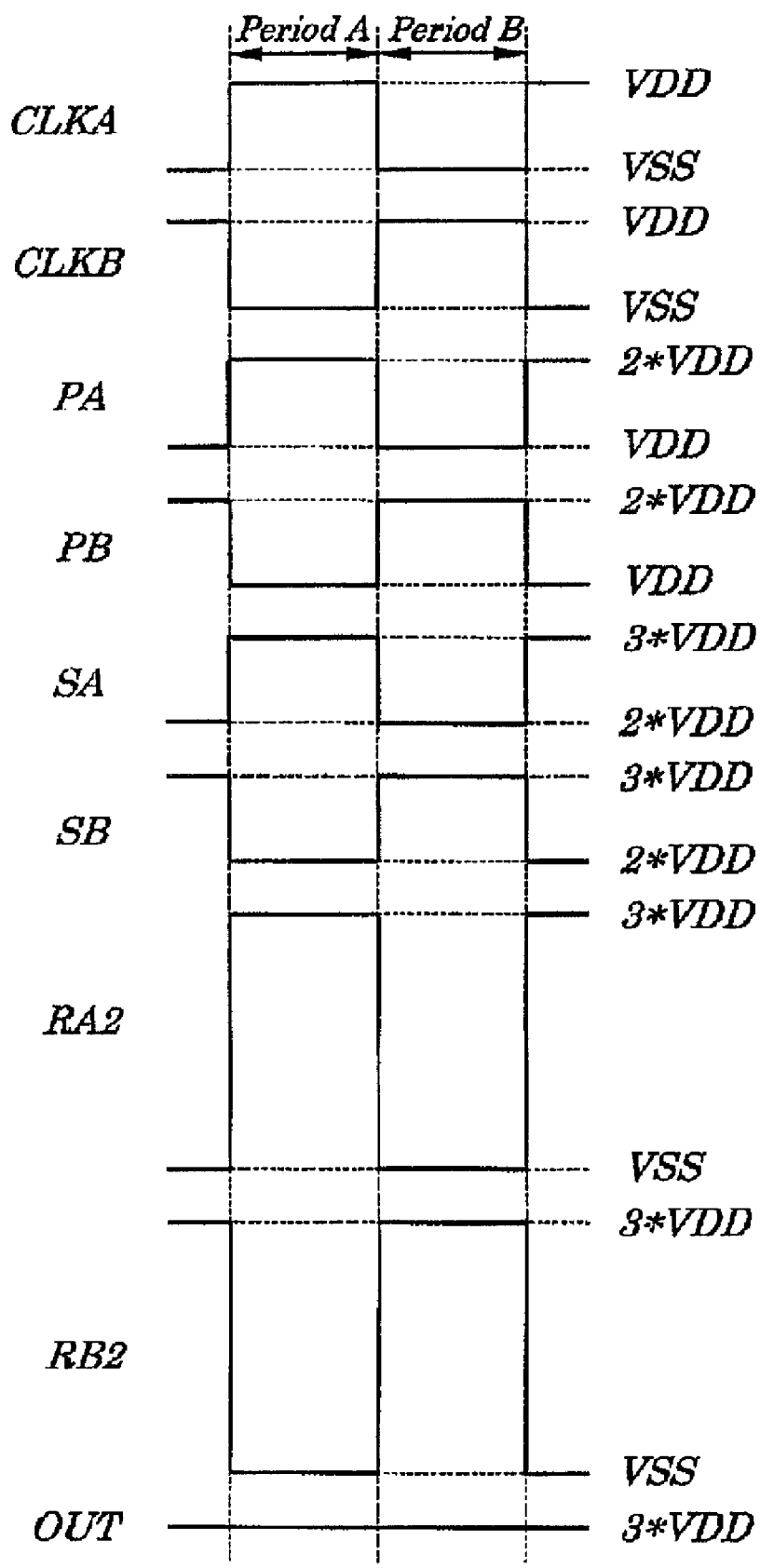
FIG. 14 is a time chart explaining operations of the power supply circuit shown in FIG. 13.

FIG. 14 is a time chart explaining operations of the power supply circuit shown in FIG. 13. Operations of the power supply are described by referring to FIG. 14. Operations of the level shift circuit 52 differ from those of the level shift circuit 32 shown in FIG. 9B in the following point. That is, during the period A, since the clock CLKB has a low potential [VSS], the potential at the node RB2 is also low [VSS]. Therefore, from this level shift circuit 52, a control voltage ct52 having an amplitude [3×VDD] is input via the node RB2 to the gate electrode of the pMOS transistors MP22 and MP26.

Operations of the level shift circuit 53 differ from those of the level shift circuit 33 in the following point shown in FIG. 9C. That is, during the period B, since the clock CLKA has a low potential, the potential at the node RA2 is low [VSS]. Therefore, from this level shift circuit 53, a control voltage ct53 having an amplitude [3×VDD] is input via the node RA2 to the gate electrode of the pMOS transistors MP23 and MP25. Moreover, to the drain of the pMOS transistors MP28 and MPL31 making up the level shift circuits 52 and 53 are input the clocks CLKB and CLKA. At this time, even if the low potential [VSS] of the clocks CLKB and CLKA is input, operations equivalent to the above are performed. Also, even when the source electrode of the pMOS transistor MPL29 is connected to the node SB instead of the output terminal OUT and the source electrode of the pMOS transistor MPL32 is connected to the node SA instead of the output terminal OUT, operations equivalent to the above are performed.

Thus, in the ninth embodiment, from the level shift circuit 52, the control voltage ct52 having the amplitude [3×VDD] is output to the node RB2 and, from the level shift circuit 53, the control voltage ct53 having the amplitude [3×VDD] is output to the node RA2 and, therefore, the power supply circuit having the same functions as that in the third embodiment can be realized by using a comparatively small-sized circuit configuration. Moreover, the same configurations as those employed in the ninth embodiment may be applied to the above fourth embodiment. That is, by applying a control voltage having an amplitude [6×VDD] to the gate electrode of each of the pMOS transistors making up the charge-pump circuit 41, the same advantages obtained in the ninth embodiment can be achieved.

Moreover, in this embodiment, the power supply circuit is provided which uses the level shift circuits 52 and 53 shown in FIGS. 13A, 13B, and 13C, however, the level shift circuit having hard configurations equivalent to each of the level shift circuits shown in FIGS. 3 or 4 may be used.

Tenth Embodiment

Figure 15A:
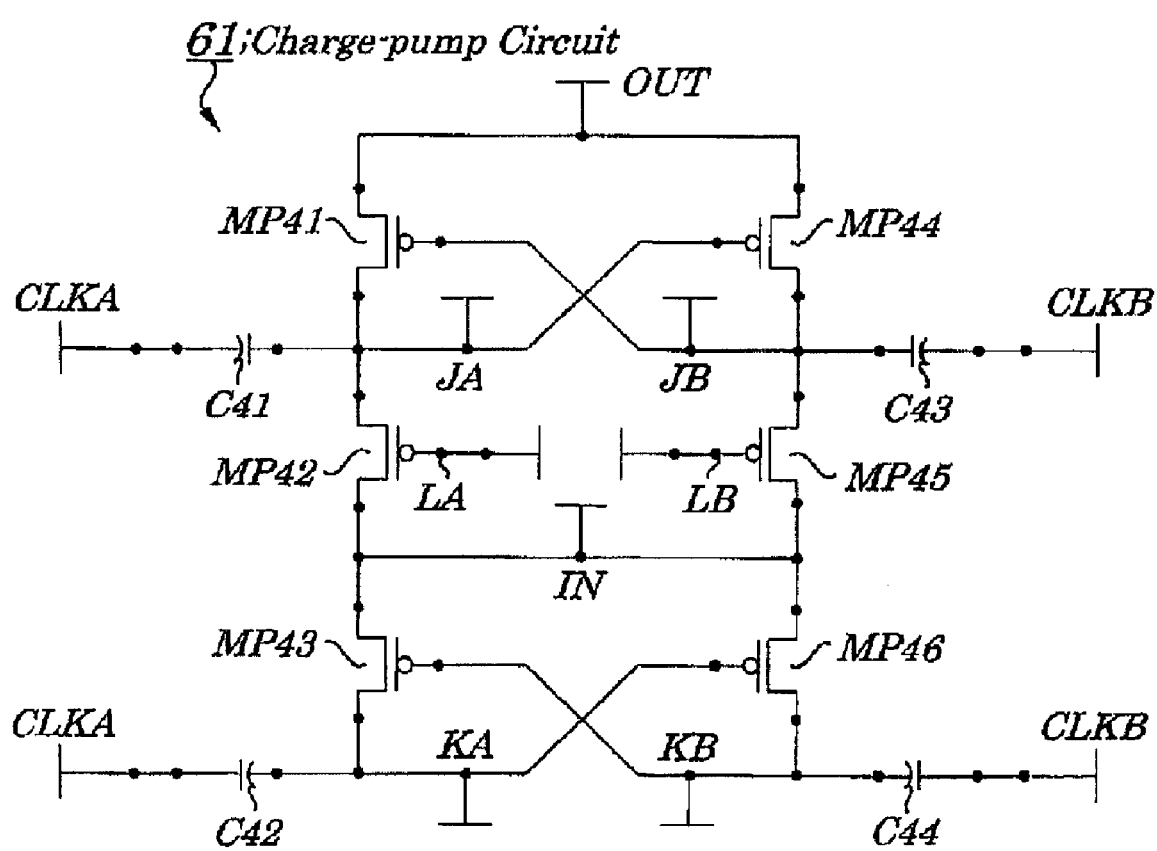
FIGS. 15A, 15B, and 15C are a circuit diagram showing electrical configurations of a power supply circuit according to the ninth embodiment of the present invention.
Figure 15B:
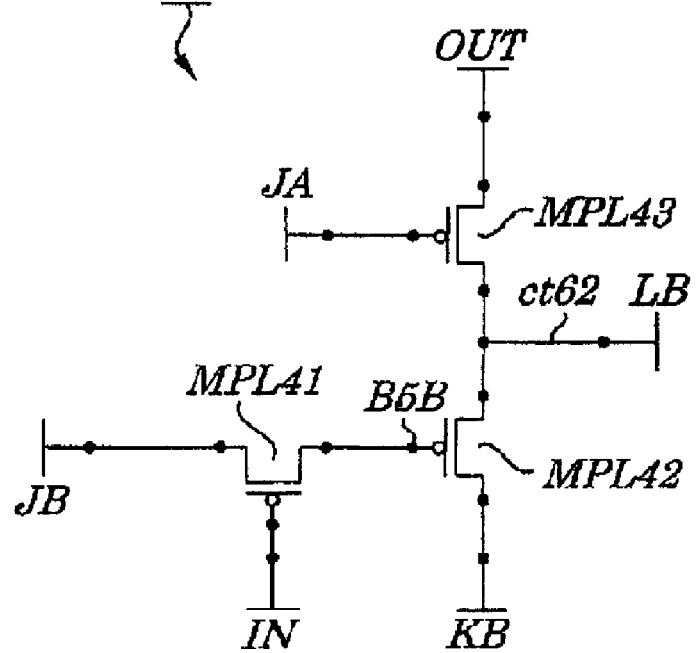
Figure 15C:
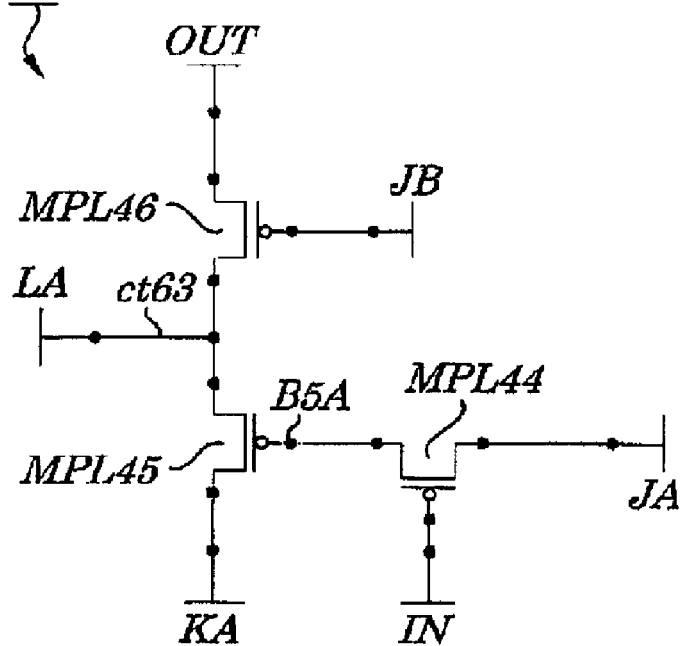

FIGS. 15A, 15B, and 15C are a circuit diagram showing electrical configurations of a power supply circuit according to the ninth embodiment of the present invention. The power supply of the tenth embodiment is made up of a charge-pump circuit 61 shown in FIG. 15A, a level shift circuit 62 shown in FIG. 15B, and a level shift circuit 63 shown in FIG. 15C. The charge-pump circuit 61 is made up of pMOS transistors MP41, MP42, MP44, MP45, and MP46, and capacitors C41, V42, C43, and C44. In the pMOS transistor MP41, its source electrode is connected to an output terminal OUT, its drain electrode is connected to a node JA, and its gate electrode is connected to anode JB. In the pMOS transistor MP42, its source electrode is connected to the node JA, its drain electrode is connected to an input terminal IN, and its gate electrode is connected to a node LA. In the pMOS transistor MP43, its source electrode is connected to the input terminal IN, its drain electrode is connected to a node KA, and its gate electrode is connected to a node KB. To the input terminal IN is input a DC input voltage [VOFS].

In the pMOS transistor MP44, its source electrode is connected to an output terminal OUT, its drain electrode is connected to a node JB, and its gate electrode is connected to the node JA. In the pMOS transistor MP45, its source electrode is connected to the node JB, its drain electrode is connected to an input terminal IN, and its gate electrode is connected to a node LB. In the pMOS transistor MP46, its source electrode is connected to the input terminal IN, its drain electrode is connected to the node KB, and its gate electrode is connected to the node KA.

In the capacitor C41, its high-voltage-side electrode is connected to the node JA and to its low-voltage-side electrode is input a clock CLKA. In the capacitor C42, its low-voltage-side electrode is connected to the node KA and to the high-voltage-side electrode is input a clock CLKA. In the capacitor C43, its high-voltage-side electrode is connected to the node JB and to the low-voltage-side electrode is input the clock CLKB. In the capacitor C44, its low-voltage-side electrode is connected to the node KB and to its high-voltage-side electrode is input the clock CLKB. The above pMOS transistors MP43 and MP46 and the capacitors C42 and C44 make up the charge-pump circuit.

The level shift circuit 62 is made up of pMOS transistors MPL41, MPL42, and MPL43. In the pMOS transistor MPL41, its source electrode is connected to a node JB, its drain electrode is connected to a node BSB, and its gate electrode is connected to an input terminal IN. In the pMOS transistor MPL42, its source electrode is connected to a node LB, its drain electrode is connected to a node KB, and its gate electrode is connected to the node BSB. In the pMOS transistor PL43, its source electrode is connected to an output terminal OUT, and its gate electrode is connected to a node JA. In the level shift circuit 62, by applying a control circuit ct62 being at the same potential level as the potential of the output terminal OUT to the gate electrode of the pMOS transistor MP45, the pMOS transistor MP45 is made to get into an OFF state, while, by applying a control voltage ct62 obtained by subtracting a voltage [2×VDD] being twice higher than a high voltage of the clock CLKB from the potential of the output terminal OUT, the pMOS transistor MP45 is made to get into an ON state.

The level shift circuit 63 includes pMOS transistors MPL44, MPL45, and MPL46. In the pMOS transistor MPL44, its source electrode is connected to a node JA, its drain electrode is connected to a node B5A, and its gate electrode is connected to an input terminal IN. In the pMOS transistor MPL45, its source electrode is connected to a node LA, its drain electrode is connected to a node KA, and its gate electrode is connected to the node B5A. In the pMOS transistor MPL46, its source electrode is connected to an output terminal OUT, its drain electrode is connected to the node LA, and its gate electrode is connected to a node JB. In the level shift circuit 63, by applying a control circuit ct63 being at the same potential level as the potential of the output terminal OUT to the gate electrode of the pMOS transistor MP42, the pMOS transistor MP42 is made to get into an OFF state, while, by applying a control voltage ct63 obtained by subtracting a voltage [2×VDD] being twice higher than a high voltage of the clock CLKA from the potential of the output terminal OUT, the pMOS transistor MP42 is made to get into an ON state. Moreover, for example, the voltage [VDD] is set to be 5V, the DC input voltage [VOFS] is set to be 2V, the gate threshold voltage [Vth] of each of the pMOS transistors is set to be 3V, and the DC input voltage [VOFS] is lower than the gate threshold voltage [Vth].

Figure 16:
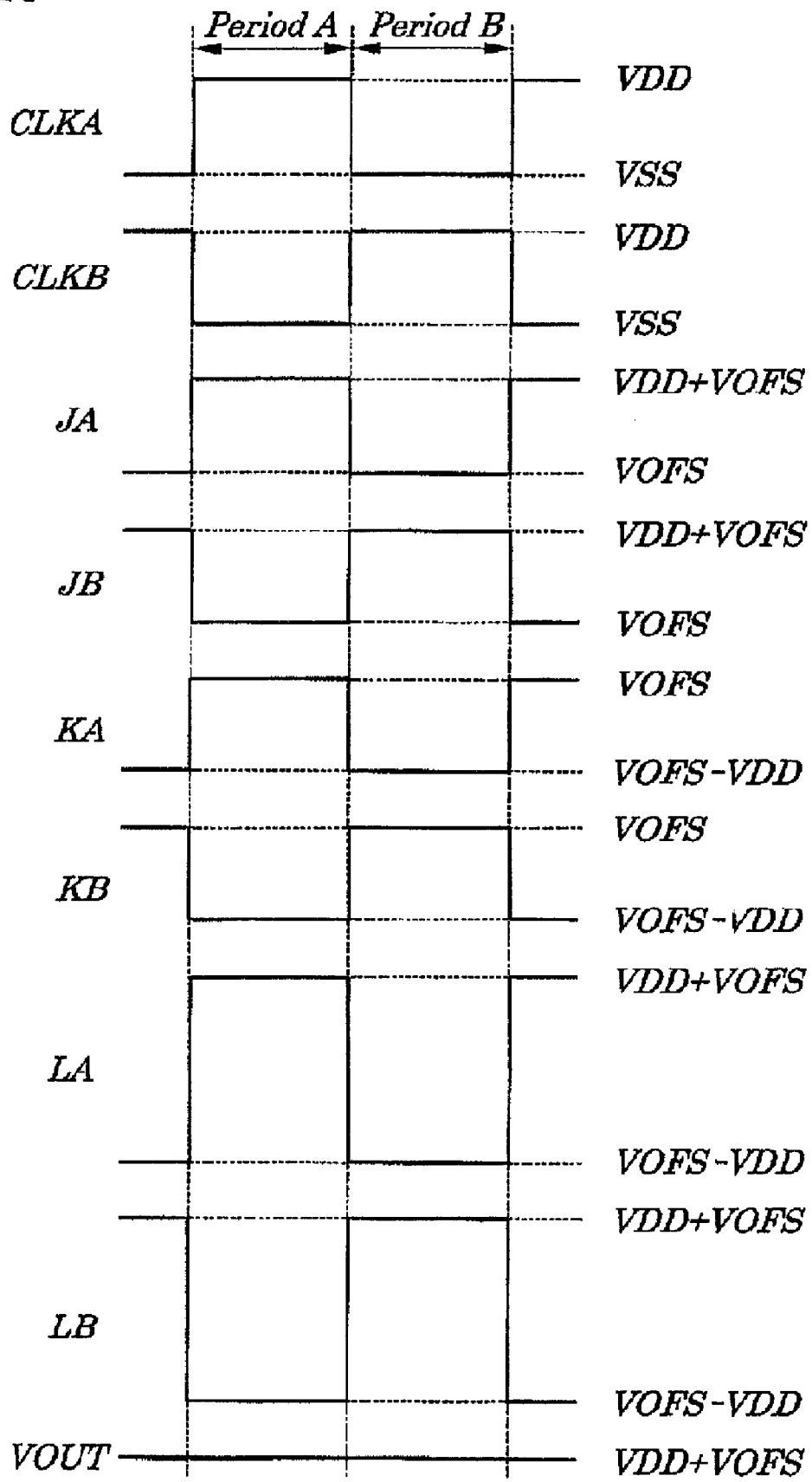
FIG. 16 is a time chart explaining operations of the power supply circuit shown in FIG. 15.

FIG. 16 is a time chart explaining operations of the power supply circuit shown in FIG. 15. Operations of the power supply are described by referring to FIG. 16. In the charge-pump circuit 61, during the period A, since the potential at the node KB is low [VOFS−VDD], the pMOS transistor MP43 gets into an ON state, causing the potential at the node KA to become high [VOFS]. Moreover, the potential at the node KB becomes low [VOFS−VDD]. Then, during the period B, when the potential of the clock CLKA lowers to a low level [VSS], due to the coupling of the capacitor C42, the potential at the node KA lowers to a low level [VOFS−VDD]. Moreover, the potential at the node KB becomes high [VOFS].

In the level shift circuit 62, during the period A, the pMOS transistor MPL43 gets into an OFF state and the pMOS transistor MPL42 gets into an ON state due to the bootstrap effects. At this point, the potential at the node KB is low [VOFS−VDD] and the potential at the node LB becomes low [VOFS−VDD]. At this time point, the pMOS transistor MPL45 gets into an ON state and the node JB is charged so as to have a low potential [VOFS]. During the period B, the pMOS transistor MPL43 gets into an ON state and the potential at the node LB becomes a potential level [VDD+VOFS] at the output terminal OUT. In the level shift circuit 63, during the period A, the potential at the node LA is high [VDD+VOFS] and being at the same level as the node JA of the charge pump circuit 61, thus causing the pMOS transistor MP42 to get into an OFF state. Moreover, even when the source electrode of the pMOS transistor MPL43 is connected to the node JB instead of the output terminal OUT and the source electrode of the pMOS transistor MPL43 is connected to the node JA instead of the output terminal OUT, operations equivalent to the above are performed as well.

Thus, in the tenth embodiment, to the gates of the pMOS transistors 42 and 45 of the charge-pump circuit 61 is input a low signal which is connected to the nodes LA and LB of the level shift circuits 63 and 62 and whose amplitude is expanded by the level shift circuits 63 and 62 and whose potential is lowered to a low level [VOFS−VDD], as a result, causing the pMOS transistors MP42 and MP45 to be conductive and, even when the nodes JA and JB are charged to have a low potential [VOFS−VDD], a voltage between the gate and source becomes the level [−VDD] and the pMOS transistors 42 and 45 are sufficiently kept in the ON state.

On the other hand, when the same function as performed in the tenth embodiment is to be achieved by using the circuit in the first embodiment shown in FIG. 1, since the DC input voltage [VOFS] is lower than the voltage [VDD], even if the voltage [VOFS] is used instead of the input DC voltage [VDD], a problem arises. That is, when the pMOS transistor MP2 and MP4 are brought into conduction and the nodes PA and PB are charged so as to have a potential [VOFS], the voltage between the gate and source that can be obtained is only a potential [VSS−VOFS=−VOFS] Due to this, the pMOS transistors MP2 and MP4 do not get into an ON state fully and their operating regions become active regions. As a result, the level at which the nodes PA and PB are charged is lowered and the potential of the output terminal lowers to a level [VDD+VOFS].

Also, in the tenth embodiment, all MOS transistors constituting the power supply circuit are made up of pMOS transistors, however, even if all MOS transistors are made up of nMOS transistors, the same actions and advantages can be obtained. In this case, even when a difference between an amplitude [VDD] of a clock and an input voltage [VOFS] is smaller than a gate threshold voltage [Vth] of the nMOS transistor, a sufficient voltage between a gate and source is applied to the nMOS transistor making up the charge-pump circuit.

Moreover, in this embodiment, the power supply circuit is provided which uses the level shift circuits 62 and 63 shown in FIGS. 15A, 15B, and 15C, however, the level shift circuit having hard configurations equivalent to each of the level shift circuits shown in FIGS. 3 or 4 may be used.

Eleventh Embodiment

Figure 17:
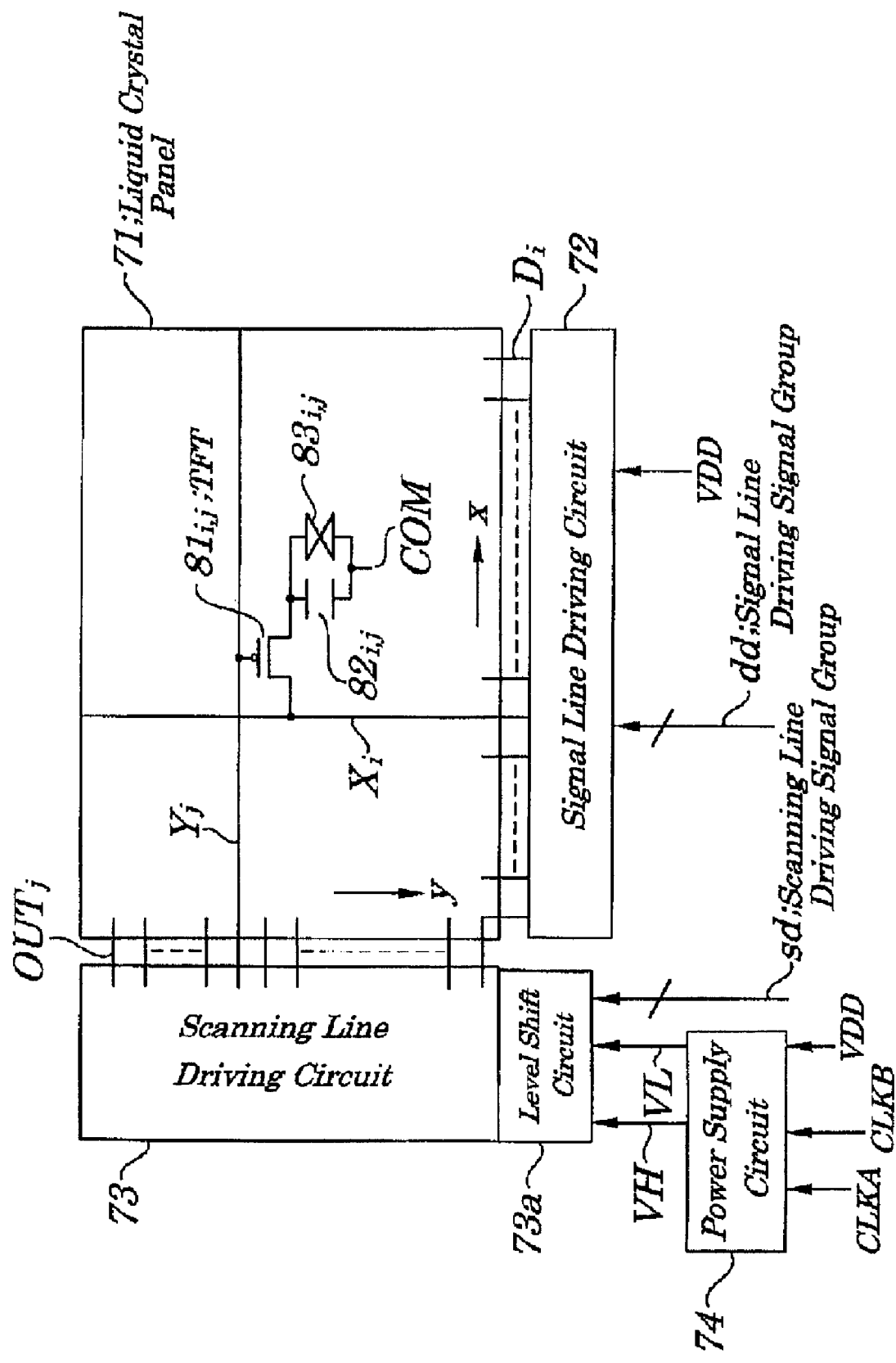
FIG. 17 is a block diagram showing electrical configurations of rain parts of an electronic device according to the eleventh embodiment of the present invention.
Figure 18:
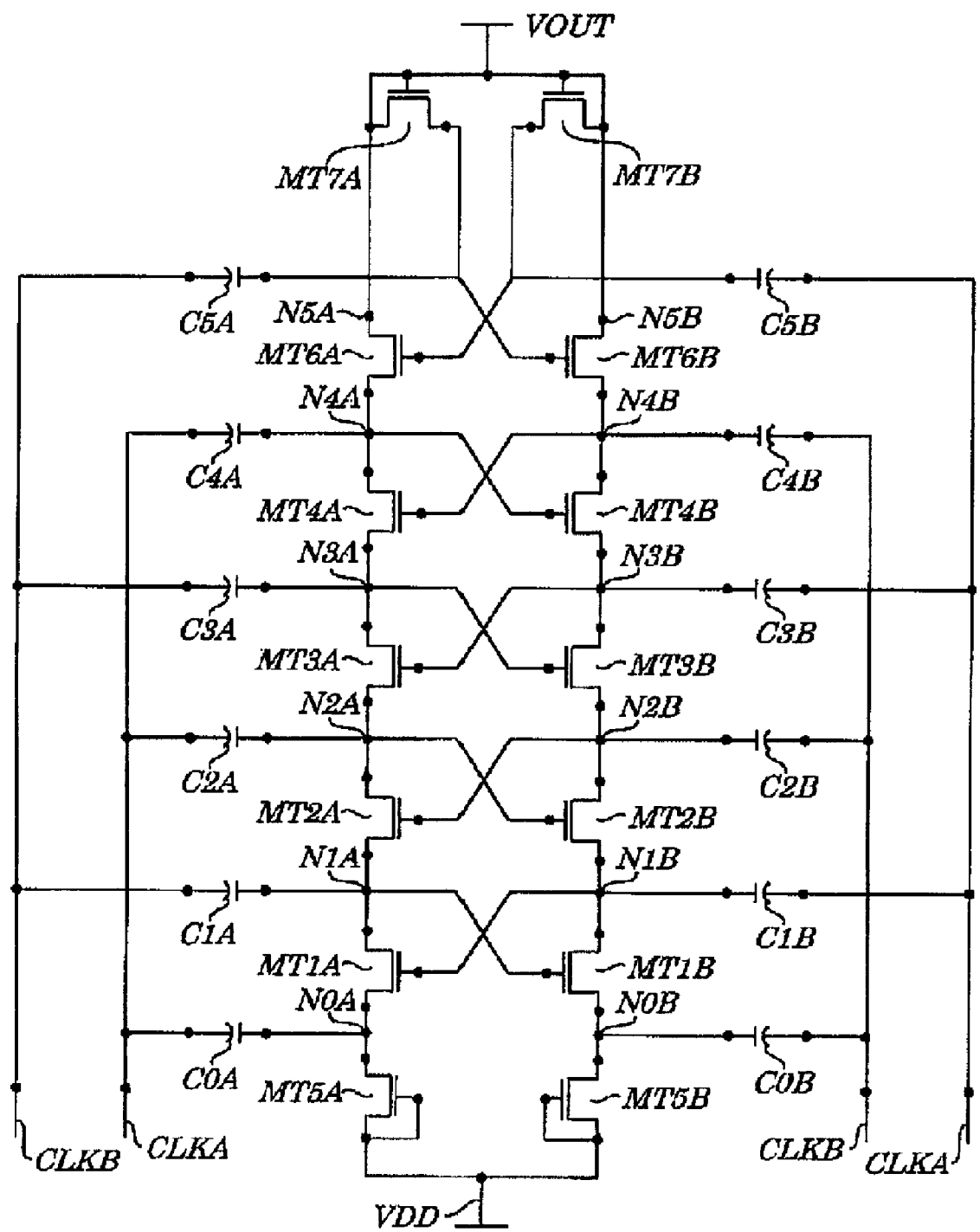
FIG. 18 is a circuit diagram showing a conventional power supply circuit disclosed in Patent Reference 1.
Figure 19:
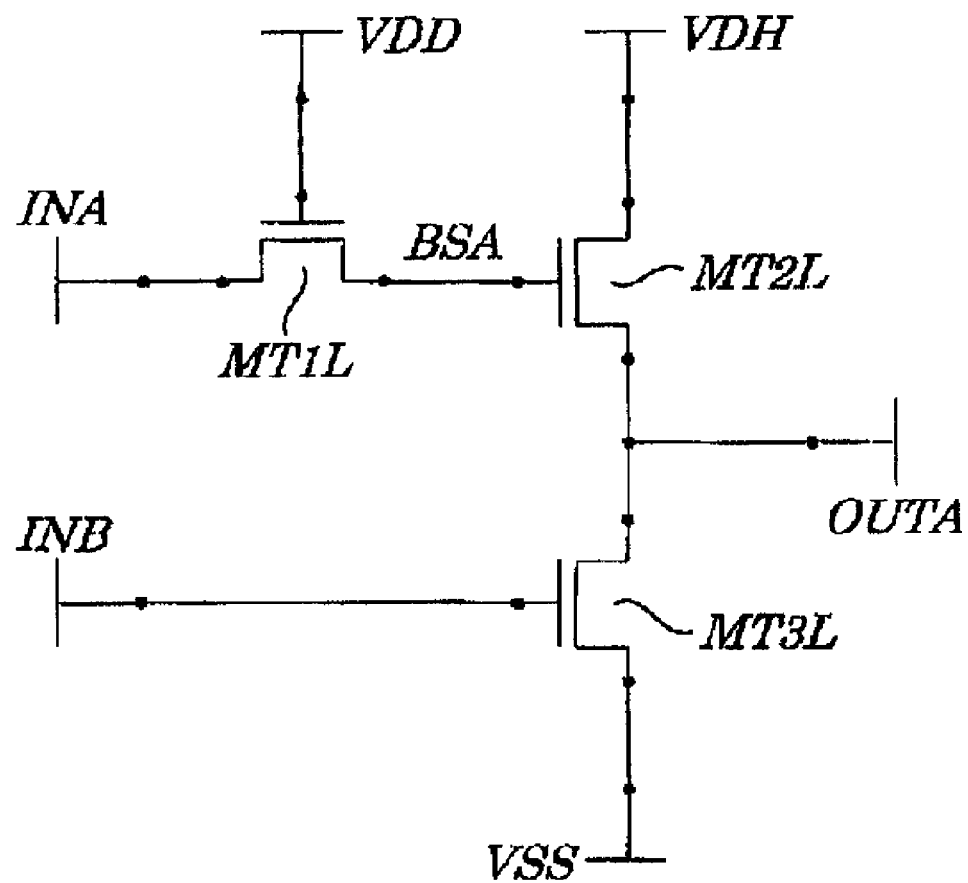
FIG. 19 is a circuit diagram showing a conventional level shift circuit disclosed in Patent Reference 2.

FIG. 17 is a block diagram showing electrical configurations of main parts of an electronic device of the eleventh embodiment of the present invention. The electronic device of the eleventh embodiment, as shown in FIG. 17, is a liquid crystal display device made up of a liquid crystal panel 71, a signal line driving circuit 72, a scanning line driving circuit 73, and a power supply circuit 74. The liquid crystal panel 71 is made up of signal lines $X_1$ (i=1, 2, ..., m, for example, m=640×3), scanning lines $Y_1$ (i=1, 2, ..., n, for example, n=480), pixel transistors $81_{i,j}$, pixel capacitors $82_{i,j}$, pixel elements $83_{i,j}$, and common terminals COM. The signal lines $X_1$ are formed at specified intervals in an x direction, to which a corresponding display signal $D_j$ is applied. The scanning lines $Y_1$ are formed at specified intervals in a y direction orthogonal to the x direction, to which scanning signals $OUT_j$ used to write the display signal $D_j$ are line-sequentially applied. The pixel transistors $81_{i,j}$ are made up TFT (Thin Film Transistor) films, which are on/off controlled according to scanning signals $OUT_j$ and are used to apply the display signal $D_j$ to pixel elements $83_{i,j}$ when an ON state occurs.

The signal line driving circuit 72 applies the display signal $D_j$ to signal lines $X_1$ according to a given signal line driving signal group dd. The scanning line driving circuit 73 applies line-sequentially scanning signals $OUT_j$ to the scanning lines $Y_1$ according to a given scanning line driving signal group sd. The scanning line driving circuit 73 has a level shift circuit 73a. The power supply circuit 74 is made up of the power supply circuit described in each of the above embodiments and is constructed by combining the power supply to multiply an input voltage 2-fold in the first embodiment in FIG. 1 and the power supply circuit to multiply an input voltage −1-fold (x −1) in the fourth embodiment in FIG. 5.

In this liquid crystal display device, if a range of a voltage to be applied across each of the pixel elements $83_{i,j}$ is, for example, from the voltage [VDD] to the [VSS], a range of a voltage to be applied to each of the signal lines $X_1$ is from the voltage [VDD] to the [VSS]. Due to this, in order to operate the signal line driving circuit 72, at least the supply power [VDD] is required. On the other hand, the voltage to be applied to each of the scanning lines $Y_1$ includes two voltages, one being at least a voltage [2×VDD] as a high potential (high output voltage) VH and the other being a potential [−VDD] as a low potential (low output voltage) [−VDD]. The reason for this is that, when a voltage (0V) at each of the signal lines $X_1$ is to be written to each of the pixel elements $83_{i,j}$, it is necessary that, by letting at least each of the signal lines $X_1$ be at the potential [−VDD], each of the pixel transistors $81_{i,j}$ is made to get into an ON state, Moreover, in the case where each of the pixel elements $83_{i,j}$ is a liquid crystal, ordinarily, a common inversion driving method is employed in which the polarity of a voltage is reversed by changing a potential at each of common terminals COM of a pixel periodically to be about a potential [VDD] or about a potential [VSS]. If each of the pixel transistors $81_{i,j}$ was kept in an OFF state with the potential [VDD] written to each of the pixel elements $83_{i,j}$, when the potential at the common terminal COM is to be reversed from its low level [VSS] to its high level [VDD], in order to maintain each of the pixel transistors $81_{i,j}$ in its OFF state, it is necessary that at least the potential at each of the signal lines $X_1$ is the potential [2×VDD].

The level shift circuit 73a in the scanning line driving circuit 73, if an amplitude of each signal in the scanning line driving signal group sd to be input to the scanning line driving circuit 73 is low (for example, about a level [VDD]), converts the signal having the low amplitude into a signal having an amplitude [VH−VL] that can be applied to each of the scanning lines $Y_1$, by using the high supply power VH or low supply power VL. Moreover, the power supply circuit 74 generates a voltage [2×VDD] as the high output voltage VH if its input voltage is the level [VDD] and the voltage [−VDD] as the low output voltage VL.

Thus, in the eleventh embodiment, since the high output voltage VH and low output voltage VL required for driving each of the scanning lines $Y_1$ are supplied from the power supply circuit 74, processing of a signal having a high voltage and a high amplitude outside the liquid crystal display device is not needed and, therefore, a high-withstand-voltage characteristic is not required in another semiconductor device connected to the liquid crystal display device and it is thus made possible to construct a semiconductor at low costs with comparatively simple configurations.

It is apparent that the present invention is not limited to the above embodiments but may be changed and modified without departing from the scope and spirit of the invention. For example, in each of the above embodiments, each power supply circuit is made up of pMOS transistors, however, even it being made up of nMOS transistors, the same actions and effects as obtained in each of the above embodiments can be realized as well. However, in this case, it is necessary that the polarity of a signal an/or a voltage to be applied to each component corresponds to characteristics of the nMOS transistor.

The present invention can be applied to all electronic devices requiring a power supply circuit capable of generating different supply voltages from one supply power such as a fingerprint reading device embedding a two-dimensional optical sensor, portable phone, portable terminal, in addition to a liquid crystal display device.

What is claimed is:

1. A power supply circuit comprising:
   a charge-pump circuit comprising at least one MOS transistor and at least one capacitor coupled thereto;
   means for charging said at least one capacitor to a charging voltage by applying a specified input voltage through said at least one MOS transistor to one side of said capacitor when a clock at a first level is input to the opposite side of said capacitor, and said at least one MOS transistor is in an ON state; and
   means for generating a generated voltage at a level obtained by increasing said charging voltage to a level equal to an amplitude of said clock when said clock is at a second level, and said at least one MOS transistor is in an OFF state; and
   a gate control circuit to apply a control voltage to a gate electrode of said at least one MOS transistor to set said at least one MOS transistor into an OFF or ON state, in synchronization with a change in a voltage of said at least one capacitor to said generated voltage or said charging voltage.

2. A power supply circuit comprising:
   a first charge-pump circuit comprising a first MOS transistor and a first capacitor coupled thereto, means for charging said first capacitor to a first charging voltage by applying a specified input voltage through said first MOS transistor to one side of said first capacitor when a first clock at a first level is input to the opposite side of said capacitor, and said first MOS transistor is in an ON state; and
   means for generating a first generated voltage at a level obtained by increasing said first charging voltage to a level equal to an amplitude of said first clock when said first clock is at a second level, and said first MOS transistor is in an OFF state and means for outputting the first generated voltage;
   a second charge-pump circuit comprising a second MOS transistor and a second capacitor coupled thereto, means for charging said second capacitor to a second charging voltage by applying said specified input voltage through said second MOS transistor to one side of said second capacitor when a second clock opposite to said first clock in phase and at said first level is input to an opposite side of said second capacitor and said second MOS transistor is in an ON state, and means for generating a second generated voltage at a level obtained by increasing said second charging voltage to a level equal to an amplitude of said second clock and said second MOS transistor is in an OFF state and means for outputting the second generated voltage;
   an output circuit to output said generated voltage as a DC output voltage when said second clock is at said first level and to output said second generated voltage as said DC output voltage when said first clock is at said first level;
   a first gate control circuit to make said first MOS transistor get into an ON state by applying a first control voltage being at a same level as said first level, in synchronization with a change from said first generated voltage to said first charging voltage, to a first gate electrode of said first MOS transistor and to make said first MOS transistor get into an OFF state by applying said first control voltage being at a same level as said second generated voltage in synchronization with a change from said second generated voltage to said second charging voltage; and
   a second gate control circuit to make said second MOS transistor get into an ON state by applying a second control voltage at a same level as said first level, in synchronization with a change from said second generated voltage to said second charging voltage, to a second electrode of said second MOS transistor and to make said second MOS transistor get into an OFF state by applying said second control voltage at a same level as said second generated voltage, in synchronization with a change from said first generated voltage to said first charging voltage.

3. The power supply circuit according to claim 2, wherein said first MOS transistor comprises a first electrode connected to a first node to which said DC input voltage is applied, a second electrode connected to a second node, and a first electrode connected to a third node;
   wherein said first capacitor comprises a third electrode to which a first clock is input and a fourth electrode connected to said second node;
   wherein said second MOS transistor comprises a fifth electrode connected to said first node, a sixth electrode connected to a fourth node, and a second gate electrode connected to a fifth node:
   wherein said second capacitor comprises an eighth electrode connected to a seventh electrode to which a second clock being opposite to said first clock in phase is input and to said fourth node;
   wherein said output circuit comprises;
   a third MOS transistor comprising a ninth electrode connected to said second node, a tenth electrode connected to a sixth node to output said DC output voltage, and a third gate electrode connected to said fourth node; and
   a fourth MOS transistor comprising an eleventh electrode connected to said fourth node, a twelfth electrode connected to said sixth node, and a fourth gate electrode connected to said second node;
   wherein said first gate control circuit comprises:
   a fifth MOS transistor comprising a thirteenth electrode connected to said fourth node, a fourteenth electrode connected to a seventh node, and a fifth gate electrode to which said DC input voltage or said first clock is input;
   a sixth MOS transistor comprising a fifteenth electrode connected to said fifth node, a sixteenth electrode to which a clock being at a first level or said second clock is input, and a sixth gate electrode connected to said seventh node; and
   a seventh MOS transistor comprising a seventeenth electrode connected to said fourth or sixth node, an eighteenth electrode connected to said fifth node, and a seventh gate electrode connected to said second node;
   wherein said second gate electrode circuit comprises:
   an eighth MOS transistor comprising a nineteenth electrode connected to said second node, a twentieth electrode connected to an eighth node, and an eighth gate electrode to which said DC input voltage or said second clock is input;
   a ninth MOS transistor comprising a twenty-first electrode connected to said third node, a twenty-second electrode to which a clock being at said first level or said first clock is input, and a ninth gate electrode connected to said eighth node; and
   a tenth MOS transistor comprising a twenty-third electrode connected to said second or sixth node, a twenty-fourth electrode connected to said third node, and a tenth gate electrode connected to said fourth node.

4. The power supply circuit according to claim 2, wherein said first MOS transistor comprises a first electrode connected to a first node to which said DC input voltage is applied, a second electrode connected to a second node, and a first gate electrode connected to a third node;

wherein said first capacitor comprises a third electrode to which a first clock is input and a fourth electrode connected to said second node;

wherein said second MOS transistor comprises a fifth electrode connected to said first node, a sixth electrode connected to a fourth node, and a second gate electrode connected to a fifth node;

wherein said second capacitor comprise a seventh electrode to which a second clock being opposite to said first clock in phase is input and an eighth electrode connected to said fourth node;

wherein said output circuit comprises:

a third MOS transistor comprising a ninth electrode connected to said second node, a tenth electrode connected to a sixth node to output said DC output voltage, and a third gate electrode connected to said fourth node; and a fourth MOS transistor comprising an eleventh electrode connected to said fourth node, a twelfth electrode connected to said sixth node, and a fourth gate electrode connected to said second node;

wherein said first gate control circuit comprises:

a fifth MOS transistor comprising a thirteenth electrode connected to said fourth node, a fourteenth electrode connected to a seventh node, and a fifth gate electrode connected to said fourth node;

a sixth MOS transistor comprising a fifteenth electrode connected to said fifth node, a sixteenth electrode to which a clock being at said first level or said second clock is input, and a sixth gate electrode connected to said seventh node;

a seventh MOS transistor comprising a seventeenth electrode connected to said fourth or sixth node, an eighteenth electrode connected to said fifth node, and a seventh gate electrode connected to said second node; and an eleventh MOS transistor comprising a twenty-fifth electrode connected to said fourth or sixth node, a twenty-sixth electrode connected to said seventh node, and an eleventh gate electrode connected to said second node;

wherein said second gate control circuit comprises:

an eighth MOS transistor comprising a nineteenth electrode connected to said second node, a twentieth electrode connected to an eight node, and an eighth gate electrode connected to said second node;

a ninth MOS transistor comprising a twenty-first electrode connected to said third node, a twenty-second electrode to which a clock being at said first level or said first clock is input, a ninth gate electrode connected to said eighth node;

a tenth MOS transistor comprising a twenty-third electrode connected to said second or sixth node, a twenty-fourth electrode connected to said third node, and a tenth gate electrode connected to said fourth node; and a twelfth MOS transistor comprising a twenty-seventh electrode connected to said second or sixth node, a twenty-eighth electrode connected to said eighth node, and a twelfth gate electrode connected to said fourth node.

5. The power supply circuit according to claim 2, wherein said first MOS transistor comprises a first electrode connected to a first node to which said DC input voltage is input, a second electrode connected to a second node, and a first gate electrode connected to a third node;

wherein said first capacitor comprises a third electrode to which a first clock is input and a fourth electrode connected to said second node;

wherein said second MOS transistor comprises a fifth electrode connected to said first node, a sixth electrode connected to a fourth node, and second gate electrode connected to a fifth node;

wherein said second capacitor comprises a seventh electrode to which a second clock being opposite to said first clock in phase is input and an eighth electrode connected to said fourth node;

wherein said output circuit comprises:

a third MOS transistor comprising a ninth electrode connected to said second node, a tenth electrode connected to a sixth node to output said DC output voltage and a third gate electrode connected to said fourth node; and a fourth MOS transistor comprising an eleventh electrode connected to said fourth node, a twelfth electrode connected to said sixth node, and a fourth gate electrode connected to said second node;

wherein said first gate control circuit comprises:

a fifth MOS transistor comprising a thirteenth electrode connected to said fourth node, a fourteenth electrode connected to a seventh node, and a fifth gate electrode connected to said fourth node;

a sixth MOS transistor comprising a fifteenth electrode connected to said fifth node, a sixteenth electrode to which a clock being at said first level or said second clock is input, and a sixth gate electrode connected to said seventh node;

a seventh MOS transistor comprising a seventeenth electrode connected to said fourth or sixth node, an eighteenth electrode connected to said fifth node, and a seventh gate electrode connected to said second node;

an eleventh MOS transistor comprising a twenty-fifth electrode connected to said fourth or sixth node, a twenty-sixth electrode connected to a ninth node, and an eleventh gate electrode connected to said second node; and a thirteenth MOS transistor comprising a twenty-ninth electrode connected to said ninth node, a thirtieth electrode connected to said seventh node, and a thirteenth gate electrode connected to said seventh node;

wherein said second gate electrode comprises:

an eighth MOS transistor comprising a nineteenth electrode connected to said second node, a twentieth electrode connected to an eighth node, and an eighth gate electrode connected to said second node;

a ninth MOS transistor comprising a twenty-first electrode connected to said third node, a twenty-second electrode to which a clock being at said first level or said first clock is input, a ninth gate electrode connected to said eighth node;

a tenth MOS transistor comprising a twenty-third electrode connected to said second or sixth node, a twenty-fourth electrode connected to said third node, and a tenth gate electrode connected to said fourth node;

a twelfth MOS transistor comprising a twenty-seventh electrode connected to said second or sixth node, a twenty-eighth electrode connected to a tenth node, and a twelfth gate electrode connected to said fourth node; and a fourteenth MOS transistor comprising a thirty-first electrode connected to said tenth node, a thirty-second electrode connected to said eighth node, and a fourteenth gate electrode connected to said eighth node.

6. A power supply circuit comprising:
a plurality of first charge-pump circuits each comprising a first MOS transistor and a first capacitor coupled thereto, means for applying a first input voltage to one side of said first capacitor through said first MOS transistor when a first clock is at a first level and is input to an opposite side of said first capacitor and said first MOS transistor is in an ON state to charge said first capacitor to a charging voltage, and means for generating a first boosted voltage at a level obtained by adding an amplitude of said first clock to said charging voltage of said first capacitor when said first clock is at a second level, and said first MOS transistor is in an OFF state and means for outputting the generated voltage;
a plurality of second charge-pump circuits each comprising a second MOS transistor and a second capacitor coupled thereto, means for applying a second input voltage to one side of said second capacitor through said second MOS transistor when a second clock being opposite to said first clock in phase is at said first level and is input to an opposite side of said second capacitor and said second MOS transistor is in an ON state to charge said second capacitor to a charging voltage and means for generating a second boosted voltage at a level obtained by adding an amplitude of said second clock to said charging voltage of said second capacitor when said second clock is at a second level and each of said second MOS transistors is in an OFF state, wherein specified numbers of said first charge-pump circuits and said second charge-pump circuits are each cascaded alternately using one of the first charge-pump circuits as a first stage charge-pump circuit and specified numbers of said second charge-pump circuits and said first charge-pump circuits are cascaded alternately using one of the second charge-pump circuits as a second stage charge-pump circuit and outputting the generated voltage;
an output circuit to output said first boosted voltage at a final stage or said second boosted voltage at the final stage as a DC output voltage;
a first gate control circuit to make each of said first MOS transistors get into an ON state by applying a first control voltage at a same level as said first level, in synchronization with a fall of said first boosted voltage at a final stage, to a first gate electrode of each of said first MOS transistors and to make each of said first MOS transistors get into an OFF state by applying said first control voltage at a same level as said DC output voltage, in synchronization with a fall of said second boosted voltage at a final stage; and
a second gate control circuit to make each of said second MOS transistors get into an ON state by applying a second control voltage being at a same level as said first level, in synchronization with a fall of said second boosted voltage at a final stage to a second gate electrode of each of said second MOS transistors and to make each of said second MOS transistors get into an OFF state by applying said second control voltage at a same level as said DC output voltage, in synchronization with a fall of said first boosted voltage at a final stage.

7. The power supply circuit according to claim 6, wherein said first gate control circuit comprises:
a third MOS transistor comprising a first electrode to which said first boosted voltage at the final stage is input, a second electrode connected to a first node, and a third gate electrode to which said second boosted voltage at the first stage is input;
a fourth MOS transistor comprising a third electrode connected to a first gate electrode of each of said first MOS transistors, a fourth electrode to which a clock at said first level or said first clock is input, and a fourth gate electrode connected to said first node; and
a fifth MOS transistor comprising a fifth electrode to which said DC output voltage or said first boosted voltage at the final stage is input, a sixth electrode connected to first gate electrode of each of said first MOS transistors, and a fifth gate electrode to which said second boosted voltage at the final stage is input;
wherein said second gate control circuit comprises:
a sixth MOS transistor comprising a seventh electrode to which said second boosted voltage at the final stage is input, an eighth electrode connected to a second node, and a sixth gate electrode to which said first boosted voltage at the first stage is input;
a seventh MOS transistor comprising a ninth electrode connected to a second gate electrode of each of said second MOS transistors, a tenth electrode to which a clock at said first level or said second clock is input, and a seventh gate electrode connected to said second node; and
an eighth MOS transistor comprising an eleventh electrode to which said DC output voltage or said second boosted voltage at the final stage is input, a twelfth electrode connected to a second gate electrode of each of said second MOS transistors, and an eighth gate electrode to which said first boosted voltage at the final stage is input.

8. A power supply circuit comprising:
a first charge-pump circuit comprising a first MOS transistor and a first capacitor coupled thereto, means for charging said first capacitor to a first charging voltage by applying a specified input voltage through said first MOS transistor to one side of said first capacitor when a first clock at a first level is input to the opposite side of said first capacitor, and said first MOS transistor is in an ON state, and means for generating a first generated voltage at a level obtained by increasing said first charging voltage to a level equal to an amplitude of said first clock when said first clock is at a second level and said first MOS transistor is in an OFF state and means for outputting the first generated voltage;
a second charge-pump circuit comprising a second MOS transistor and a second capacitor coupled thereto, means for charging said second capacitor to a second charging voltage by applying said specified input voltage through said second MOS transistor when a second clock opposite to said first clock in phase and at a first level is input to an opposite side of said second capacitor and said second MOS transistor is in an ON state, and means for generating a second generated voltage at a level obtained by increasing said second charging voltage to a level equal to an amplitude of said second clock when said second clock is at a second level and said second MOS transistor is in an OFF state, and means for outputting the second generated voltage;
an output circuit to output said first generated voltage as a DC output voltage when said second clock is at said first level and to output said second generated voltage as said DC output voltage when said first clock is at said first level;
a third charge-pump circuit to generate a third generated voltage at a level obtained by changing said DC input voltage by an amplitude of said first clock in a direction opposite to said first charge-pump circuit;

a fourth charge-pump circuit to generate a fourth generated voltage at a level obtained by changing said DC input voltage by an amplitude of said second clock in a direction opposite to said second charge-pump circuit;

a first gate control circuit to make said first MOS transistor get into an ON state by applying a first control voltage being at a same level as said third generated voltage, in synchronization with a change from said first generated voltage to said first charging voltage, to a first gate electrode of said first MOS transistor and to make said first MOS transistor get into an OFF state by applying said first control voltage being at a same level as said first generated voltage in synchronization with a change from said second generated voltage to said second charging voltage; and a second gate control circuit to make said second MOS transistor get into an ON state by applying a second control voltage at a same level as said fourth generated voltage, in synchronization with a change from said second generated voltage to said second charging voltage, to a second electrode of said second MOS transistor and to make said second MOS transistor get into an OFF state by applying said second control voltage at a same level as said second generated voltage, in synchronization with a change from said first generated voltage to said first charging voltage.

9. The power supply circuit according to claim 8, wherein, in said first charge-pump circuit, said first MOS transistor comprises a first electrode connected to a first node to which said DC input voltage is applied, a second electrode connected to a second node, and a first gate electrode connected to a third node and said first capacitor comprises a third electrode to which a first clock is input and a fourth electrode connected to said second node;

wherein, in said second charge-pump circuit, said second MOS transistor comprises a fifth electrode connected to said first node, a sixth electrode connected to a fourth node, and a second gate electrode connected to a fifth node and said second capacitor comprises a seventh electrode to which a second clock being opposite to said first clock in phase is input and an eighth electrode connected to said fourth node;

wherein said third charge-pump circuit comprises:

a fifth MOS transistor comprising a thirteenth electrode connected to said first node, a fourteenth electrode connected to a seventh node, and a fifth gate electrode connected to an eighth node; and a third capacitor comprising a fifteenth electrode to which said first clock is input and a sixteenth electrode connected to said seventh node;

wherein said fourth charge-pump circuit comprises:

a sixth MOS transistor comprising a seventeenth electrode connected to said first node, an eighteenth electrode connected to said eighth node, and a sixth gate electrode connected to said seventh node; and a fourth capacitor comprising a nineteenth electrode to which said second clock is input and a twentieth electrode connected to said eighth node;

wherein said first gate control circuit comprises:

a seventh MOS transistor comprising a twenty-first electrode connected to said fourth node, a twenty-second electrode connected to a ninth node, and a seventh gate electrode to which said DC input voltage is input;

an eighth MOS transistor comprising a twenty-third electrode connected to said fifth node, a twenty-fourth electrode connected to said eighth node, and an eighth gate electrode connected to said ninth node; and a ninth MOS transistor comprising a twenty-fifth electrode connected to said fourth or sixth node, a twenty-sixth electrode connected to said fifth node, and a ninth gate electrode connected to said second node;

wherein said second gate control circuit comprises:

a tenth MOS transistor comprising a twenty-seventh electrode connected to said second node, a twenty-eighth electrode connected to a tenth node, and a tenth gate electrode to which said DC input voltage is input;

an eleventh MOS transistor comprising a twenty-seventh electrode connected to said second node, a thirtieth electrode connected to said seventh node, and an eleventh electrode connected to said tenth node; and a twelfth MOS transistor comprising a thirty-first electrode connected to said second or sixth node, a thirty-second electrode connected to said third node, and a twelfth gate electrode connected to said fourth node.

10. The power supply circuit according to claim 8, wherein, in said first charge-pump circuit, said first MOS transistor comprises a first electrode connected to a first node to which said DC input voltage is input, a second electrode connected to said second node, and a first gate electrode connected to a third node and said first capacitor comprises a third electrode to which a first clock is input and a fourth electrode connected to said second node;

wherein, in said second charge-pump circuit, said second MOS transistor comprises a fifth electrode connected to said first node, a sixth electrode connected to a fourth node, a second gate electrode connected to a fifth node and said second capacitor comprises a seventh electrode to which a second clock being opposite to said first clock in phase is input and an eighth electrode connected to said fourth node;

wherein said third charge-pump circuit comprises:

a fifth MOS transistor comprising a thirteenth electrode connected to said first node, a fourteenth electrode connected to a seventh node, and a fifth gate electrode connected to an eighth node; and a third capacitor comprising a fifteenth electrode to which said first clock is input and a sixteenth electrode connected to said seventh node;

wherein said fourth charge-pump circuit comprises:

a sixth MOS transistor comprising a seventeenth electrode connected to said first node, an eighteenth electrode connected to said eighth node, and sixth gate electrode connected to said seventh node; and a fourth capacitor comprising a nineteenth electrode to which said second clock is input and a twentieth electrode connected to said eighth node;

wherein said first gate control circuit comprises:

a seventh MOS transistor comprising a twenty-first electrode connected to said fourth node, a twenty-second electrode connected to a ninth node, and a seventh gate electrode connected to said fourth node;

an eighth MOS transistor comprising a twenty-third electrode connected to said fifth node, a twenty-fourth electrode connected to said eighth node, and an eighth gate electrode connected to said ninth node;

a ninth MOS transistor comprising a twenty-fifth electrode connected to said fourth or sixth node, a twenty-sixth electrode connected to said fifth node, and a ninth gate electrode connected to said second node; and a thirteenth MOS transistor comprising a thirty-third electrode connected to said fourth or sixth node, a thirty-fourth electrode connected to said ninth node, and a thirteenth gate electrode connected to said second node;

wherein said second gate control circuit comprises:
a tenth MOS transistor comprising a twenty-seventh connected to said second node, a twenty-eighth connected to a ten node, and a tenth gate electrode connected to said second node;
an eleventh MOS transistor comprising a twenty-ninth electrode connected to said third node, a thirtieth electrode connected to said seventh node, and an eleventh gate electrode connected to said tenth node;
a twelfth MOS transistor comprising a thirty-first electrode connected to said second or sixth node, a thirty-second electrode connected to said third node, and a twelfth gate electrode connected to said fourth node; and
a fourteenth MOS transistor comprising a thirty-fifth electrode connected to said second or sixth node, a thirty-sixth electrode connected to said tenth node, and a fourteenth gate electrode connected to said fourth node.

11. The power supply circuit according to claim 8, wherein, in said first charge-pump circuit, said first MOS transistor comprises a first electrode connected to a first node to which said ac input voltage is input, a second electrode connected to a second node, a first gate electrode connected to a third node and said first capacitor comprises a third electrode to which a first clock is input and a fourth electrode connected to said second node;
wherein, in said second charge-pump circuit, said second MOS transistor comprises a fifth electrode connected to said first node, a sixth electrode connected to a fourth node, and a second gate electrode connected to a fifth node and said second capacitor comprises a seventh electrode to which a second clock being opposite to said first clock in phase is input, and an eighth electrode connected to said fourth node;
wherein said third charge-pump circuit comprises
a fifth MOS transistor comprising a thirteenth electrode connected to said first node, a fourteenth electrode connected to a seven node, and a fifth gate electrode connected to an eighth node;
a third capacitor comprising a fifteenth electrode to which said first clock is input and a sixteenth electrode connected to said seventh node;
wherein said fourth charge-pump circuit comprises:
a sixth MOS transistor comprising a seventeenth connected to said first node, an eighteenth electrode connected to said eighth node and a sixth gate electrode connected to said seventh node; and
a fourth capacitor comprising a nineteenth electrode to which said second clock is input and a twentieth electrode connected to said eighth node:
wherein said first gate control circuit comprises:
a seventh MOS transistor comprising a twenty-first electrode connected to said fourth node, a twenty-second electrode connected to a ninth node, and a seventh gate electrode connected to said fourth node;
an eighth MOS transistor comprising a twenty-third electrode connected to said fifth node, a twenty-fourth electrode connected to said eighth node, and an eighth gate electrode connected to said ninth node;
a ninth MOS transistor comprising a twenty-fifth electrode connected to said fourth or sixth node, a twenty-sixth electrode connected to said fifth node, and a ninth gate electrode connected to said second node;
a thirteenth MOS transistor comprising a thirty-third electrode connected to said fourth and sixth node, a thirty-fourth electrode connected to an eleventh node, and a thirteenth gate electrode connected to said second node;
a fifteenth MOS transistor comprising a thirty-seventh electrode connected to said eleventh node, a thirty-eighth electrode connected to said ninth node, and a fifteenth gate electrode connected to said ninth node;
wherein said second gate control circuit comprises:
a tenth MOS transistor comprising a twenty-seventh electrode connected to said second node, a twenty-eighth electrode connected to a tenth node, and a tenth gate electrode connected to said second node;
an eleventh MOS transistor comprising a twenty-ninth electrode connected to said third node, a thirtieth electrode connected to said seventh node, and an eleventh gate electrode connected to said tenth node;
a twelfth MOS transistor comprising a thirty-first electrode connected to said second or sixth node, a thirty-second electrode connected to said third node, and a twelfth gate electrode connected to said fourth node;
a fourteenth MOS transistor comprising a thirty-fifth electrode connected to said second or sixth node, a thirty-sixth electrode connected to a twelfth node, and a fourteenth gate electrode connected to said fourth node; and
a sixteenth MOS transistor comprising a thirty-ninth electrode connected to said twelfth node, a fortieth electrode connected to said tenth node, and a sixteenth gate electrode connected to said tenth node.

12. The power supply circuit according to claim 8, wherein said DC input voltage is set to be lower than a gate threshold voltage of said first or second MOS transistor and wherein said first to twelfth MOS transistors comprises p-channel type MOS transistors.

13. The power supply circuit according to claim 8, wherein a difference between an amplitude of said first clock and second clock and said DC input voltage is set to be smaller than a gate threshold voltage of said first or second MOS transistor and wherein said first to twelfth MOS transistors comprise n-channel type MOS transistors.

14. A power supply circuit comprising:
a first charge-pump circuit comprising a first MOS transistor and a first capacitor coupled thereto, means for charging said first capacitor to a first charging voltage by applying a specified input voltage through said first MOS transistor to one side of said first capacitor when a first clock at a first level is input to the opposite side of said first capacitor and said first MOS transistor is in an ON state, and means for generating a first generated voltage at a level obtained by increasing said first charging voltage to a level equal to an amplitude of said first clock when said first clock is at a second level and said first MOS transistor is in an OFF state and means for outputting the first generated voltage;
a second charge-pump circuit comprising a second MOS transistor and a second capacitor coupled thereto, means for charging said second capacitor to a second charging voltage by applying said specified input voltage through said second MOS transistor to one side of said second capacitor when a second clock opposite to said first clock in phase and at said first level is input to the opposite side of said second capacitor, and said second MOS transistor is in an ON state, and means for generating a second generated voltage at a level obtained by increasing said second charging voltage to a level equal to an amplitude of said second clock when said second clock is at said second level and said second MOS transistor is in an OFF state, and means for outputting the second generated voltage;

a first MOS transistor to output said first generated voltage as a DC output voltage when said first MOS transistor is in an ON state;
a second MOS transistor to output said second generated voltage as said DC output voltage when said second MOS transistor is in an ON state;
a first voltage generating circuit to generate a third generated voltage obtained by changing said DC output voltage by an amplitude of said first clock;
a second voltage generating circuit to generate a fourth generated voltage obtained by changing said DC output voltage by an amplitude of said second clock;
a first gate control circuit to make said first MOS transistor get into an ON state by applying a first control voltage being at a same level as said third generated voltage, in synchronization with a change from said first charging voltage to said first generated voltage, to a first gate electrode of said first MOS transistor and to make said first MOS transistor get into an OFF state by applying said first control voltage being at a same level as said first charging voltage, in synchronization with a change from said second charging voltage to said second generated voltage;
a second gate control circuit to make said second MOS transistor get into an ON state by applying a second control voltage at a same level as said fourth generated voltage, in synchronization with a change from said second charging voltage to said second generated voltage, to a second electrode of said second MOS transistor and to make said second MOS transistor get into an OFF state by applying said second control voltage at a same level as said second charging voltage, in synchronization with a change from said first charging voltage to said first generated voltage.

15. The power supply circuit according to claim 14, wherein said first charge-pump circuit comprises:
a third MOS transistor comprising a first electrode connected to a first node to which said DC input voltage is applied, a second electrode connected to a second node, and a third gate electrode connected to a third node; and
a first capacitor comprising a third electrode to which said first clock is input and a fourth electrode connected to said second node;
wherein said second charge-pump circuit comprises:
a fourth MOS transistor comprising a fifth electrode connected to said first node, a sixth electrode connected to said third node, and a fourth gate electrode connected to said second node; and
a second capacitor comprising a seventh electrode to which said second clock is input and an eighth electrode connected to said third node;
wherein said first MOS transistor comprises a ninth electrode connected to said second node, a tenth electrode connected to a fourth node, and said first gate electrode connected to a fifth node;
wherein said second MOS transistor comprises an eleventh electrode connected to said third node, a twelfth electrode connected to said fourth node, and said second gate electrode connected to a sixth node;
wherein said first voltage generating circuit comprises;
a fifth MOS transistor comprising a thirteenth electrode connected to said fourth node, a fourteenth electrode connected to a seventh node, a fifth gate electrode connected to an eighth node; and
a third capacitor comprising a fifteenth electrode to which said first clock is input and a sixteenth electrode connected to said seventh node;

wherein said second voltage generating circuit comprises:
a sixth MOS transistor comprising a seventeenth electrode connected to said fourth node, an eighteenth electrode connected to said eighth node, and a sixth gate electrode connected to said seventh node; and
a fourth capacitor comprising a ninth electrode to which said second clock is input and a twentieth electrode connected to said eighth node;
wherein said first gate control circuit comprises:
a seventh MOS transistor comprising a twenty-first electrode connected to said third node, a twenty-second electrode connected to a ninth node, and a seventh gate electrode connected to said fourth node;
an eighth MOS transistor comprising a twenty-third electrode connected to said sixth node, a twenty-fourth electrode connected to said eighth node, and an eighth gate electrode connected to said ninth node;
a ninth MOS transistor comprising a twenty-fifth electrode connected to said first or third node, a twenty-sixth electrode connected to said six node, and a ninth gate electrode connected to said second node; and
a tenth MOS transistor comprising a twenty-seventh electrode connected to said third node, a twenty-eighth electrode connected to said ninth node, and a tenth electrode connected to said third node;
wherein said second gate control circuit comprises:
an eleventh MOS transistor comprising a twenty-ninth electrode connected to said second node, a thirtieth electrode connected to a tenth node, and an eleventh gate electrode connected to said fourth node;
a twelfth MOS transistor comprising a thirty-first electrode connected to said fifth node, a thirty-second electrode connected to said seventh node, and a twelfth gate electrode connected to said tenth node;
a thirteenth MOS transistor comprising a thirty-third electrode connected to said first and second node, a thirty-fourth electrode connected to said fifth node, and a thirteenth gate electrode connected to said third node; and
a fourteenth MOS transistor comprising a thirty-fifth electrode connected to said second node, a thirty-sixth electrode connected to said tenth node, and a fourteenth MOS transistor connected to said second node.

16. The power supply circuit according to claim 14, wherein said first charge-pump circuit comprises:
a third MOS transistor comprising a first electrode connected to a first node to which said DC input voltage is input, a second electrode connected to said second node, and a third gate electrode connected to a third node; and
a first capacitor comprising a fourth electrode connected to a third electrode to which said first clock is input and to said second node;
wherein said second charge-pump circuit comprises:
a fourth MOS transistor comprising a fifth electrode connected to said first node, a sixth electrode connected to said third node, and a fourth gate electrode connected to said second node; and
a second capacitor comprising an eighth electrode connected to a seventh electrode to which said second clock is input and to said third node;
wherein said first MOS transistor comprises a ninth electrode connected to said second node, a tenth electrode connected to a fourth node, and said first gate electrode connected to a fifth node;
wherein said second MOS transistor comprises an eleventh electrode connected to said third node, a twelfth electrode connected to said fourth node, and said second gate electrode connected to a sixth node;

wherein said first voltage generating circuit comprises:
a fifth MOS transistor comprising a thirteenth electrode connected to said fourth node, a fourteenth electrode connected to a seventh node, and a fifth gate electrode connected to an eighth node; and
a third capacitor comprising a fifteenth electrode to which said first clock is input and to said seventh node;
wherein said second voltage generating circuit comprises:
a sixth MOS transistor comprising a seventeenth electrode connected to said fourth node, an eighteenth electrode connected to said eighth node, and a sixth gate electrode connected to said seventh node; and
a fourth capacitor comprising a twentieth electrode to which said second clock is input and to said eighth node;
wherein said first gate control circuit comprises:
a tenth MOS transistor comprising a twenty-seventh electrode connected to said third node, a twenty-eighth electrode connected to a ninth node, and a tenth gate electrode connected to said third node;
an eighth MOS transistor comprising a twenty-third electrode connected to said sixth node, a twenty-fourth electrode connected to said eighth node, and an eighth gate electrode connected to said ninth node;
a ninth MOS transistor comprising a twenty-fifth electrode connected to said first or third node, a twenty-sixth electrode connected to said sixth node, and a ninth gate electrode connected to said second node; and
a seventh MOS transistor comprising a twenty-first electrode connected to said first or third node, a twenty-second electrode connected to said ninth node, and a seventh gate electrode connected to said second node;
wherein said second gate control circuit comprises:
a fourteenth MOS transistor comprising a thirty-fifth electrode connected to said second node, a thirty-sixth electrode connected to a tenth node, and a fourteenth gate electrode connected to said second node;
a twelfth MOS transistor comprising a thirty-first electrode connected to said fifth node, a thirty-second electrode connected to said seventh node, and a twelfth gate electrode connected to said tenth node;
a thirteenth MOS transistor comprising a thirty-third electrode connected to said first or second node, a thirty-fourth electrode connected to said fifth node, and a thirteenth gate electrode connected to said third node; and
an eleventh MOS transistor comprising a twenty-ninth electrode connected to said first or second node, a thirtieth electrode connected to said tenth node, and an eleventh gate electrode connected to said third node.

17. The power supply circuit according to claim 14, wherein said first charge-pump circuit comprises:
a third MOS transistor comprising a first electrode connected to a first node to which said DC input voltage is input, a second electrode connected to a second node, and a third gate electrode connected to a third node; and
a first capacitor comprising a fourth electrode connected to a third electrode to which said first clock is input and said second node;
wherein said second charge-pump circuit comprises:
a fourth MOS transistor comprising a fifth electrode connected to said first node, a sixth electrode connected to said third node, a fourth gate electrode connected to said second node; and
a second capacitor comprising an eighth electrode connected to a seventh electrode to which said second clock is input and to said third node;

wherein said first MOS transistor comprises a ninth electrode connected to said second node, a tenth electrode connected to a fourth node, and said first node electrode connected to a fifth node;
wherein said second MOS transistor comprises an eleventh electrode connected to said third node, a twelfth electrode connected to said fourth node, and said second gate electrode connected to a sixth node;
wherein said first voltage generating circuit comprises:
a fifth MOS transistor comprising a fourteenth electrode connected to a seventh node, a fourteenth electrode connected to a seventh node, and a fifth gate electrode connected to an eighth node; and
a third capacitor comprising a sixteenth electrode connected to a fifteenth electrode to which said first clock is input and to said seventh node;
wherein said second voltage generating circuit comprises:
a sixth MOS transistor comprising a seventeenth electrode connected to said fourth node, an eighteenth electrode connected to said eighth node, and a sixth gate electrode connected to said seventh node; and
a fourth capacitor comprising a twentieth electrode connected to a nineteenth electrode to which said second clock is input and to said eighth node;
wherein said first gate control circuit comprises:
a tenth MOS transistor comprising a twenty-seventh electrode connected to said third node, a twenty-eighth electrode connected to a ninth node, and a tenth gate electrode connected to said third node;
an eighth MOS transistor comprising a twenty-third electrode connected to said sixth node, a twenty-fourth electrode connected to said eighth node, and an eighth gate electrode connected to said ninth node;
a ninth MOS transistor comprising a twenty-fifth electrode connected to said first or third node, a twenty-sixth electrode connected to said sixth node, and a ninth gate electrode connected to said second node;
a seventh MOS transistor comprising a twenty-first electrode connected to said first or third node, a twenty-second electrode connected to an eleventh node, and a seventh gate electrode connected to said second node; and
a fifteenth MOS transistor comprising a thirty-seventh electrode connected to said eleventh node, a thirty-eighth electrode connected to said ninth node, and a fifteenth gate electrode connected to said ninth node;
wherein said second gate control circuit comprises:
a fourteenth MOS transistor comprising a thirty-fifth electrode connected to said second node, a thirty-sixth electrode connected to a tenth node;
a twelfth MOS transistor comprising a thirty-first electrode connected to said fifth node, a thirty-second connected to said seventh node, and a twelfth gate electrode connected to said tenth node;
a thirteenth MOS transistor comprising a thirty-third electrode connected to said first or second node, a thirty-fourth electrode comprising a thirty-third electrode connected to said first or second node, a thirty-fourth electrode connected to said fifth node, and a thirteenth gate electrode connected to said third node;
an eleventh MOS transistor comprising a twenty-ninth electrode connected to said first or second node, a thirtieth electrode connected to a twelfth node, and an eleventh gate electrode connected to said third node; and
a sixteenth MOS transistor comprising a thirty-ninth electrode connected to said twelfth node, a fortieth electrode connected to said tenth node, a sixteenth gate electrode connected to said tenth node, and a sixteenth gate electrode connected to said tenth node.

18. A power supply circuit comprising:

a charge-pump circuit comprising at least one MOS transistor and at least one capacitor coupled thereto, means for charging said at least one capacitor to a charging voltage by applying a specified input voltage through said MOS at least one transistor to one side of said capacitor when a clock at a first level is input to the opposite side of said capacitor and said at least one MOS transistor is in an ON state, and means for generating a generated voltage at a level obtained by increasing said charging voltage to a level equal to an amplitude of said clock when said clock is at a second level and said at least one MOS transistor is in an OFF state;

a gate control circuit to apply a control voltage to a gate electrode of each of said MOS transistors in order to make said MOS transistors get in an ON state or OFF state; and wherein said gate control circuit is a level shift circuit to use an input from said capacitor which changes from said generated voltage to said charging voltage and to output an amplitude expanded from said clock.

19. An electronic device equipped with an electronic circuit as defined in any one of claim 1 to claim 18.

* * * * *

UNITED STATES PATENT AND TRADEMARK OFFICE
CERTIFICATE OF CORRECTION

PATENT NO. : 7,564,297 B2
APPLICATION NO. : 11/842651
DATED : July 21, 2009
INVENTOR(S) : Yoshihiro Nonaka It is certified that error appears in the above-identified patent and that said Letters Patent is hereby corrected as shown below:

Column 4, line 40, delete "s", insert -- a --

Column 12, line 65, delete "nMOS", insert -- pMOS --

Column 31, line 51, delete "he", insert -- be --

Signed and Sealed this

Sixteenth Day of February, 2010

David J. Kappos
*Director of the United States Patent and Trademark Office*